US011758907B2

(12) United States Patent
Jin

(10) Patent No.: US 11,758,907 B2
(45) Date of Patent: Sep. 19, 2023

(54) METHOD FOR CONTROLLING HARMFUL ORGANISMS IN CROPS

(71) Applicant: SUMITOMO CHEMICAL COMPANY, LIMITED, Chuo-ku (JP)

(72) Inventor: Yoshinobu Jin, Kasai (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 103 days.

(21) Appl. No.: 16/955,486

(22) PCT Filed: Dec. 20, 2017

(86) PCT No.: PCT/JP2017/045677
§ 371 (c)(1),
(2) Date: Jun. 18, 2020

(87) PCT Pub. No.: WO2018/043764
PCT Pub. Date: Mar. 8, 2018

(65) Prior Publication Data
US 2020/0315173 A1 Oct. 8, 2020

(51) Int. Cl.
*A01N 43/54* (2006.01)
*A01N 43/84* (2006.01)
*A01N 39/04* (2006.01)

(52) U.S. Cl.
CPC .............. *A01N 43/54* (2013.01); *A01N 39/04* (2013.01); *A01N 43/84* (2013.01)

(58) Field of Classification Search
CPC ......... A01N 43/54; A01N 43/84; A01N 39/04
See application file for complete search history.

(56) References Cited

U.S. PATENT DOCUMENTS

| 6,537,948 B1 | 3/2003 | Tohyama et al. | |
| 2009/0233796 A1 | 9/2009 | North | |
| 2010/0279862 A1* | 11/2010 | Bickers | A01N 47/36 504/117 |
| 2010/0317520 A1 | 12/2010 | Ikeda et al. | |
| 2014/0031214 A1* | 1/2014 | Yerkes | A01N 43/40 504/136 |
| 2015/0094203 A1 | 4/2015 | Ikeda | |
| 2015/0157017 A1 | 6/2015 | Ikeda | |
| 2016/0374339 A1 | 12/2016 | Aponte et al. | |
| 2017/0006873 A1 | 1/2017 | Jones, Jr. | |
| 2017/0175131 A1 | 6/2017 | Ellis et al. | |
| 2017/0265472 A1 | 9/2017 | Ikeda | |
| 2019/0150440 A1 | 5/2019 | Sada | |

FOREIGN PATENT DOCUMENTS

| JP | 2015-166386 A | 9/2015 |
| WO | WO 2017/023778 A1 | 2/2017 |
| WO | WO 2017/039969 A1 | 3/2017 |
| WO | WO 2017/112589 A1 | 6/2017 |

OTHER PUBLICATIONS

International Search Report dated Mar. 9, 2018 in PCT/JP2017/045677, 6 pages.
International Preliminary Report on Patentability and Written Opinion dated Jul. 2, 2020 in PCT/JP2017/045677, 8 pages.
The Pesticide Manual, 13th ed., British Crop Protection Council, 2003, pp. 461-462.

* cited by examiner

*Primary Examiner* — Hong Yu
(74) *Attorney, Agent, or Firm* — Oblon, McClelland, Maier & Neustadt, L.L.P.

(57) ABSTRACT

The present invention provides a method for controlling weeds comprising a step of treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing crop seeds, which has an excellent efficacy for controlling weeds in a cultivation area of crops. The present invention also provides the above-mentioned method wherein the crops are the transgenic plant body or seeds that are tolerant to the protoporphyrinogen oxidase (PPO) inhibitors; and further provides the above-mentioned method wherein the crops are the transgenic plant body or seeds having any one of a polypeptide sequence selected from the group consisting of SEQ ID Nos. 1-32 described in the Description or a polypeptide sequence having at least 85% sequence identity to any one of SEQ ID Nos. 1-32.

15 Claims, No Drawings
Specification includes a Sequence Listing.

SEQUENCE LISTING

```
<160> NUMBER OF SEQ ID NOS: 32

<210> SEQ ID NO 1
<211> LENGTH: 179
<212> TYPE: PRT
<213> ORGANISM: Enterobacter cloacae

<400> SEQUENCE: 1

Met Lys Ala Leu Val Leu Tyr Ser Thr Arg Asp Gly Gln Thr His Ala
1               5                   10                  15

Ile Ala Ser Tyr Ile Ala Ser Cys Met Lys Glu Lys Ala Glu Cys Asp
            20                  25                  30

Val Ile Asp Leu Thr His Gly Glu His Val Asn Leu Thr Gln Tyr Asp
```

```
                35                  40                  45
Gln Val Leu Ile Gly Ala Ser Ile Arg Tyr Gly His Phe Asn Ala Val
 50                  55                  60

Leu Asp Lys Phe Ile Lys Arg Asn Val Asp Gln Leu Asn Asn Met Pro
 65                  70                  75                  80

Ser Ala Phe Phe Cys Val Asn Leu Thr Ala Arg Lys Pro Glu Lys Arg
                 85                  90                  95

Thr Pro Gln Thr Asn Pro Tyr Val Arg Lys Phe Leu Leu Ala Thr Pro
                100                 105                 110

Trp Gln Pro Ala Leu Cys Gly Val Phe Ala Gly Ala Leu Arg Tyr Pro
                115                 120                 125

Arg Tyr Arg Trp Ile Asp Lys Val Met Ile Gln Leu Ile Met Arg Met
                130                 135                 140

Thr Gly Gly Glu Thr Asp Thr Ser Lys Glu Val Glu Tyr Thr Asp Trp
145                 150                 155                 160

Glu Gln Val Lys Lys Phe Ala Glu Asp Phe Ala Lys Leu Ser Tyr Lys
                165                 170                 175

Lys Ala Leu

<210> SEQ ID NO 2
<211> LENGTH: 178
<212> TYPE: PRT
<213> ORGANISM: Pantoea ananatis

<400> SEQUENCE: 2

Met Lys Ala Leu Ile Leu Phe Ser Thr Arg Asp Gly Gln Thr Gln Lys
  1               5                  10                  15

Ile Ala Ser Ala Ile Ala Asp Glu Ile Lys Gly Gln Gln Ser Cys Asp
                 20                  25                  30

Val Ile Asn Ile Gln Asp Ala Lys Thr Leu Asp Trp Gln Gln Tyr Asp
                 35                  40                  45

Arg Val Leu Ile Gly Ala Ser Ile Arg Tyr Gly His Phe Gln Pro Val
 50                  55                  60

Val Asn Glu Phe Val Lys His Asn Leu Leu Ala Leu Gln Gln Arg Val
 65                  70                  75                  80

Ser Gly Phe Phe Ser Val Asn Leu Thr Ala Arg Lys Pro Glu Lys Arg
                 85                  90                  95

Ser Pro Glu Thr Asn Ala Tyr Thr Val Lys Phe Leu Ala Gln Ser Pro
                100                 105                 110

Trp Gln Pro Asp Cys Cys Ala Val Phe Ala Gly Ala Leu Tyr Tyr Pro
                115                 120                 125

Arg Tyr Arg Trp Phe Asp Arg Val Met Ile Gln Phe Ile Met Arg Met
                130                 135                 140

Thr Gly Gly Glu Thr Asp Ala Ser Lys Glu Val Glu Tyr Thr Asp Trp
145                 150                 155                 160

Gln Gln Val Gln Arg Phe Ala Arg Asp Phe Ala Gln Leu Pro Gly Lys
                165                 170                 175

Ser Tyr

<210> SEQ ID NO 3
<211> LENGTH: 177
<212> TYPE: PRT
<213> ORGANISM: Pantoea stewardii

<400> SEQUENCE: 3
```

```
Met Lys Ala Leu Ile Leu Tyr Ser Thr Arg Asp Gly Gln Thr Arg Lys
1               5                   10                  15

Ile Ala Ser Ser Ile Ala Asp Val Ile Arg Gln Gln Gln Cys Asp
            20                  25                  30

Val Leu Asn Ile Lys Asp Ala Ser Leu Pro Asp Trp Ala Gln Tyr Asp
            35                  40                  45

Arg Val Leu Ile Gly Ala Ser Ile Arg Tyr Gly His Phe Gln Pro Val
        50                  55                  60

Val Asp Lys Phe Val Lys Gln His Leu His Glu Leu Gln Arg Thr
65                  70                  75                  80

Ser Gly Phe Phe Ser Val Asn Leu Thr Ala Arg Lys Pro Glu Lys Arg
                85                  90                  95

Ser Pro Glu Thr Asn Ala Tyr Thr Gln Lys Phe Leu Ala His Ser Pro
            100                 105                 110

Trp Gln Pro Asp Cys Cys Ala Val Phe Ala Gly Ala Leu Tyr Tyr Pro
            115                 120                 125

Arg Tyr Arg Trp Phe Asp Arg Val Met Ile Gln Leu Ile Met Arg Met
        130                 135                 140

Thr Gly Gly Glu Thr Asp Ser Thr Lys Glu Val Glu Tyr Thr Asp Trp
145                 150                 155                 160

Gln Gln Val Ser Thr Phe Ala Asn Asp Phe Ala Gln Leu Pro Gly Lys
                165                 170                 175

Ser

<210> SEQ ID NO 4
<211> LENGTH: 181
<212> TYPE: PRT
<213> ORGANISM: Escherichia coli

<400> SEQUENCE: 4

Met Lys Thr Leu Ile Leu Phe Ser Thr Arg Asp Gly Gln Thr Arg Glu
1               5                   10                  15

Ile Ala Ser Tyr Leu Ala Ser Glu Leu Lys Glu Leu Gly Ile Gln Ala
            20                  25                  30

Asp Val Ala Asn Val His Arg Ile Glu Glu Pro Gln Trp Glu Asn Tyr
            35                  40                  45

Asp Arg Val Val Ile Gly Ala Ser Ile Arg Tyr Gly His Tyr His Ser
        50                  55                  60

Ala Phe Gln Glu Phe Val Lys Lys His Ala Thr Arg Leu Asn Ser Met
65                  70                  75                  80

Pro Ser Ala Phe Tyr Ser Val Asn Leu Val Ala Arg Lys Pro Glu Lys
                85                  90                  95

Arg Thr Pro Gln Thr Asn Ser Tyr Ala Arg Lys Phe Leu Met Asn Ser
            100                 105                 110

Gln Trp Arg Pro Asp Arg Cys Ala Val Ile Ala Gly Ala Leu Arg Tyr
            115                 120                 125

Pro Arg Tyr Arg Trp Tyr Asp Arg Phe Met Ile Lys Leu Ile Met Lys
        130                 135                 140

Met Ser Gly Gly Glu Thr Asp Thr Arg Lys Glu Val Val Tyr Thr Asp
145                 150                 155                 160

Trp Glu Gln Val Ala Asn Phe Ala Arg Glu Ile Ala His Leu Thr Asp
                165                 170                 175

Lys Pro Thr Leu Lys
            180
```

<210> SEQ ID NO 5
<211> LENGTH: 178
<212> TYPE: PRT
<213> ORGANISM: Erwinia toletana

<400> SEQUENCE: 5

Met Lys Ala Leu Ile Leu Phe Ser Ser Arg Glu Gly Gln Thr Arg Glu
1               5                   10                  15

Ile Ala Ser Tyr Ile Ala Asn Ser Ile Lys Glu Glu Met Glu Cys Asp
            20                  25                  30

Val Phe Asn Ile Leu Arg Val Glu Gln Ile Asp Trp Ser Gln Tyr Asp
        35                  40                  45

Arg Val Leu Ile Gly Gly Ser Ile His Tyr Gly His Phe His Pro Ala
    50                  55                  60

Val Ala Lys Phe Val Lys Arg His Leu His Glu Leu Gln Gln Arg Ser
65                  70                  75                  80

Ser Gly Phe Phe Cys Val Asn Leu Thr Ala Arg Lys Ala Asp Lys Arg
                85                  90                  95

Thr Pro Gln Thr Asn Ala Tyr Met Arg Lys Phe Leu Leu Gln Ser Pro
            100                 105                 110

Trp Gln Pro Asp Cys Cys Ala Val Phe Ala Gly Ala Leu Arg Tyr Thr
        115                 120                 125

Arg Tyr Arg Trp Phe Asp Arg Val Met Ile Gln Leu Ile Met Arg Met
    130                 135                 140

Thr Gly Gly Glu Thr Asp Thr Ser Lys Glu Val Glu Tyr Thr Asp Trp
145                 150                 155                 160

Thr Gln Val Ala Arg Phe Ala Gln Glu Phe Ala His Leu Pro Gly Lys
                165                 170                 175

Thr Gln

<210> SEQ ID NO 6
<211> LENGTH: 179
<212> TYPE: PRT
<213> ORGANISM: Pectobacterium carotovorum

<400> SEQUENCE: 6

Met Lys Ala Leu Ile Val Phe Ser Ser Arg Asp Gly Gln Thr Arg Ala
1               5                   10                  15

Ile Ala Ser Tyr Ile Ala Asn Thr Leu Lys Gly Thr Leu Glu Cys Asp
            20                  25                  30

Val Val Asn Val Leu Asn Ala Asn Asp Ile Asp Leu Ser Gln Tyr Asp
        35                  40                  45

Arg Val Ala Ile Gly Ala Ser Ile Arg Tyr Gly Arg Phe His Pro Ala
    50                  55                  60

Val Asn Gln Phe Ile Arg Lys His Leu Thr Ser Leu Gln Gln Leu Pro
65                  70                  75                  80

Ser Ala Phe Phe Ser Val Asn Leu Thr Ala Arg Lys Pro Glu Lys Arg
                85                  90                  95

Thr Ile Gln Thr Asn Ala Tyr Thr Arg Lys Phe Leu Leu Asn Ser Pro
            100                 105                 110

Trp Gln Pro Asp Leu Cys Cys Val Phe Ala Gly Ala Leu Arg Tyr Pro
        115                 120                 125

Arg Tyr Arg Trp Phe Asp Arg Val Met Ile Gln Leu Ile Met Arg Ile
    130                 135                 140

Thr Gly Gly Glu Thr Asp Ser Thr Lys Glu Ile Glu Tyr Thr Asp Trp

```
                    145                 150                 155                 160
                Gln Gln Val Ala Arg Phe Ala Gln Asp Phe Ala Gln Leu Ala Ala Lys
                                165                 170                 175

Asn Pro Ala

<210> SEQ ID NO 7
<211> LENGTH: 179
<212> TYPE: PRT
<213> ORGANISM: Shimwellia blattae

<400> SEQUENCE: 7

Met Lys Thr Leu Ile Leu Phe Ser Thr Arg Asp Gly Gln Thr His Lys
1               5                   10                  15

Ile Ala Arg His Ile Ala Gly Val Leu Glu Glu Gln Gly Lys Ala Cys
                20                  25                  30

Glu Leu Val Asp Leu Leu Gln Pro Gly Glu Pro Asp Trp Ser Thr Val
            35                  40                  45

Glu Cys Val Val Leu Gly Ala Ser Ile Arg Tyr Gly His Phe His Lys
        50                  55                  60

Ser Phe Ile Arg Phe Val Asn Thr His Ala Gln Arg Leu Asn Asn Met
65                  70                  75                  80

Pro Gly Ala Leu Phe Thr Val Asn Leu Val Ala Arg Lys Pro Glu Lys
                85                  90                  95

Gln Ser Pro Gln Thr Asn Ser Tyr Thr Arg Lys Phe Leu Ala Ala Ser
                100                 105                 110

Pro Trp Gln Pro Gln Arg Cys Gln Val Phe Ala Gly Ala Leu Arg Tyr
            115                 120                 125

Pro Arg Tyr Ser Trp Tyr Asp Arg Met Met Ile Arg Leu Ile Met Lys
        130                 135                 140

Met Ala Gly Gly Glu Thr Asp Thr Arg Lys Glu Val Glu Tyr Thr Asp
145                 150                 155                 160

Trp Gln Ser Val Thr Arg Phe Ala Arg Glu Ile Ala Gln Leu Pro Gly
                165                 170                 175

Glu Thr Arg

<210> SEQ ID NO 8
<211> LENGTH: 178
<212> TYPE: PRT
<213> ORGANISM: Pantoea stewardii

<400> SEQUENCE: 8

Met Lys Ala Leu Ile Leu Phe Ser Ser Arg Asp Gly Gln Thr Gln Leu
1               5                   10                  15

Ile Ala Ser Ser Ile Ala Lys Glu Leu Glu Gly Lys Gln Ala Cys Asp
                20                  25                  30

Val Leu Asn Ile Leu Asp Thr Thr Asn Val Glu Trp Thr Gln Tyr Asp
            35                  40                  45

Arg Val Leu Ile Gly Ala Ser Ile Arg Tyr Gly His Phe His Pro Ala
        50                  55                  60

Val Ala Glu Phe Val Lys Arg His Gln Arg Glu Leu Gln Gln Arg Ser
65                  70                  75                  80

Ser Gly Phe Phe Ser Val Asn Leu Thr Ala Arg Lys Pro Glu Lys Arg
                85                  90                  95

Ser Pro Glu Thr Asn Ala Tyr Thr Ala Lys Phe Leu Asn Gln Ser Pro
                100                 105                 110
```

Trp Gln Pro Asp Cys Cys Ala Val Phe Ala Gly Ala Leu Arg Tyr Pro
            115                 120                 125

Arg Tyr Arg Trp Phe Asp Arg Ile Met Ile Gln Leu Ile Met Arg Met
130                 135                 140

Thr Gly Gly Glu Thr Asp Ser Ser Lys Glu Val Glu Tyr Thr Asp Trp
145                 150                 155                 160

Gln Gln Val Thr Arg Phe Ala Gln Glu Phe Ala Arg Leu Pro Gly Lys
                165                 170                 175

Thr Ser

<210> SEQ ID NO 9
<211> LENGTH: 180
<212> TYPE: PRT
<213> ORGANISM: Enterobacter cloacae

<400> SEQUENCE: 9

Met Lys Thr Leu Ile Leu Phe Ser Thr Arg Asp Gly Gln Thr Arg Glu
1               5                   10                  15

Ile Ala Ala Phe Leu Ala Ser Glu Leu Lys Glu Gln Gly Ile Tyr Ala
            20                  25                  30

Asp Val Ile Asn Leu Asn Arg Thr Glu Glu Ile Ala Trp Gln Glu Tyr
        35                  40                  45

Asp Arg Val Val Ile Gly Ala Ser Ile Arg Tyr Gly His Phe His Pro
    50                  55                  60

Ala Val Asp Arg Phe Val Lys Lys His Thr Glu Thr Leu Asn Ser Leu
65                  70                  75                  80

Pro Gly Ala Phe Phe Ser Val Asn Leu Val Ala Arg Lys Ala Glu Lys
                85                  90                  95

Arg Thr Pro Gln Thr Asn Ser Tyr Thr Arg Lys Phe Leu Leu Asn Ser
            100                 105                 110

Pro Trp Lys Pro Ala Ala Cys Ala Val Phe Ala Gly Ala Leu Arg Tyr
        115                 120                 125

Pro Arg Tyr Arg Trp Tyr Asp Arg Phe Met Ile Arg Leu Ile Met Lys
    130                 135                 140

Met Thr Gly Gly Glu Thr Asp Thr Arg Lys Glu Val Val Tyr Thr Asp
145                 150                 155                 160

Trp Ser Gln Val Ala Ser Phe Ala Arg Glu Ile Val Gln Leu Thr Arg
                165                 170                 175

Ser Ser Arg Leu
            180

<210> SEQ ID NO 10
<211> LENGTH: 177
<212> TYPE: PRT
<213> ORGANISM: Enterobacter mori

<400> SEQUENCE: 10

Met Lys Ile Leu Ile Leu Phe Ser Thr Arg Asp Gly Gln Thr Arg Glu
1               5                   10                  15

Ile Ala Ala Ser Leu Ala Ser Glu Leu Lys Glu Gln Ala Phe Asp Val
            20                  25                  30

Asp Val Val Asn Leu His Arg Ala Glu Asn Ile Ala Trp Glu Glu Tyr
        35                  40                  45

Asp Gly Val Val Ile Gly Ala Ser Ile Arg Tyr Gly His Phe His Ser
    50                  55                  60

Thr Leu Asn Ser Phe Val Lys Lys His Gln Gln Ala Leu Lys Lys Leu

```
                65                  70                  75                  80
Pro Gly Ala Phe Tyr Ser Val Asn Leu Val Ala Arg Lys Pro Glu Lys
                    85                  90                  95

Arg Thr Pro Gln Thr Asn Ser Tyr Thr Arg Lys Phe Leu Leu Asp Ser
                100                 105                 110

Pro Trp Gln Pro Asp Leu Ser Ala Val Phe Ala Gly Ala Leu Arg Tyr
            115                 120                 125

Pro Arg Tyr Asn Trp Tyr Asp Arg Ile Met Ile Arg Leu Ile Met Lys
        130                 135                 140

Ile Thr Gly Gly Glu Thr Asp Thr Arg Lys Glu Val Val Tyr Thr Asp
145                 150                 155                 160

Trp Gln Gln Val Thr His Phe Ala His Glu Ile Val Gln Leu Val Arg
                165                 170                 175

Lys

<210> SEQ ID NO 11
<211> LENGTH: 178
<212> TYPE: PRT
<213> ORGANISM: Enterobacter cloacae

<400> SEQUENCE: 11

Lys Ala Leu Val Leu Tyr Ser Thr Arg Asp Gly Gln Thr His Ala Ile
1               5                   10                  15

Ala Ser Tyr Ile Ala Ser Cys Met Lys Glu Lys Ala Glu Cys Asp Val
                20                  25                  30

Ile Asp Leu Thr His Gly Glu His Val Asn Leu Thr Gln Tyr Asp Gln
            35                  40                  45

Val Leu Ile Gly Ala Ser Ile Arg Tyr Gly His Phe Asn Ala Val Leu
        50                  55                  60

Asp Lys Phe Ile Lys Arg Asn Val Asp Gln Leu Asn Asn Met Pro Ser
65                  70                  75                  80

Ala Phe Phe Cys Val Asn Leu Thr Ala Arg Lys Pro Glu Lys Arg Thr
                85                  90                  95

Pro Gln Thr Asn Pro Tyr Val Arg Lys Phe Leu Leu Ala Thr Pro Trp
                100                 105                 110

Gln Pro Ala Leu Cys Gly Val Phe Ala Gly Ala Leu Arg Tyr Pro Arg
            115                 120                 125

Tyr Arg Trp Ile Asp Lys Val Met Ile Gln Leu Ile Met Arg Met Thr
        130                 135                 140

Gly Gly Glu Thr Asp Thr Ser Lys Glu Val Glu Tyr Thr Asp Trp Glu
145                 150                 155                 160

Gln Val Lys Lys Phe Ala Glu Asp Phe Ala Lys Leu Ser Tyr Lys Lys
                165                 170                 175

Ala Leu

<210> SEQ ID NO 12
<211> LENGTH: 177
<212> TYPE: PRT
<213> ORGANISM: Pantoea ananatis

<400> SEQUENCE: 12

Lys Ala Leu Ile Leu Phe Ser Thr Arg Asp Gly Gln Thr Gln Lys Ile
1               5                   10                  15

Ala Ser Ala Ile Ala Asp Glu Ile Lys Gly Gln Gln Ser Cys Asp Val
                20                  25                  30
```

```
Ile Asn Ile Gln Asp Ala Lys Thr Leu Asp Trp Gln Gln Tyr Asp Arg
         35                  40                  45

Val Leu Ile Gly Ala Ser Ile Arg Tyr Gly His Phe Gln Pro Val Val
 50                  55                  60

Asn Glu Phe Val Lys His Asn Leu Leu Ala Leu Gln Gln Arg Val Ser
 65                  70                  75                  80

Gly Phe Phe Ser Val Asn Leu Thr Ala Arg Lys Pro Glu Lys Arg Ser
                 85                  90                  95

Pro Glu Thr Asn Ala Tyr Thr Val Lys Phe Leu Ala Gln Ser Pro Trp
             100                 105                 110

Gln Pro Asp Cys Cys Ala Val Phe Ala Gly Ala Leu Tyr Tyr Pro Arg
             115                 120                 125

Tyr Arg Trp Phe Asp Arg Val Met Ile Gln Phe Ile Met Arg Met Thr
130                 135                 140

Gly Gly Glu Thr Asp Ala Ser Lys Glu Val Glu Tyr Thr Asp Trp Gln
145                 150                 155                 160

Gln Val Gln Arg Phe Ala Arg Asp Phe Ala Gln Leu Pro Gly Lys Ser
                165                 170                 175

Tyr

<210> SEQ ID NO 13
<211> LENGTH: 180
<212> TYPE: PRT
<213> ORGANISM: Escherichia coli

<400> SEQUENCE: 13

Lys Thr Leu Ile Leu Phe Ser Thr Arg Asp Gly Gln Thr Arg Glu Ile
 1               5                  10                  15

Ala Ser Tyr Leu Ala Ser Glu Leu Lys Glu Leu Gly Ile Gln Ala Asp
             20                  25                  30

Val Ala Asn Val His Arg Ile Glu Glu Pro Gln Trp Glu Asn Tyr Asp
             35                  40                  45

Arg Val Val Ile Gly Ala Ser Ile Arg Tyr Gly His Tyr His Ser Ala
 50                  55                  60

Phe Gln Glu Phe Val Lys Lys His Ala Thr Arg Leu Asn Ser Met Pro
 65                  70                  75                  80

Ser Ala Phe Tyr Ser Val Asn Leu Val Ala Arg Lys Pro Glu Lys Arg
                 85                  90                  95

Thr Pro Gln Thr Asn Ser Tyr Ala Arg Lys Phe Leu Met Asn Ser Gln
             100                 105                 110

Trp Arg Pro Asp Arg Cys Ala Val Ile Ala Gly Ala Leu Arg Tyr Pro
             115                 120                 125

Arg Tyr Arg Trp Tyr Asp Arg Phe Met Ile Lys Leu Ile Met Lys Met
130                 135                 140

Ser Gly Gly Glu Thr Asp Thr Arg Lys Glu Val Val Tyr Thr Asp Trp
145                 150                 155                 160

Glu Gln Val Ala Asn Phe Ala Arg Glu Ile Ala His Leu Thr Asp Lys
                165                 170                 175

Pro Thr Leu Lys
            180

<210> SEQ ID NO 14
<211> LENGTH: 177
<212> TYPE: PRT
<213> ORGANISM: Erwinia toletana
```

<400> SEQUENCE: 14

Lys Ala Leu Ile Leu Phe Ser Ser Arg Glu Gly Gln Thr Arg Glu Ile
1               5                   10                  15

Ala Ser Tyr Ile Ala Asn Ser Ile Lys Glu Glu Met Glu Cys Asp Val
            20                  25                  30

Phe Asn Ile Leu Arg Val Glu Gln Ile Asp Trp Ser Gln Tyr Asp Arg
        35                  40                  45

Val Leu Ile Gly Gly Ser Ile His Tyr Gly His Phe His Pro Ala Val
    50                  55                  60

Ala Lys Phe Val Lys Arg His Leu His Glu Leu Gln Gln Arg Ser Ser
65                  70                  75                  80

Gly Phe Phe Cys Val Asn Leu Thr Ala Arg Lys Ala Asp Lys Arg Thr
                85                  90                  95

Pro Gln Thr Asn Ala Tyr Met Arg Lys Phe Leu Leu Ser Pro Trp
            100                 105                 110

Gln Pro Asp Cys Cys Ala Val Phe Ala Gly Ala Leu Arg Tyr Thr Arg
        115                 120                 125

Tyr Arg Trp Phe Asp Arg Val Met Ile Gln Leu Ile Met Arg Met Thr
    130                 135                 140

Gly Gly Glu Thr Asp Thr Ser Lys Glu Val Glu Tyr Thr Asp Trp Thr
145                 150                 155                 160

Gln Val Ala Arg Phe Ala Gln Glu Phe Ala His Leu Pro Gly Lys Thr
                165                 170                 175

Gln

<210> SEQ ID NO 15
<211> LENGTH: 178
<212> TYPE: PRT
<213> ORGANISM: Pectobacterium carotovorum

<400> SEQUENCE: 15

Lys Ala Leu Ile Val Phe Ser Ser Arg Asp Gly Gln Thr Arg Ala Ile
1               5                   10                  15

Ala Ser Tyr Ile Ala Asn Thr Leu Lys Gly Thr Leu Glu Cys Asp Val
            20                  25                  30

Val Asn Val Leu Asn Ala Asn Asp Ile Asp Leu Ser Gln Tyr Asp Arg
        35                  40                  45

Val Ala Ile Gly Ala Ser Ile Arg Tyr Gly Arg Phe His Pro Ala Val
    50                  55                  60

Asn Gln Phe Ile Arg Lys His Leu Thr Ser Leu Gln Gln Leu Pro Ser
65                  70                  75                  80

Ala Phe Phe Ser Val Asn Leu Thr Ala Arg Lys Pro Glu Lys Arg Thr
                85                  90                  95

Ile Gln Thr Asn Ala Tyr Thr Arg Lys Phe Leu Leu Asn Ser Pro Trp
            100                 105                 110

Gln Pro Asp Leu Cys Val Phe Ala Gly Ala Leu Arg Tyr Pro Arg
        115                 120                 125

Tyr Arg Trp Phe Asp Arg Val Met Ile Gln Leu Ile Met Arg Ile Thr
    130                 135                 140

Gly Gly Glu Thr Asp Ser Thr Lys Glu Ile Glu Tyr Thr Asp Trp Gln
145                 150                 155                 160

Gln Val Ala Arg Phe Ala Gln Asp Phe Ala Gln Leu Ala Ala Lys Asn
                165                 170                 175

Pro Ala

<210> SEQ ID NO 16
<211> LENGTH: 178
<212> TYPE: PRT
<213> ORGANISM: Shimwellia blattae

<400> SEQUENCE: 16

Lys Thr Leu Ile Leu Phe Ser Thr Arg Asp Gly Gln Thr His Lys Ile
1               5                   10                  15

Ala Arg His Ile Ala Gly Val Leu Glu Gln Gly Lys Ala Cys Glu
            20                  25                  30

Leu Val Asp Leu Leu Gln Pro Gly Glu Pro Asp Trp Ser Thr Val Glu
        35                  40                  45

Cys Val Val Leu Gly Ala Ser Ile Arg Tyr Gly His Phe His Lys Ser
    50                  55                  60

Phe Ile Arg Phe Val Asn Thr His Ala Gln Arg Leu Asn Asn Met Pro
65                  70                  75                  80

Gly Ala Leu Phe Thr Val Asn Leu Val Ala Arg Lys Pro Glu Lys Gln
                85                  90                  95

Ser Pro Gln Thr Asn Ser Tyr Thr Arg Lys Phe Leu Ala Ala Ser Pro
            100                 105                 110

Trp Gln Pro Gln Arg Cys Gln Val Phe Ala Gly Ala Leu Arg Tyr Pro
        115                 120                 125

Arg Tyr Ser Trp Tyr Asp Arg Met Met Ile Arg Leu Ile Met Lys Met
    130                 135                 140

Ala Gly Gly Glu Thr Asp Thr Arg Lys Glu Val Glu Tyr Thr Asp Trp
145                 150                 155                 160

Gln Ser Val Thr Arg Phe Ala Arg Glu Ile Ala Gln Leu Pro Gly Glu
                165                 170                 175

Thr Arg

<210> SEQ ID NO 17
<211> LENGTH: 179
<212> TYPE: PRT
<213> ORGANISM: Enterobacter cloacae

<400> SEQUENCE: 17

Lys Thr Leu Ile Leu Phe Ser Thr Arg Asp Gly Gln Thr Arg Glu Ile
1               5                   10                  15

Ala Ala Phe Leu Ala Ser Glu Leu Lys Glu Gln Gly Ile Tyr Ala Asp
            20                  25                  30

Val Ile Asn Leu Asn Arg Thr Glu Glu Ile Ala Trp Gln Glu Tyr Asp
        35                  40                  45

Arg Val Val Ile Gly Ala Ser Ile Arg Tyr Gly His Phe His Pro Ala
    50                  55                  60

Val Asp Arg Phe Val Lys Lys His Thr Glu Thr Leu Asn Ser Leu Pro
65                  70                  75                  80

Gly Ala Phe Phe Ser Val Asn Leu Val Ala Arg Lys Ala Glu Lys Arg
                85                  90                  95

Thr Pro Gln Thr Asn Ser Tyr Thr Arg Lys Phe Leu Leu Asn Ser Pro
            100                 105                 110

Trp Lys Pro Ala Ala Cys Ala Val Phe Ala Gly Ala Leu Arg Tyr Pro
        115                 120                 125

Arg Tyr Arg Trp Tyr Asp Arg Phe Met Ile Arg Leu Ile Met Lys Met
    130                 135                 140

Thr Gly Gly Glu Thr Asp Thr Arg Lys Glu Val Val Tyr Thr Asp Trp
145                 150                 155                 160

Ser Gln Val Ala Ser Phe Ala Arg Glu Ile Val Gln Leu Thr Arg Ser
                165                 170                 175

Ser Arg Leu

<210> SEQ ID NO 18
<211> LENGTH: 178
<212> TYPE: PRT
<213> ORGANISM: Artificial Sequence
<220> FEATURE:
<223> OTHER INFORMATION: Recombinant

<400> SEQUENCE: 18

Lys Ala Leu Val Leu Tyr Ser Thr Arg Asp Gly Gln Thr His Ala Ile
1               5                   10                  15

Ala Ser Tyr Ile Ala Ser Cys Met Lys Glu Lys Ala Glu Cys Asp Val
                20                  25                  30

Ile Asp Leu Thr His Gly Glu His Val Asn Leu Thr Gln Tyr Asp Gln
            35                  40                  45

Val Leu Ile Gly Ala Asn Ile Arg Tyr Gly His Phe Asn Ala Val Leu
50                  55                  60

Asp Lys Phe Ile Lys Arg Asn Val Asp Gln Leu Asn Asn Met Pro Ser
65                  70                  75                  80

Ala Phe Phe Cys Val Asn Leu Thr Ala Arg Lys Pro Glu Lys Arg Thr
                85                  90                  95

Pro Gln Thr Asn Pro Tyr Val Arg Lys Phe Leu Leu Ala Thr Pro Trp
            100                 105                 110

Gln Pro Ala Leu Cys Gly Val Phe Ala Gly Ala Leu Arg Tyr Pro Arg
        115                 120                 125

Tyr Arg Trp Ile Asp Lys Val Met Ile Gln Leu Ile Met Arg Met Thr
130                 135                 140

Gly Gly Glu Thr Asp Thr Ser Lys Glu Val Glu Tyr Thr Asp Trp Glu
145                 150                 155                 160

Gln Val Lys Lys Phe Ala Glu Asp Phe Ala Lys Leu Ser Tyr Lys Lys
                165                 170                 175

Ala Leu

<210> SEQ ID NO 19
<211> LENGTH: 172
<212> TYPE: PRT
<213> ORGANISM: Artificial Sequence
<220> FEATURE:
<223> OTHER INFORMATION: Recombinant

<400> SEQUENCE: 19

Lys Ala Leu Val Leu Tyr Ser Thr Arg Asp Gly Gln Thr His Ala Ile
1               5                   10                  15

Ala Ser Tyr Ile Ala Ser Cys Met Lys Glu Lys Ala Glu Cys Asp Val
                20                  25                  30

Ile Asp Leu Thr His Gly Glu His Val Asn Leu Thr Gln Tyr Asp Gln
            35                  40                  45

Val Leu Ile Gly Ala Ser Ile Arg Tyr Gly His Phe Asn Ala Val Leu
50                  55                  60

Asp Lys Phe Ile Lys Arg Asn Val Asp Gln Leu Asn Asn Met Pro Ser
65                  70                  75                  80

Ala Phe Phe Cys Val Asn Leu Thr Ala Arg Lys Pro Glu Lys Arg Thr

```
                         85                  90                  95

Pro Gln Thr Asn Pro Tyr Val Arg Lys Phe Leu Leu Ala Thr Pro Trp
                    100                 105                 110

Gln Pro Ala Leu Cys Gly Val Phe Ala Gly Ala Leu Arg Tyr Pro Arg
                115                 120                 125

Tyr Arg Trp Ile Asp Lys Val Met Ile Gln Leu Ile Met Arg Met Thr
            130                 135                 140

Gly Gly Glu Thr Asp Thr Ser Lys Glu Val Tyr Thr Asp Trp Glu
145                 150                 155                 160

Gln Val Lys Lys Phe Ala Glu Asp Phe Ala Lys Leu
                165                 170

<210> SEQ ID NO 20
<211> LENGTH: 179
<212> TYPE: PRT
<213> ORGANISM: Artificial Sequence
<220> FEATURE:
<223> OTHER INFORMATION: Recombinant

<400> SEQUENCE: 20

Lys Thr Leu Ile Leu Phe Ser Thr Arg Asp Gly Gln Thr Arg Glu Ile
1               5                   10                  15

Ala Ala Phe Leu Ala Ser Glu Leu Lys Glu Gln Gly Ile Tyr Ala Asp
                20                  25                  30

Val Ile Asn Leu Asn Arg Thr Glu Glu Ile Ala Trp Gln Glu Tyr Asp
            35                  40                  45

Arg Val Val Ile Gly Ala Ser Ile Arg Tyr Gly His Phe His Pro Ala
        50                  55                  60

Val Asp Arg Phe Val Lys Lys His Thr Glu Thr Leu Asn Ser Leu Pro
65                  70                  75                  80

Gly Ala Phe Phe Ser Val Asn Leu Val Ala Arg Lys Ala Glu Lys Arg
                85                  90                  95

Thr Pro Gln Thr Asn Ser Tyr Thr Arg Lys Phe Leu Leu Asn Ser Pro
                100                 105                 110

Trp Lys Pro Ala Ala Cys Ala Val Phe Ala Gly Ala Leu Arg Tyr Pro
            115                 120                 125

Arg Tyr Arg Trp Tyr Asp Arg Phe Met Ile Arg Leu Ile Met Lys Met
        130                 135                 140

Thr Gly Gly Glu Thr Asp Thr Arg Lys Glu Val Val Tyr Thr Asp Trp
145                 150                 155                 160

Ser Gln Ile Ala Ser Phe Ala Arg Glu Ile Val Gln Leu Thr Arg Ser
                165                 170                 175

Ser Arg Leu

<210> SEQ ID NO 21
<211> LENGTH: 442
<212> TYPE: PRT
<213> ORGANISM: Xanthomonas campestris

<400> SEQUENCE: 21

Met Gln Thr Gln Pro Val Ile Ile Ala Gly Ala Gly Ile Ala Gly Leu
1               5                   10                  15

Ser Ile Ala Tyr Glu Leu Gln Gln Lys Gly Ile Pro Tyr Glu Ile Met
                20                  25                  30

Glu Ala Ser Ser Tyr Ala Gly Gly Val Val Lys Ser Leu His Ile Asp
            35

```
Gly Tyr Glu Leu Asp Ala Gly Pro Asn Ser Leu Ala Ala Ser Ala Ala
    50                  55                  60

Phe Met Ala Tyr Ile Asp Gln Leu Gly Leu Gln Asp Gln Val Leu Glu
 65                  70                  75                  80

Ala Ala Ala Ala Ser Lys Asn Arg Phe Leu Val Arg Asn Asp Lys Leu
                 85                  90                  95

His Ala Val Ser Pro His Pro Phe Lys Ile Leu Gln Ser Ala Tyr Ile
            100                 105                 110

Ser Gly Gly Ala Lys Trp Arg Leu Phe Thr Glu Arg Phe Arg Lys Ala
        115                 120                 125

Ala Ala Pro Glu Gly Glu Thr Val Ser Ser Phe Val Thr Arg Arg
    130                 135                 140

Phe Gly Lys Glu Ile Asn Asp Tyr Leu Phe Glu Pro Val Leu Ser Gly
145                 150                 155                 160

Ile Tyr Ala Gly Asn Pro Asp Leu Met Ser Val Gly Glu Val Leu Pro
                165                 170                 175

Met Leu Pro Gln Trp Glu Gln Lys Tyr Gly Ser Val Thr Gln Gly Leu
            180                 185                 190

Leu Lys Asn Lys Gly Ala Met Gly Gly Arg Lys Ile Ile Ala Phe Lys
        195                 200                 205

Gly Gly Asn Ala Thr Leu Thr Asn Arg Leu Gln Ser Leu Leu Ser Gly
    210                 215                 220

Lys Ile Arg Phe Asn Cys Ala Val Thr Gly Val Thr Arg Gly Ala Asp
225                 230                 235                 240

Asp Tyr Ile Val Gln Tyr Thr Glu Asn Gly Asn Thr Ala Met Leu Asn
                245                 250                 255

Ala Ser Arg Val Ile Phe Thr Thr Pro Ala Tyr Ser Thr Ala Val Ala
            260                 265                 270

Ile Gln Ala Leu Asp Ala Ser Leu Ala Thr His Leu Ser Asp Val Pro
        275                 280                 285

Tyr Pro Arg Met Gly Val Leu His Leu Gly Phe Gly Ala Glu Ala Arg
    290                 295                 300

Gln Lys Ala Pro Ala Gly Phe Gly Phe Leu Val Pro His Ala Ala Gly
305                 310                 315                 320

Lys His Phe Leu Gly Ala Ile Cys Asn Ser Ala Ile Phe Pro Ser Arg
                325                 330                 335

Val Pro Thr Gly Lys Val Leu Phe Thr Val Phe Leu Gly Gly Ala Arg
            340                 345                 350

Gln Glu Gln Leu Phe Asp Gln Leu Gly Pro Glu Lys Leu Gln Gln Thr
        355                 360                 365

Val Val Lys Glu Leu Met Glu Leu Leu Gly Leu Thr Thr Pro Pro Glu
    370                 375                 380

Met Gln Arg Phe Ser Glu Trp Asn Arg Ala Ile Pro Gln Leu Asn Val
385                 390                 395                 400

Gly Tyr Ala Gln Thr Arg Gln Gln Ile Gly Val Phe Glu Gln Arg Tyr
                405                 410                 415

Pro Gly Ile Arg Leu Ala Gly Asn Tyr Val Thr Gly Val Ala Val Pro
            420                 425                 430

Ala Ile Ile Gln Ala Ala Lys Gly Tyr Cys
        435                 440

<210> SEQ ID NO 22
<211> LENGTH: 448
<212> TYPE: PRT
```

-continued

<213> ORGANISM: Chitinophaga pinensis

<400> SEQUENCE: 22

```
Met Ser Asp Gln Pro Val Leu Ile Val Gly Ala Gly Leu Ser Gly Leu
1               5                   10                  15

Ser Ile Ala Tyr Glu Leu Gln Lys Leu Gln Val Pro Tyr Gln Val Leu
            20                  25                  30

Glu Val Ser Gly His Ser Gly Val Met Lys Ser Leu Arg Lys Asp
        35                  40                  45

Gly Phe Glu Leu Asp Ala Gly Ala Asn Thr Ile Ala Ala Ser Pro Glu
    50                  55                  60

Ile Leu Ala Tyr Phe Thr Ser Leu Gly Leu Glu Asn Glu Ile Leu Gln
65                  70                  75                  80

Ala Thr Ala Ala Ser Lys His Arg Phe Leu Val Arg Arg Gln Leu
                85                  90                  95

His Ala Val Ser Pro His Pro Phe Lys Ile Met Ser Ser Pro Tyr Leu
            100                 105                 110

Ser Arg Gly Ser Lys Trp Arg Leu Phe Thr Glu Arg Phe Arg Lys Pro
        115                 120                 125

Val Val Ala Ser Gly Glu Glu Thr Val Thr Asp Phe Ile Thr Arg Arg
    130                 135                 140

Phe Asn Arg Glu Ile Ala Glu Tyr Val Phe Asp Pro Val Leu Ser Gly
145                 150                 155                 160

Ile Tyr Ala Gly Asn Pro Asp Gln Met Ser Ile Ala Glu Val Leu Pro
                165                 170                 175

Ala Leu Pro Arg Trp Glu Arg Glu Tyr Gly Ser Val Thr Lys Gly Leu
            180                 185                 190

Met Lys Asp Lys Gly Ala Met Gly Gly Arg Lys Ile Ile Ser Phe Lys
        195                 200                 205

Gly Gly Asn Gln Leu Leu Thr Asn Arg Leu Gln Gln Leu Leu Thr Thr
    210                 215                 220

Pro Val Arg Phe Asn Cys Lys Val Thr Gly Ile Thr Ala Ser Asn Gly
225                 230                 235                 240

Gly Tyr Ile Val Ser Ala Val Glu Asp Gly Val Ser Glu Ser Tyr Thr
                245                 250                 255

Ala Ser Arg Val Ile Leu Thr Thr Pro Ala Tyr Ser Ala Ala Thr
            260                 265                 270

Ile Thr Asn Leu Asp Ala Ala Thr Ala Ala Leu Leu Asn Glu Ile His
        275                 280                 285

Tyr Pro Arg Met Gly Val Leu His Leu Gly Phe Asp Ala Thr Ala Leu
    290                 295                 300

Pro Gln Pro Leu Asp Gly Phe Gly Phe Leu Val Pro Asn Ala Glu Asn
305                 310                 315                 320

Met His Phe Leu Gly Ala Ile Cys Asn Ala Ala Ile Phe Pro Asp Lys
                325                 330                 335

Ala Pro Pro Gly Lys Ile Leu Phe Thr Val Phe Leu Gly Gly Ala Arg
            340                 345                 350

Gln Glu Ser Leu Phe Asp Gln Met Thr Pro Glu Ala Leu Gln Gln Gln
        355                 360                 365

Val Val Ser Glu Val Met Ser Leu Leu His Leu Ser Ala Pro Pro Val
    370                 375                 380

Met Gln His Phe Ser Ser Trp Asn Lys Ala Ile Pro Gln Leu Asn Val
385                 390                 395                 400
```

```
Gly His Val Lys Leu Arg Arg Ala Val Glu Ala Phe Glu Lys Lys Tyr
            405                 410                 415
Pro Gly Ile His Leu Ser Gly Asn Tyr Leu Gln Gly Val Ala Ile Pro
            420                 425                 430
Ala Leu Leu Gln His Ala Ala Ala Leu Ala Ala Ser Leu Lys Lys Asn
            435                 440                 445
```

<210> SEQ ID NO 23
<211> LENGTH: 439
<212> TYPE: PRT
<213> ORGANISM: Xanthomonas campestris

<400> SEQUENCE: 23

```
Gln Pro Val Ile Ile Ala Gly Ala Gly Ile Ala Gly Leu Ser Ile Ala
1               5                   10                  15
Tyr Glu Leu Gln Gln Lys Gly Ile Pro Tyr Glu Ile Met Glu Ala Ser
            20                  25                  30
Ser Tyr Ala Gly Gly Val Val Lys Ser Leu His Ile Asp Gly Tyr Glu
        35                  40                  45
Leu Asp Ala Gly Pro Asn Ser Leu Ala Ala Ser Ala Ala Phe Met Ala
50                  55                  60
Tyr Ile Asp Gln Leu Gly Leu Gln Asp Gln Val Leu Glu Ala Ala Ala
65                  70                  75                  80
Ala Ser Lys Asn Arg Phe Leu Val Arg Asn Asp Lys Leu His Ala Val
                85                  90                  95
Ser Pro His Pro Phe Lys Ile Leu Gln Ser Ala Tyr Ile Ser Gly Gly
            100                 105                 110
Ala Lys Trp Arg Leu Phe Thr Glu Arg Phe Arg Lys Ala Ala Ala Pro
        115                 120                 125
Glu Gly Glu Thr Val Ser Ser Phe Val Thr Arg Arg Phe Gly Lys
    130                 135                 140
Glu Ile Asn Asp Tyr Leu Phe Glu Pro Val Leu Ser Gly Ile Tyr Ala
145                 150                 155                 160
Gly Asn Pro Asp Leu Met Ser Val Gly Glu Val Leu Pro Met Leu Pro
                165                 170                 175
Gln Trp Glu Gln Lys Tyr Gly Ser Val Thr Gln Gly Leu Leu Lys Asn
            180                 185                 190
Lys Gly Ala Met Gly Gly Arg Lys Ile Ile Ala Phe Lys Gly Gly Asn
        195                 200                 205
Ala Thr Leu Thr Asn Arg Leu Gln Ser Leu Leu Ser Gly Lys Ile Arg
    210                 215                 220
Phe Asn Cys Ala Val Thr Gly Val Thr Arg Gly Ala Asp Asp Tyr Ile
225                 230                 235                 240
Val Gln Tyr Thr Glu Asn Gly Asn Thr Met Leu Asn Ala Ser Arg
                245                 250                 255
Val Ile Phe Thr Thr Pro Ala Tyr Ser Thr Ala Val Ala Ile Gln Ala
            260                 265                 270
Leu Asp Ala Ser Leu Ala Thr His Leu Ser Asp Val Pro Tyr Pro Arg
        275                 280                 285
Met Gly Val Leu His Leu Gly Phe Gly Ala Glu Ala Arg Gln Lys Ala
    290                 295                 300
Pro Ala Gly Phe Gly Phe Leu Val Pro His Ala Ala Gly Lys His Phe
305                 310                 315                 320
Leu Gly Ala Ile Cys Asn Ser Ala Ile Phe Pro Ser Arg Val Pro Thr
                325                 330                 335
```

```
Gly Lys Val Leu Phe Thr Val Phe Leu Gly Ala Arg Gln Glu Gln
            340                 345                 350

Leu Phe Asp Gln Leu Gly Pro Glu Lys Leu Gln Gln Thr Val Val Lys
        355                 360                 365

Glu Leu Met Glu Leu Leu Gly Leu Thr Thr Pro Glu Met Gln Arg
370                 375                 380

Phe Ser Glu Trp Asn Arg Ala Ile Pro Gln Leu Asn Val Gly Tyr Ala
385                 390                 395                 400

Gln Thr Arg Gln Gln Ile Gly Val Phe Glu Gln Arg Tyr Pro Gly Ile
                405                 410                 415

Arg Leu Ala Gly Asn Tyr Val Thr Gly Val Ala Val Pro Ala Ile Ile
            420                 425                 430

Gln Ala Ala Lys Gly Tyr Cys
        435

<210> SEQ ID NO 24
<211> LENGTH: 445
<212> TYPE: PRT
<213> ORGANISM: Chitinophaga pinensis

<400> SEQUENCE: 24

Gln Pro Val Leu Ile Val Gly Ala Gly Leu Ser Gly Leu Ser Ile Ala
1               5                   10                  15

Tyr Glu Leu Gln Lys Leu Gln Val Pro Tyr Gln Val Leu Glu Val Ser
            20                  25                  30

Gly His Ser Gly Gly Val Met Lys Ser Leu Arg Lys Asp Gly Phe Glu
        35                  40                  45

Leu Asp Ala Gly Ala Asn Thr Ile Ala Ala Ser Pro Glu Ile Leu Ala
    50                  55                  60

Tyr Phe Thr Ser Leu Gly Leu Glu Asn Glu Ile Leu Gln Ala Thr Ala
65                  70                  75                  80

Ala Ser Lys His Arg Phe Leu Val Arg Arg Gln Leu His Ala Val
                85                  90                  95

Ser Pro His Pro Phe Lys Ile Met Ser Ser Pro Tyr Leu Ser Arg Gly
            100                 105                 110

Ser Lys Trp Arg Leu Phe Thr Glu Arg Phe Lys Pro Val Val Ala
        115                 120                 125

Ser Gly Glu Glu Thr Val Thr Asp Phe Ile Thr Arg Arg Phe Asn Arg
    130                 135                 140

Glu Ile Ala Glu Tyr Val Phe Asp Pro Val Leu Ser Gly Ile Tyr Ala
145                 150                 155                 160

Gly Asn Pro Asp Gln Met Ser Ile Ala Glu Val Leu Pro Ala Leu Pro
                165                 170                 175

Arg Trp Glu Arg Glu Tyr Gly Ser Val Thr Lys Gly Leu Met Lys Asp
            180                 185                 190

Lys Gly Ala Met Gly Gly Arg Lys Ile Ile Ser Phe Lys Gly Gly Asn
        195                 200                 205

Gln Leu Leu Thr Asn Arg Leu Gln Gln Leu Thr Thr Pro Val Arg
    210                 215                 220

Phe Asn Cys Lys Val Thr Gly Ile Thr Ala Ser Asn Gly Gly Tyr Ile
225                 230                 235                 240

Val Ser Ala Val Glu Asp Gly Val Ser Glu Ser Tyr Thr Ala Ser Arg
                245                 250                 255

Val Ile Leu Thr Thr Pro Ala Tyr Ser Ala Ala Ala Thr Ile Thr Asn
```

```
              260                 265                 270
Leu Asp Ala Ala Thr Ala Leu Leu Asn Glu Ile His Tyr Pro Arg
            275                 280                 285

Met Gly Val Leu His Leu Gly Phe Asp Ala Thr Ala Leu Pro Gln Pro
        290                 295                 300

Leu Asp Gly Phe Gly Phe Leu Val Pro Asn Ala Glu Asn Met His Phe
305                 310                 315                 320

Leu Gly Ala Ile Cys Asn Ala Ala Ile Phe Pro Asp Lys Ala Pro Pro
                325                 330                 335

Gly Lys Ile Leu Phe Thr Val Phe Leu Gly Gly Ala Arg Gln Glu Ser
            340                 345                 350

Leu Phe Asp Gln Met Thr Pro Glu Ala Leu Gln Gln Gln Val Val Ser
        355                 360                 365

Glu Val Met Ser Leu Leu His Leu Ser Ala Pro Pro Val Met Gln His
    370                 375                 380

Phe Ser Ser Trp Asn Lys Ala Ile Pro Gln Leu Asn Val Gly His Val
385                 390                 395                 400

Lys Leu Arg Arg Ala Val Glu Ala Phe Glu Lys Lys Tyr Pro Gly Ile
                405                 410                 415

His Leu Ser Gly Asn Tyr Leu Gln Gly Val Ala Ile Pro Ala Leu Leu
            420                 425                 430

Gln His Ala Ala Leu Ala Ala Ser Leu Lys Lys Asn
        435                 440                 445

<210> SEQ ID NO 25
<211> LENGTH: 448
<212> TYPE: PRT
<213> ORGANISM: Artificial Sequence
<220> FEATURE:
<223> OTHER INFORMATION: Recombinant

<400> SEQUENCE: 25

Met Ser Asp Gln Pro Val Leu Ile Val Gly Ala Gly Leu Ser Gly Leu
1               5                   10                  15

Ser Ile Ala Tyr Glu Leu Gln Lys Leu Gln Val Pro Tyr Gln Val Leu
            20                  25                  30

Glu Val Ser Gly His Ser Gly Gly Val Met Lys Ser Leu Arg Lys Asp
        35                  40                  45

Gly Phe Glu Leu Asp Ala Gly Ala Asn Thr Ile Ala Thr Ser Pro Glu
    50                  55                  60

Ile Leu Ala Tyr Phe Thr Ser Leu Gly Leu Glu Asn Glu Ile Leu Gln
65                  70                  75                  80

Ala Thr Ala Thr Ser Lys His Arg Phe Leu Val Arg Arg Gln Leu
                85                  90                  95

His Ala Val Ser Pro His Pro Phe Lys Ile Met Ser Ser Pro Tyr Leu
            100                 105                 110

Cys Arg Gly Ser Lys Trp Arg Leu Phe Thr Glu Arg Phe Arg Lys Pro
        115                 120                 125

Val Val Ala Ser Gly Glu Glu Thr Val Thr Asp Phe Ile Thr Arg Arg
    130                 135                 140

Phe Asn Arg Glu Ile Ala Glu Tyr Val Phe Asp Pro Val Leu Ser Gly
145                 150                 155                 160

Ile Tyr Ala Gly Asn Pro Asp Gln Met Ser Ile Ala Glu Val Leu Pro
                165                 170                 175

Ala Leu Pro Arg Trp Glu Arg Glu Tyr Gly Ser Val Thr Lys Gly Leu
```

```
            180                 185                 190
Met Lys Asp Lys Gly Ala Met Gly Gly Arg Lys Ile Ile Ser Phe Lys
            195                 200                 205
Gly Gly Asn Gln Leu Leu Thr Asn Arg Leu Gln Gln Leu Leu Thr Thr
            210                 215                 220
Pro Val Arg Phe Asn Cys Lys Val Thr Gly Ile Thr Ala Ser Asn Gly
225                 230                 235                 240
Gly Tyr Ile Val Ser Ala Val Glu Asp Gly Val Ser Glu Ser Tyr Thr
            245                 250                 255
Ala Ser Arg Val Ile Leu Thr Thr Pro Ala Tyr Ser Ala Ala Ala Thr
            260                 265                 270
Ile Thr Asn Leu Asp Ala Ala Thr Ala Ala Leu Leu Asn Glu Ile His
            275                 280                 285
Tyr Pro Arg Met Gly Val Leu His Leu Gly Phe Asp Ala Thr Ala Leu
            290                 295                 300
Pro Gln Pro Leu Asp Gly Phe Gly Phe Leu Val Pro Asn Ala Glu Asn
305                 310                 315                 320
Met His Phe Leu Gly Ala Ile Cys Asn Ala Ala Ile Phe Pro Asp Lys
            325                 330                 335
Ala Pro Pro Gly Lys Ile Leu Phe Thr Val Phe Leu Gly Gly Ala Arg
            340                 345                 350
Gln Glu Ser Leu Phe Asp Gln Met Thr Pro Glu Ala Leu Gln Gln Gln
            355                 360                 365
Val Val Ser Glu Val Met Ser Leu Leu His Leu Ser Ala Pro Pro Val
            370                 375                 380
Met Gln His Phe Ser Ser Trp Asn Lys Ala Ile Pro Gln Leu Asn Val
385                 390                 395                 400
Gly His Val Lys Leu Arg Arg Ala Val Glu Ala Phe Glu Lys Lys Tyr
            405                 410                 415
Pro Gly Ile His Leu Ser Gly Asn Tyr Leu Gln Gly Val Ala Ile Pro
            420                 425                 430
Ala Leu Leu Gln His Ala Ala Ala Leu Ala Ala Ser Leu Lys Lys Asn
            435                 440                 445

<210> SEQ ID NO 26
<211> LENGTH: 445
<212> TYPE: PRT
<213> ORGANISM: Artificial Sequence
<220> FEATURE:
<223> OTHER INFORMATION: Recombinant

<400> SEQUENCE: 26

Gln Pro Val Leu Ile Val Gly Ala Gly Leu Ser Gly Leu Ser Ile Ala
1               5                   10                  15
Tyr Glu Leu Gln Lys Leu Gln Val Pro Tyr Gln Val Leu Glu Val Ser
            20                  25                  30
Gly His Ser Gly Gly Val Met Lys Ser Leu Arg Lys Asp Gly Phe Glu
            35                  40                  45
Leu Asp Ala Gly Ala Asn Thr Ile Ala Thr Ser Pro Glu Ile Leu Ala
        50                  55                  60
Tyr Phe Thr Ser Leu Gly Leu Glu Asn Glu Ile Leu Gln Ala Thr Ala
65                  70                  75                  80
Thr Ser Lys His Arg Phe Leu Val Arg Arg Gln Leu His Ala Val
            85                  90                  95
Ser Pro His Pro Phe Lys Ile Met Ser Ser Pro Tyr Leu Cys Arg Gly
```

```
                100             105             110
Ser Lys Trp Arg Leu Phe Thr Glu Arg Phe Arg Lys Pro Val Val Ala
            115                 120                 125

Ser Gly Glu Glu Thr Val Thr Asp Phe Ile Thr Arg Arg Phe Asn Arg
            130                 135                 140

Glu Ile Ala Glu Tyr Val Phe Asp Pro Val Leu Ser Gly Ile Tyr Ala
145                 150                 155                 160

Gly Asn Pro Asp Gln Met Ser Ile Ala Glu Val Leu Pro Ala Leu Pro
                165                 170                 175

Arg Trp Glu Arg Glu Tyr Gly Ser Val Thr Lys Gly Leu Met Lys Asp
            180                 185                 190

Lys Gly Ala Met Gly Gly Arg Lys Ile Ile Ser Phe Lys Gly Gly Asn
            195                 200                 205

Gln Leu Leu Thr Asn Arg Leu Gln Gln Leu Leu Thr Thr Pro Val Arg
210                 215                 220

Phe Asn Cys Lys Val Thr Gly Ile Thr Ala Ser Asn Gly Gly Tyr Ile
225                 230                 235                 240

Val Ser Ala Val Glu Asp Gly Val Ser Glu Ser Tyr Thr Ala Ser Arg
                245                 250                 255

Val Ile Leu Thr Thr Pro Ala Tyr Ser Ala Ala Thr Ile Thr Asn
                260                 265                 270

Leu Asp Ala Ala Thr Ala Ala Leu Leu Asn Glu Ile His Tyr Pro Arg
            275                 280                 285

Met Gly Val Leu His Leu Gly Phe Asp Ala Thr Ala Leu Pro Gln Pro
            290                 295                 300

Leu Asp Gly Phe Gly Phe Leu Val Pro Asn Ala Glu Asn Met His Phe
305                 310                 315                 320

Leu Gly Ala Ile Cys Asn Ala Ala Ile Phe Pro Asp Lys Ala Pro Pro
                325                 330                 335

Gly Lys Ile Leu Phe Thr Val Phe Leu Gly Gly Ala Arg Gln Glu Ser
            340                 345                 350

Leu Phe Asp Gln Met Thr Pro Glu Ala Leu Gln Gln Gln Val Val Ser
            355                 360                 365

Glu Val Met Ser Leu Leu His Leu Ser Ala Pro Pro Val Met Gln His
370                 375                 380

Phe Ser Ser Trp Asn Lys Ala Ile Pro Gln Leu Asn Val Gly His Val
385                 390                 395                 400

Lys Leu Arg Arg Ala Val Glu Ala Phe Glu Lys Lys Tyr Pro Gly Ile
                405                 410                 415

His Leu Ser Gly Asn Tyr Leu Gln Gly Val Ala Ile Pro Ala Leu Leu
            420                 425                 430

Gln His Ala Ala Ala Leu Ala Ala Ser Leu Lys Lys Asn
            435                 440                 445

<210> SEQ ID NO 27
<211> LENGTH: 445
<212> TYPE: PRT
<213> ORGANISM: Artificial Sequence
<220> FEATURE:
<223> OTHER INFORMATION: Recombinant

<400> SEQUENCE: 27

Gln Pro Val Leu Ile Val Gly Ala Gly Leu Ser Gly Leu Ser Ile Ala
1               5                   10                  15

Tyr Glu Leu Gln Lys Leu Gln Val Pro Tyr Gln Val Leu Glu Val Ser
```

-continued

```
                20                  25                  30
Gly His Ser Gly Gly Val Met Lys Ser Leu Arg Lys Asp Gly Phe Glu
            35                  40                  45
Leu Asp Ala Gly Ala Asn Thr Ile Ala Thr Ser Pro Glu Ile Leu Ala
 50                  55                  60
Tyr Phe Thr Ser Leu Gly Leu Glu Asn Glu Ile Leu Gln Ala Thr Ala
 65                  70                  75                  80
Ala Ser Lys His Arg Phe Leu Val Arg Arg Gln Leu His Ala Val
                85                  90                  95
Ser Pro His Pro Phe Lys Ile Met Ser Ser Pro Tyr Leu Ser Arg Gly
            100                 105                 110
Ser Lys Trp Arg Leu Phe Thr Glu Arg Phe Lys Pro Val Val Ala
            115                 120                 125
Ser Gly Glu Glu Thr Val Thr Asp Phe Ile Thr Arg Arg Phe Asn Arg
            130                 135                 140
Glu Ile Ala Glu Tyr Val Phe Asp Pro Val Leu Ser Gly Ile Tyr Ala
145                 150                 155                 160
Gly Asn Pro Asp Gln Met Ser Ile Ala Glu Val Leu Pro Ala Leu Pro
                165                 170                 175
Arg Trp Glu Arg Glu Tyr Gly Ser Val Thr Lys Gly Leu Met Lys Asp
                180                 185                 190
Lys Gly Ala Met Gly Gly Arg Lys Ile Ile Ser Phe Lys Gly Gly Asn
            195                 200                 205
Gln Leu Leu Thr Asn Arg Leu Gln Gln Leu Leu Thr Thr Pro Val Arg
            210                 215                 220
Phe Asn Cys Lys Val Thr Gly Ile Thr Ala Ser Asn Gly Gly Tyr Ile
225                 230                 235                 240
Val Ser Ala Val Glu Asp Gly Val Ser Glu Ser Tyr Thr Ala Ser Arg
                245                 250                 255
Val Ile Leu Thr Thr Pro Ala Tyr Ser Ala Ala Thr Ile Thr Asn
                260                 265                 270
Leu Asp Ala Ala Thr Ala Ala Leu Leu Asn Glu Ile His Tyr Pro Arg
            275                 280                 285
Met Gly Val Leu His Leu Gly Phe Asp Ala Thr Ala Leu Pro Gln Pro
            290                 295                 300
Leu Asp Gly Phe Gly Phe Leu Val Pro Asn Ala Glu Asn Met His Phe
305                 310                 315                 320
Leu Gly Ala Ile Cys Asn Ala Ala Ile Phe Pro Asp Lys Ala Pro Pro
                325                 330                 335
Gly Lys Ile Leu Phe Thr Val Phe Leu Gly Gly Ala Arg Gln Glu Ser
            340                 345                 350
Leu Phe Asp Gln Met Thr Pro Glu Ala Leu Gln Gln Val Val Ser
            355                 360                 365
Glu Val Met Ser Leu Leu His Leu Ser Ala Pro Val Met Gln His
            370                 375                 380
Phe Ser Ser Trp Asn Lys Ala Ile Pro Gln Leu Asn Val Gly His Val
385                 390                 395                 400
Lys Leu Arg Arg Ala Val Glu Ala Phe Glu Lys Lys Tyr Pro Gly Ile
                405                 410                 415
His Leu Ser Gly Asn Tyr Leu Gln Gly Val Ala Ile Pro Ala Leu Leu
            420                 425                 430
Gln His Ala Ala Ala Leu Ala Ala Ser Leu Lys Lys Asn
            435                 440                 445
```

-continued

```
<210> SEQ ID NO 28
<211> LENGTH: 445
<212> TYPE: PRT
<213> ORGANISM: Artificial Sequence
<220> FEATURE:
<223> OTHER INFORMATION: Recombinant

<400> SEQUENCE: 28

Gln Pro Val Leu Ile Val Gly Ala Gly Leu Ser Gly Leu Ser Ile Ala
1               5                   10                  15

Tyr Glu Leu Gln Lys Leu Gln Val Pro Tyr Gln Val Leu Glu Val Ser
            20                  25                  30

Gly His Ser Gly Gly Val Met Lys Ser Leu Arg Lys Asp Gly Phe Glu
        35                  40                  45

Leu Asp Ala Gly Ala Asn Thr Ile Ala Thr Ser Pro Glu Ile Leu Ala
    50                  55                  60

Tyr Phe Thr Ser Leu Gly Leu Glu Asn Glu Ile Leu Gln Ala Thr Ala
65                  70                  75                  80

Thr Ser Lys His Arg Phe Leu Val Arg Arg Gln Leu His Ala Val
                85                  90                  95

Ser Pro His Pro Phe Lys Ile Met Ser Ser Pro Tyr Leu Cys Arg Gly
            100                 105                 110

Ser Lys Trp Arg Leu Phe Thr Glu Arg Phe Arg Lys Pro Val Val Ala
        115                 120                 125

Ser Gly Glu Glu Thr Val Thr Asp Phe Ile Thr Arg Arg Phe Asn Arg
    130                 135                 140

Glu Ile Ala Glu Tyr Val Phe Asp Pro Val Leu Ser Gly Ile Tyr Ala
145                 150                 155                 160

Gly Asn Pro Asp Gln Met Ser Ile Ala Glu Val Leu Pro Ala Leu Pro
                165                 170                 175

Arg Trp Glu Arg Glu Tyr Gly Ser Val Thr Lys Gly Leu Met Lys Asp
            180                 185                 190

Lys Gly Ala Met Gly Gly Arg Lys Ile Ile Ser Phe Lys Gly Gly Asn
        195                 200                 205

Gln Leu Leu Thr Asn Arg Leu Gln Gln Leu Leu Thr Thr Pro Val Arg
    210                 215                 220

Phe Asn Cys Lys Val Thr Gly Ile Thr Ala Ser Asn Gly Gly Tyr Ile
225                 230                 235                 240

Val Ser Ala Val Glu Asp Gly Val Ser Glu Ser Tyr Thr Ala Ser Arg
                245                 250                 255

Val Ile Leu Thr Thr Pro Ala Tyr Ser Ala Ala Thr Ile Thr Asn
            260                 265                 270

Leu Asp Ala Ala Thr Ala Ala Leu Asn Glu Ile His Tyr Pro Arg
        275                 280                 285

Met Gly Val Leu His Leu Gly Phe Asp Ala Thr Ala Leu Pro Gln Pro
    290                 295                 300

Leu Asp Gly Phe Gly Phe Leu Val Pro Asn Ala Glu Asn Met His Phe
305                 310                 315                 320

Leu Gly Ala Ile Cys Asn Ala Ala Ile Phe Pro Asp Lys Ala Pro Pro
                325                 330                 335

Gly Lys Ile Leu Phe Thr Val Phe Leu Gly Gly Ala Arg Gln Glu Ser
            340                 345                 350

Leu Phe Asp Gln Met Thr Pro Glu Ala Leu Gln Gln Val Val Ser
        355                 360                 365
```

Glu Val Met Ser Leu Leu His Leu Ser Ala Pro Val Met Gln His
    370                 375                 380

Phe Ser Ser Trp Asn Lys Ala Ile Pro Gln Leu Asn Val Gly His Val
385                 390                 395                 400

Lys Leu Arg Arg Ala Val Glu Ala Phe Glu Lys Lys Tyr Pro Gly Ile
                405                 410                 415

His Leu Ser Gly Asn Tyr Leu Gln Gly Val Ala Ile Thr Ala Leu Leu
            420                 425                 430

Gln His Ala Ala Ala Leu Ala Ala Ser Leu Lys Lys Asn
        435                 440                 445

<210> SEQ ID NO 29
<211> LENGTH: 445
<212> TYPE: PRT
<213> ORGANISM: Artificial Sequence
<220> FEATURE:
<223> OTHER INFORMATION: Recombinant

<400> SEQUENCE: 29

Gln Pro Val Leu Ile Val Gly Ala Gly Leu Ser Gly Leu Ser Ile Ala
1               5                   10                  15

Tyr Glu Leu Gln Lys Leu Gln Val Pro Tyr Gln Val Leu Glu Val Ser
            20                  25                  30

Gly His Ser Gly Gly Val Met Lys Ser Leu Arg Lys Asp Gly Phe Glu
        35                  40                  45

Leu Asp Ala Gly Ala Asn Thr Ile Ala Thr Ser Pro Glu Ile Leu Ala
    50                  55                  60

Tyr Phe Thr Ser Leu Gly Leu Glu Asn Glu Ile Leu Gln Ala Thr Ala
65                  70                  75                  80

Thr Ser Lys His Arg Phe Leu Val Arg Arg Gln Leu His Ala Val
                85                  90                  95

Ser Pro His Pro Phe Lys Ile Met Ser Ser Pro Tyr Leu Cys Arg Gly
            100                 105                 110

Ser Lys Trp Arg Leu Phe Thr Glu Arg Phe Arg Lys Pro Val Val Ala
        115                 120                 125

Ser Gly Glu Glu Thr Val Thr Asp Phe Ile Thr Arg Arg Phe Asn Arg
    130                 135                 140

Glu Ile Ala Glu Tyr Val Phe Asp Pro Val Leu Ser Gly Ile Tyr Ala
145                 150                 155                 160

Gly Asn Pro Asp Gln Met Ser Ile Ala Glu Val Leu Pro Ala Leu Pro
                165                 170                 175

Arg Trp Glu Arg Glu Tyr Gly Ser Val Thr Lys Gly Leu Met Lys Asp
            180                 185                 190

Lys Gly Ala Met Gly Gly Arg Lys Ile Ile Ser Phe Lys Gly Gly Asn
        195                 200                 205

Gln Leu Leu Thr Asn Arg Leu Gln Gln Leu Leu Thr Thr Pro Val Arg
    210                 215                 220

Phe Asn Tyr Lys Val Thr Gly Ile Thr Ala Ser Asn Gly Gly Tyr Ile
225                 230                 235                 240

Val Ser Ala Val Glu Asp Gly Val Ser Glu Ser Tyr Thr Ala Ser Arg
                245                 250                 255

Val Ile Leu Thr Thr Pro Ala Tyr Ser Ala Ala Thr Ile Thr Asn
            260                 265                 270

Leu Asp Ala Ala Thr Ala Ala Leu Leu Asn Glu Ile His Tyr Pro Arg
    275                 280                 285

```
Met Gly Val Leu His Leu Gly Phe Asp Ala Thr Ala Leu Pro Gln Pro
    290                 295                 300

Leu Asp Gly Phe Gly Phe Leu Val Pro Asn Ala Glu Asn Met His Phe
305                 310                 315                 320

Leu Gly Ala Ile Cys Asn Ala Ala Ile Phe Pro Asp Lys Ala Pro Pro
                325                 330                 335

Gly Lys Ile Leu Phe Thr Val Phe Leu Gly Gly Ala Arg Gln Glu Ser
                340                 345                 350

Leu Phe Asp Gln Met Thr Pro Glu Ala Leu Gln Gln Gln Val Val Ser
            355                 360                 365

Glu Val Met Ser Leu Leu His Leu Ser Ala Pro Pro Val Met Gln His
            370                 375                 380

Phe Ser Ser Trp Asn Lys Ala Ile Pro Gln Leu Asn Val Gly His Val
385                 390                 395                 400

Lys Leu Arg Arg Ala Val Glu Ala Phe Glu Lys Lys Tyr Pro Gly Ile
                405                 410                 415

His Leu Ser Gly Asn Tyr Leu Gln Gly Val Ala Ile Pro Ala Leu Leu
                420                 425                 430

Gln His Ala Ala Ala Leu Ala Ala Ser Leu Lys Lys Asn
                435                 440                 445

<210> SEQ ID NO 30
<211> LENGTH: 68
<212> TYPE: PRT
<213> ORGANISM: Arabidopsis thalinana

<400> SEQUENCE: 30

Met Ala Thr Ala Thr Thr Thr Ala Thr Ala Ala Phe Ser Gly Val Val
1               5                   10                  15

Ser Val Gly Thr Glu Thr Arg Arg Ile Tyr Ser Phe Ser His Leu Gln
                20                  25                  30

Pro Ser Ala Ala Phe Pro Ala Lys Pro Ser Ser Phe Lys Ser Leu Lys
            35                  40                  45

Leu Lys Gln Ser Ala Arg Leu Thr Arg Arg Leu Asp His Arg Pro Phe
        50                  55                  60

Val Val Arg Cys
65

<210> SEQ ID NO 31
<211> LENGTH: 68
<212> TYPE: PRT
<213> ORGANISM: Artificial Sequence
<220> FEATURE:
<223> OTHER INFORMATION: Recombinant

<400> SEQUENCE: 31

Met Ala Ser Ser Thr Thr Thr Ala Thr Ala Ala Phe Ser Gly Val Val
1               5                   10                  15

Ser Val Gly Thr Glu Thr Arg Arg Ile Tyr Ser Phe Ser His Leu Gln
                20                  25                  30

Pro Ser Ala Ala Phe Pro Ala Lys Pro Ser Ser Phe Lys Ser Leu Lys
            35                  40                  45

Leu Lys Gln Ser Ala Arg Leu Thr Arg Arg Leu Asp His Arg Pro Phe
        50                  55                  60

Val Val Arg Cys
65
```

```
<210> SEQ ID NO 32
<211> LENGTH: 61
<212> TYPE: PRT
<213> ORGANISM: Arabidopsis thalinana

<400> SEQUENCE: 32

Met Ala Pro Ala Leu Ser Arg Ser Leu Tyr Thr Ser Pro Leu Thr Ser
1               5                  10                  15

Val Pro Ile Thr Pro Val Ser Ser Arg Leu Ser His Leu Arg Ser Ser
                20                  25                  30

Phe Leu Pro His Gly Gly Ala Leu Arg Thr Gly Val Ser Cys Ser Trp
            35                  40                  45

Asn Leu Glu Lys Arg Cys Asn Arg Phe Ala Val Lys Cys
        50                  55                  60
```

US 11,758,907 B2

METHOD FOR CONTROLLING HARMFUL ORGANISMS IN CROPS

This is a national stage application of PCT/JP2017/045677, the contents of which is incorporated herein in its entirety.

INCORPORATION OF SEQUENCE LISTING

The sequence listing that is contained in the file named SCC_SEQ-list.txt, which is 68 KB (measured in MS-WINDOWS) and created on Aug. 31, 2017, is filed herewith by electronic submission and incorporated herein by reference.

TECHNICAL FIELD

The present invention relates to a method for controlling harmful organisms in crops, in other words, harmful anthropods, nematodes, plant pathogens, and/or weeds, and a herbicide composition used for the method. For example, the present invention relates to a method for controlling weeds in crops, wherein the crops are the transgenic plant body or seeds that are tolerant to the protoporphyrinogen oxidase (PPO) inhibitors, and a herbicide composition used for the method. Also, the present invention relates to a method for controlling weeds in crops, wherein the crops are the transgenic plant body or seeds having specific gene sequences.

BACKGROUND ART

Various compounds are known as active ingredients of an insecticide, a nematicide, a fungicide, or a herbicide. Further, ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate and flumioxazin are known as an active component of a herbicide (see Patent Document 1 and Non-Patent Documents 1 and 2).

CITATION LIST

Patent Literature

[Patent Document 1] U.S. Pat. No. 6,537,948

Non Patent Literature

[Non-Patent Document 1] Compendium of Pesticide Common Names (http://www.alanwood.net/pesticides/)
[Non-Patent Document 2] The Pesticide Manual, 13th ed., British Crop Protection Council, p. 461-462 (2003)).

SUMMARY OF INVENTION

Problems to be Solved by Invention

An object of the present invention is to provide an excellently effective method for controlling harmful organisms (including weeds) in a cultivation area of crops. An object of the present invention is also to provide an excellently effective method for controlling harmful organism (including weeds) in a cultivation area of crops, wherein the crops are the transgenic plant body or seeds that are tolerant to the protoporphyrinogen oxidase (PPO) inhibitors. An object of the present invention is further to provide an excellently effective method for controlling harmful organism (including weeds) in a cultivation area of crops, wherein the crops are the transgenic plant body or seeds having specific gene sequences.

Means to Solve Problems

The present invention relates to a method for controlling weeds by treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing crop seeds; and a method for controlling harmful organisms generated in a cultivation area by treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing the crop seeds treated with one or more compounds selected from the group consisting of an insecticidal compound, a nematicidal compound, and a fungicidal compound and the like, and by combining a foliage treatment of one or more compounds selected from the group consisting of an insecticidal compound, a nematicidal compound, a fungicidal compound and the like, and a herbicide compound. Further, the present invention relates to a method for controlling weeds by treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing crop seeds, wherein the crops are the transgenic plant body or seeds that are tolerant to the protoporphyrinogen oxidase (PPO) inhibitors; and a method for controlling harmful organisms generated in a cultivation area by treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing the crop seeds treated with one or more compounds selected from the group consisting of an insecticidal compound, a nematicidal compound, and a fungicidal compound and the like, and by combining a foliage treatment of one or more compounds selected from the group consisting of an insecticidal compound, a nematicidal compound, a fungicidal compound and the like, and a herbicide compound, wherein the crops are the transgenic plant body or seeds that are tolerant to the protoporphyrinogen oxidase (PPO) inhibitors. Furthermore, the present invention relates to a method for controlling weeds by treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing crop seeds, wherein the crops are the transgenic plant body or seeds having specific gene sequences; and a method for controlling harmful organisms generated in a cultivation area by treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing the crop seeds treated with one or more compounds selected from the group consisting of an insecticidal compound, a nematicidal compound, and a fungicidal compound and the like, and by combining a foliage treatment of one or more compounds selected from the group consisting of an insecticidal compound, a nematicidal compound, a fungicidal compound and the like, and a herbicide compound, wherein the crops are the transgenic plant body or seeds having specific gene sequences.

The present invention includes the followings.

[1] A method for controlling weeds, comprising a step of treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing crop seeds.

[2] The method according to [1] wherein the crops are the transgenic plant body or seeds that are tolerant to the protoporphyrinogen oxidase (PPO) inhibitors.

[3] The method according to [2] wherein the crops are the transgenic plant body or seeds having any one of a polypeptide sequence selected from the group consisting of SEQ ID Nos. 1-32 or a polypeptide sequence having at least 85% sequence identity to any one of SEQ ID Nos. 1-32.

[4] A method for controlling harmful organisms in a cultivation area of crops, comprising the steps of: (1) treating crop seeds with one or more compounds selected from compound group A; (2) treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before, simultaneously with, and/or after sowing the crop seeds obtained by the above step; and (3) performing a foliage treatment on crops with one or more compounds selected from compound group B during a growing period of the crops, Compound group A: the group consisting of a neonicotinoid compound, a diamide compound, a carbamate compound, an organic phosphorus compound, a biological nematicidal compound, other insecticidal compounds and nematicidal compounds, an azole compound, a strobilurin compound, a metalaxyl compound, an SDHI compound, and other fungicidal compounds and plant growth regulators, Compound group B: the group consisting of a strobilurin compound, an azole compound, an SDHI compound, other fungicidal compounds, a pyrethroid compound, a benzoylphenylurea compound, an organic phosphorus insecticidal compound, a neonicotinoid compound, and a diamide compound.

[5] The method according to [4] wherein the crops are the transgenic plant body or seeds that are tolerant to the protoporphyrinogen oxidase (PPO) inhibitors.

[6] The method according to [5] wherein the crops are the transgenic plant body or seeds having any one of a polypeptide sequence selected from the group consisting of SEQ ID Nos. 1-32 or a polypeptide sequence having at least 85% sequence identity to any one of SEQ ID Nos. 1-32.

[7] The control method according to any one of [4] to [6], wherein one or more compounds selected from the compound group A is one or more compounds selected from the group consisting of the following compounds, Neonicotinoid compounds: clothianidin, thiamethoxam, imidacloprid, dinotefuran, nitenpyram, triflumezopyrim, dicloromezotiaz, sulfoxaflor, flupyradifurone, acetamiprid, and thiacloprid;

Diamide compounds: flubendiamide, chlorantraniliprole, cyantraniliprole, cyclaniliprole, broflanilide, cyhalodiamide, and tetraniliprole;

Carbamate compounds: aldicarb, oxamyl, thiodicarb, carbofuran, carbosulfan, and dimethoate;

Organic phosphorus compounds: fenamiphos, imicyafos, fensulfothion, terbufos, fosthiazate, phosphocarb, dichlofenthion, isamidofos, isazophos, ethoprophos, cadusafos, chlorpyrifos, heterofos, mecarphon, phorate, thionazin, triazophos, diamidafos, fosthietan, and phosphamidon;

Biological nematicidal compounds: Harpin Protein, *Pasteuria nishizawae, Pasteuria penetrans, Pasteuria usage, Myrothecium verrucaria, Burkholderia cepacia, Bacillus chitonosporus, Paecilomyces lilacinus, Bacillus amyloliquefaciens, Bacillus firmus, Bacillus subtilis, Bacillus pumulus, Trichoderma harzianum, Hirsutella rhossiliensis, Hirsutella minnesotensis, Verticillium chlamydosporum*, and *Arthrobotrys dactyloides*; Other insecticidal compounds and nematicidal compounds: fipronil, ethiprole, beta-cyfluthrin, tefluthrin, chlorpyrifos, abamectin, spirotetramat, tioxazafen, fluazaindolizine, fluensulfone, and fluxametamide;

Azole compounds: azaconazole, bitertanol, bromuconazole, cyproconazole, difenoconazole, diniconazole, epoxyconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimenol, triticonazole, fenarimol, nuarimol, pyrifenox, imazalil, oxpoconazole fumarate, pefurazoate, prochloraz, triflumizole, ipfentrifluconazole, and mefentrifluconazole;

Strobilurin compounds: kresoxim-methyl, azoxystrobin, trifloxystrobin, fluoxastrobin, picoxystrobin, pyraclostrobin, dimoxystrobin, pyribencarb, metominostrobin, orysastrobin, and mandestrobin;

Metalaxyl compounds: metalaxyl and metalaxyl-M;

SDHI compounds: sedaxane, penflufen, carboxin, boscalid, furametpyr, flutolanil, fluxapyroxad, isopyrazam, fluopyram, isofetamid, pyraziflumid, pydiflumetofen, fluindapyr, N-(1,1,3-trimethylindan-4-yl)-1-methyl-3-difluoromethylpyrazole-4-carboxamide (including a racemic body or an enantiomer and a mixture of an R enantiomer and an S enantiomer at an optional mixing ratio, and a compound, rich in R enantiomer, in which the ratio of the R enantiomer to the S enantiomer is 80:20 or greater), and tifluzamide;

Other fungicidal compounds: tolclofos-methyl, thiram, captan, carbendazim, thiophanate-methyl, mancozeb, thiabendazole, isotianil, ethaboxam, picarbutrazox, oxathiapiprolin, and triazoxide;

Plant growth regulators: ethephon, chlormequat-chloride, mepiquat-chloride, and 4-oxo-4-(2-phenylethyl)aminobutyric acid.

[8] The control method according to any one of [1] to [7], wherein one or more compounds selected from the compound group B is one or more compounds selected from the group consisting of the following compounds, Strobilurin compounds: pyraclostrobin, azoxystrobin, mandestrobin, trifloxystrobin, and picoxystrobin;

Azole compounds: prothioconazole, epoxyconazole, tebuconazole, cyproconazole, propiconazole, metconazole, bromuconazole, tetraconazole, triticonazole, ipfentrifluconazole, and mefentrifluconazole;

SDHI compounds: benzobindiflupyr, bixafen, fluxapyroxad, fluindapyr, and N-(1,1,3-trimethylindan-4-yl)-1-methyl-3-difluoromethylpyrazole-4-carboxamide (including a racemic body or an enantiomer and a mixture of an R enantiomer and an S enantiomer at an optional mixing ratio, and a compound, rich in R enantiomer, in which the ratio of the R enantiomer to the S enantiomer is 80:20 or greater), and thifluzamide;

Other fungicidal compounds: tolclofos-methyl and ethaboxam;

Pyrethroid compounds: bifenthrin, lambda-cyhalothrin, gamma-cyhalothrin, cypermethrin, fenpropathrin, etofenprox, silafluofen, and esfenvalerate;

Benzoylphenylurea compound: teflubenzuron and triflumuron;

Organic phosphorus insecticidal compounds: acephate and methomyl;

Neonicotinoid compounds: imidacloprid, clothianidin, thiamethoxam, sulfoxaflor, flupyradifurone, triflumezopyrim, and dicloromezotiaz;

Diamide compounds: flubendiamide, chlorantraniliprole, cyantraniliprole, broflanilide, tetraniliprole, and cyhalodiamide.

[9] The control method according to any one of [1] to [6], wherein the cultivation area of crops is treated with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin before sowing the crop seeds.

[10] The control method according to any one of [1] to [6], wherein the cultivation area of crops is treated with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin simultaneously with sowing the crop seeds.

[11] The control method according to any one of [1] to [6], wherein the cultivation area of crops is treated with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate or flumioxazin after sowing the crop seeds.

[12] The control method according to any one of [4] to [11], wherein the harmful organisms are weeds and/or anthropods and/or plant pathogens.

[13] The control method according to any one of [4] to [11], wherein the harmful organisms are weeds.

[14] The control method according to any one of [4] to [13],
wherein the crops are selected from the group consisting of soybeans, corn, cotton, rapeseed, rice, wheat, barley, sugarcane, sugar beet, sorghum, and sunflower.

Effect of the Invention

Harmful organisms in a cultivation area of crops can be controlled by performing the method for controlling harmful organisms of the present invention. Also, harmful organisms in a cultivation area of crops wherein the crops are the transgenic plant body or seeds that are tolerant to the protoporphyrinogen oxidase (PPO) inhibitors, or in other words, the crops are the transgenic plant body or seeds having specific gene sequences, can be controlled by performing the method for controlling harmful organisms of the present invention.

BEST MODE FOR CARRYING OUT THE INVENTION

The method for controlling weeds of the present invention comprises a step of treating a cultivation area of crops with ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate (hereinafter, referred to as a compound X) or flumioxazin before, simultaneously with, and/or after sowing crop seeds.

The method for controlling harmful organisms of the present invention (hereinafter, referred to as the present method for controlling harmful organisms) comprises the steps (1) treating crop seeds with one or more compounds selected from the compound group A (hereinafter, also referred to as a step (1)); (2) treating a cultivation area of crops with the compound X or flumioxazin before, simultaneously with, and/or after sowing the crop seeds obtained by the above-described step (hereinafter, referred to as a step (2)); and (3) performing a foliage treatment on crops with one or more compounds selected from the compound group B during a growing period of the crops (hereinafter, referred to as a step (3)).

The compound X is a known compound and is represented by Formula (I). The compound X can be produced using known methods such as a method described in U.S. Pat. No. 6,537,948. Flumioxazin is also a known compound as an active ingredient of herbicides, for example, as described in The Pesticide Manual, 13th ed., British Crop Protection Council, p. 461-462 (2003).

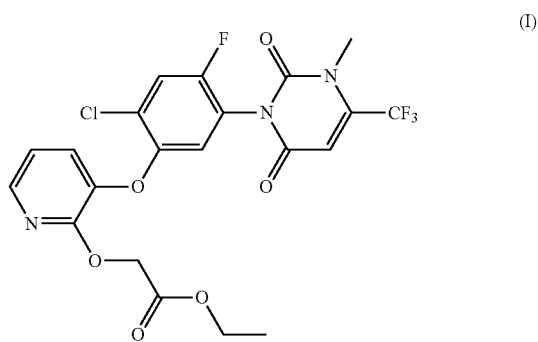 [SMILES: CCOC(=O)COc1ncccc1Oc1cc(-n2c(=O)cc(C(F)(F)F)n(C)c2=O)c(F)cc1Cl]

In the present invention, the crops are not limited as long as the crops are a type which can usually be cultivated as crops, and examples thereof include corn, cotton, rapeseed, rice, wheat, barley, sugarcane, sugar beet, sorghum, peanuts, and sunflower.

Examples of such crops include crops to which resistance to a PPO inhibitor such as ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate and flumioxazin; a 4-hydroxyphenylpyruvate dioxygenase inhibitor such as isoxaflutole; an acetolactate synthase (hereinafter, abbreviated as ALS) inhibitor such as imizethapyr and thifensulfuron-methyl; a 5-enolpyruvylshikimate 3-phosphate synthase (hereinafter, abbreviated as EPSP) inhibitor such as glyphosate; a glutamine synthase inhibitor such as glufosinate; an auxin type herbicide; an acetyl CoA carboxylase (hereinafter, abbreviated as ACCase) inhibitor such as sethoxydim; and a PSII inhibitor such as bromoxynil, is imparted by a classical breeding method, genome editing, or a recombinant DNA technology.

Examples of the crops to which resistance is imparted by a classical breeding method include STS soybeans having resistance to a sulfonylurea ALS inhibiting herbicide such as thifensulfuron-methyl. Similarly, examples of the crops to which resistance is imparted by a classical breeding method include rice, wheat, corn, rapeseed, and sunflower having resistance to an imidazolinone ALS inhibitor, and these are already commercially available under the product names of Clearfield (registered trademark) and Express (registered trademark). Similarly, examples of the crops to which resistance is imparted by a classical breeding method include corn and rice which are resistant to an ACCase inhibitor under the product names of PoastProtected (registered trademark) and Provisia (registered trademark). Similarly, examples of the crops to which resistance is imparted by a classical breeding method include Triazine Tolerant rapeseed having resistance to a PSII inhibitor.

Further, examples of the crops to which resistance is imparted by a recombinant DNA technology include soybeans, corn, cotton, and rapeseed having resistance to glyphosate, and these are already commercially available under the product names of RoundupReady (registered trademark) and Gly-Tol (registered trademark). Similarly, examples of the crops to which resistance is imparted by a recombinant DNA technology include soybeans having resistance to glufosinate, and these are already commercially available under the product name of LibertyLink (registered trademark). Other examples of the crops to which resistance is imparted by a recombinant DNA technology include soybeans and corn which have resistance to both of glyphosate and an ALS inhibitor, and these are being developed under the product names of Optimum GAT (registered trademark).

Similarly, other examples of the crops to which resistance is imparted by introducing a nucleotide sequence encoding chloroplast transit peptide of APG6 (derived from *Arabidopsis thaliana*) and a nucleotide sequence encoding a protein that has at least 70% sequence identity to any one of a polypeptide sequence selected from the group consisting of SEQ ID NOs: 1-32 include soybeans, corns, cottons and rapeseeds (see International Publication No. WO 2017/023778, International Publication No. WO 2017/039969, and International Publication No. WO 2017/112589). Here, the present invention includes at least 70% sequence identity, 80% sequence identity, 85% sequence identity, 90% sequence identity, 95% sequence identity, 96% sequence identity, 97% sequence identity, 98% sequence identity, and 99% sequence identity to any one of the SEQ ID NOs: 1-29. SEQ ID NOs: 1-20 as descried herein correspond to SEQ ID NOs: 1-20 described in International Publication No. WO 2017/023778, and SEQ ID NOs: 21-29 as descried herein correspond to SEQ ID NOs: 1-2 and 6-12 that are described in International Publication No. WO 2017/039969, and SEQ ID NOs: 30-32 as described herein correspond to SEQ ID NOs: 1-3 that are described in International Publication No. WO 2017/112589.

Similarly, other examples of the crops to which resistance is imparted by a recombinant DNA technology include soybeans having resistance to an imidazolinone ALS inhibitor and these soybeans have been developed under the product name of Cultivance.

Crops having resistance to an aryloxyphenoxy herbicide such as quizalofop, haloxyfop, fluazifop, diclofop, fenoxaprop, metamifop, cyhalofop, or clodinafop can be produced by introducing a gene encoding aryloxyalkanoate dioxygenase, and examples of such crops include soybeans which are being developed under the product name of Enlist (registered trademark).

Examples of the above-described crops include crops which are capable of synthesizing selective toxins that are known as genus *bacillus* using a recombinant DNA technology.

Examples of toxins expressed by such genetically modified crops include insecticidal proteins derived from *Bacillus cereus* or *Bacillus popilliae*; δ-endotoxin such as Cry1Ab, Cry1Ac, Cry1F, Cry1Fa2, Cry2Ab, Cry3A, Cry3Bb1, or Cry9C derived from *Bacillus thuringiensis*; insecticidal proteins such as VIP1, VIP2, VIP3, or VIP3A; insecticidal proteins derived from nematodes; toxins produced by animals such as scorpion toxins, spider toxins, bee toxins, or insect-specific neurotoxins; mould fungi toxins; plant lectin; agglutinin; a protease inhibitor such as a trypsin inhibitor, a serine protease inhibitor, patatin, cystatin, or a papain inhibitor; ribosome inactivating protein (RIP) such as lysine, corn-RIP, abrin, ruffin, saporin, or briodin; a steroid metabolizing enzyme such as 3-hydroxysteroid oxidase, ecdysteroid-UDP-glycosyltransferase, or cholesterol oxidase; an ecdysone inhibitor; HMG-CoA reductase; an ion channel inhibitor such as a sodium channel or a calcium channel inhibitor; juvenile hormone esterase; a diuretic hormone receptor; stilbene synthase; bibenzyl synthase; chitinase; and glucanase.

Further, examples of toxins expressed by such genetically modified crops also include δ-endotoxin proteins such as Cry1Ab, Cry1Ac, Cry1F, Cry1Fa2, Cry2Ab, Cry3A, Cry3Bb1, Cry9C, Cry34Ab, or Cry35Ab; hybrid toxins of insecticidal proteins such as VIP1, VIP2, VIP3, or VIP3A; partially defected toxins; and modified toxins. Hybrid toxins are produced by a new combination of different domains of these proteins using a recombination technology. As partially defected toxins, Cry1Ab in which a part of the amino acid sequence is defected is known. One or a plurality of amino acids of natural toxins are substituted in the modified toxins. Examples of these toxins and the recombinant DNA crops which are capable of synthesizing these toxins are described in EP-A-0374753, WO93/07278, WO95/34656, EP-A-0427529, EP-A-451878, WO03/052073, and the like. The toxins contained in these recombinant DNA crops impart, to the crops, resistance to coleopteran pests, diptera pests, and lepidoptera insect pests.

Further, recombinant DNA crops which contain insecticidal genes having resistance to one or a plurality of pests and express one or a plurality of toxins have already been known and some of them are commercially available. Examples of these recombinant DNA crops include Intacta (registered trademark). Examples of crops used in the present invention also include crops such as soybeans to which Rag1 (Resistance Aphid Gene 1) genes are introduced to which resistance to aphids is imparted. Further, examples of the crops used in the present invention include crops to which resistance to nematodes is imparted using a classical breeding method or a recombinant DNA technology. As the recombinant DNA technology used for imparting resistance to nematodes, RNAi is exemplified.

Examples of the above-described crops include crops to which ability for producing anti-pathogenic substances having a selective action is imparted using a recombinant DNA technology. As examples of the anti-pathogenic substances, PR proteins and the like have been known (PRPs, EP-A-0392225). The anti-pathogenic substances and the recombinant DNA crops producing the anti-pathogenic substances are described in EP-A-0392225, WO95/33818, and EP-A-0353191. Examples of the anti-pathogenic substances expressed in such recombinant DNA crops include ion channel inhibitors such as a sodium channel inhibitor and a calcium channel inhibitor (toxins such as KP1, KP4, and KP6 produced by viruses are known); stilbene synthase; bibenzyl synthase; chitinase; glucanase; PR proteins; and anti-pathogenic substances produced by microorganisms such as peptide antibiotics, antibiotics having heterocycles, protein factors associated with plant disease resistance (referred to as plant disease resistance genes and described in WO03/000906).

Examples of the above-described crops include crops to which useful traits such as an oil ingredient modification trait or an amino acid content enhancing trait are imparted using a recombinant DNA technology. Examples thereof include VISTIVE (registered trademark) (low linoleic soybeans obtained by reducing the linolen content). In addition, other examples thereof include crops to which resistance to environmental stress is imparted using a recombinant DNA technology. Further, other examples thereof include DroughtGard (registered trademark).

Further, other examples thereof include stacked crops obtained by combining a plurality of useful traits such as the above-described classical herbicide trait or herbicide resistance genes, insecticidal pest resistance gene, anti-pathogenic substance producing genes, and oil ingredient modification trait or an amino acid content enhancing trait. Other examples thereof include crops obtained by using a genome editing technology in place of a recombinant DNA technology.

In the present method for controlling harmful organisms, the compound group A is the group consisting of a neonicotinoid compound, a diamide compound, a carbamate compound, an organic phosphorus compound, a biological nematicidal compound, other insecticidal compounds and nematicidal compounds, an azole compound, a strobilurin compound, a metalaxyl compound, an SDHI compound, and other fungicidal compounds and plant growth regulators.

In the present method for controlling harmful organisms, examples of the neonicotinoid compounds used to treat crop seeds include clothianidin, imidacloprid, nitenpyram, acetamiprid, thiamethoxam, flupyradifurone, sulfoxaflor, triflumezopyrim, dicloromezotiaz, thiacloprid, and dinotefuran.

In the present method for controlling harmful organisms, examples of the diamide compounds used to treat crop seeds include flubendiamide, chlorantraniliprole, cyantraniliprole, cyclaniliprole, broflanilide, tetraniliprole, and cyhalodiamide.

In the present method for controlling harmful organisms, examples of the carbamate compounds include aldicarb, oxamyl, thiodicarb, carbofuran, carbosulfan, and dimethoate.

In the present method for controlling harmful organisms, examples of the organic phosphorus compounds used to treat crop seeds include fenamiphos, imicyafos, fensulfothion, terbufos, fosthiazate, phosphocarb, dichlofenthion, isamidofos, isazophos, ethoprophos, cadusafos, chlorpyrifos, heterofos, mecarphon, phorate, thionazin, triazophos, diamidafos, fosthietan, and phosphamidon.

In the present method for controlling harmful organisms, examples of the biological nematicidal compounds used to treat crop seeds include Harpin Protein, *Pasteuria nishizawae, Pasteuria penetrans, Pasteuria usage, Myrothecium verrucaria, Burkholderia cepacia, Bacillus chitonosporus, Paecilomyces lilacinus, Bacillus amyloliquefaciens, Bacillus firmus, Bacillus subtilis, Bacillus pumulus, Trichoderma harzianum, Hirsutella rhossiliensis, Hirsutella minnesotensis, Verticillium chlamydosporum*, and *Arthrobotrys dactyloides*.

In the present method for controlling harmful organisms, examples of other insecticidal compounds and nematicidal compounds used to treat crop seeds include fipronil, ethiprole, beta-cyfluthrin, tefluthrin, chlorpyrifos, abamectin, spirotetramat, tioxazafen, fluazaindolizine, fluensulfone, and fluxametamide.

In the present method for controlling harmful organisms, examples of the azole compounds used to treat crop seeds include azaconazole, bitertanol, bromuconazole, cyproconazole, difenoconazole, diniconazole, epoxyconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimenol, triticonazole, fenarimol, nuarimol, pyrifenox, imazalil, oxpoconazole fumarate, pefurazoate, prochloraz, triflumizole, ipfentrifluconazole, and mefentrifluconazole.

In the present method for controlling harmful organisms, examples of the strobilurin compound used to treat crop seeds include kresoxim-methyl, azoxystrobin, trifloxystrobin, fluoxastrobin, picoxystrobin, pyraclostrobin, dimoxystrobin, pyribencarb, metominostrobin, orysastrobin, and mandestrobin.

In the present method for controlling harmful organisms, examples of the metalaxyl compound used to treat crop seeds include metalaxyl and metalaxyl-M (mefenoxam).

In the present method for controlling harmful organisms, examples of the SDHI compound used to treat crop seeds include sedaxane, penflufen, carboxin, boscalid, furametpyr, flutolanil, fluxapyroxad, isopyrazam, fluopyram, isofetamid, pyraziflumid, pydiflumetofen, fluindapyr, N-(1,1,3-trimethylindan-4-yl)-1-methyl-3-difluoromethylpyrazole-4-carboxamide (including a racemic body or an enantiomer and a mixture of an R enantiomer and an S enantiomer at an optional mixing ratio; and a compound, rich in R enantiomer, in which the ratio of the R enantiomer to the S enantiomer is 80:20 or greater (which is also referred to as a compound 1 below)) and thifluzamide.

In the present method for controlling harmful organisms, examples of the plant growth regulators used to treat crop seeds include ethephon, chlormequat-chloride, mepiquat-chloride, and 4-oxo-4-(2-phenylethyl)aminobutyric acid (hereinafter, also referred to as a compound 2).

In the present method for controlling harmful organisms, examples of other fungicidal compounds include tolclofos-methyl, thiram, captan, carbendazim, thiophanate-methyl, mancozeb, thiabendazole, isotianil, triazoxide, picarbutrazox, and oxathiapiprolin.

The compounds constituting the above-described compound group A are all known compounds and can be synthesized on known technical literatures. Further, commercially available formulations or standard products can be purchased and then used.

In the present method for controlling harmful organisms, the compound group B is the group consisting of a strobilurin compound, an azole compound, an SDHI compound, other fungicidal compounds, a pyrethroid compound, a benzoylphenylurea compound, an organic phosphorus insecticide compound, a neonicotinoid compound, and a diamide compound.

In the present method for controlling harmful organisms, examples of the strobilurin compound used to perform a foliage treatment on crops include pyraclostrobin, azoxystrobin, mandestrobin, trifloxystrobin, and picoxystrobin.

In the present method for controlling harmful organisms, examples of the azole compounds used to perform a foliage treatment on crops include prothioconazole, epoxyconazole, tebuconazole, cyproconazole, propiconazole, metconazole, bromuconazole, tetraconazole, triticonazole, ipfentrifluconazole, and mefentrifluconazole.

In the present method for controlling harmful organisms, examples of the SDHI compounds used to perform a foliage treatment on crops include benzobindiflupyr, bixafen, fluxapyroxad, fluindapyr, and the compound 1.

In the present method for controlling harmful organisms, examples of other fungicidal compounds used to perform a foliage treatment on crops include tolclofos-methyl and ethaboxam.

In the present method for controlling harmful organisms, examples of the pyrethroid compounds used to perform a foliage treatment on crops include bifenthrin, lambda-cyhalothrin, gamma-cyhalothrin, cypermethrin, fenpropathrin, etofenprox, silafluofen, and esfenvalerate.

In the present method for controlling harmful organisms, examples of the benzoylphenylurea compounds used to perform a foliage treatment on crops include teflubenzuron and triflumuron.

In the present method for controlling harmful organisms, examples of the organic phosphorus insecticidal compounds used to perform a foliage treatment on crops include acephate and methomyl.

In the present method for controlling harmful organisms, examples of the neonicotinoid compounds used to perform a foliage treatment on crops include imidacloprid, clothianidin, thiamethoxam, sulfoxaflor, flupyradifurone, triflumezopyrim, and dicloromezotiaz.

In the present method for controlling harmful organisms, examples of the diamide compounds used to perform a foliage treatment on crops include flubendiamide, chlorantraniliprole, cyantraniliprole, broflanilide, tetraniliprole, and cyhalodiamide.

The compounds constituting the above-described compound group B are all known compounds and can be synthesized on known technical literatures. Further, commercially available formulations or standard products can be purchased and then used.

In the step of treating the crop seeds with one or more compounds (hereinafter, referred to as compounds A) selected from the compound group A according to the present method for controlling harmful organisms, the compounds A are usually mixed with carriers such as solid carriers or liquid carriers, an adjuvant for a formulation such as a surfactant is added thereto as necessary, and the mixture is formulated and then used. A preferable dosage form is an aqueous liquid suspension formulation.

The compounds A may be used by combining one or two or more formulations respectively formed of a single ingredient, and a formulation formed of two or more ingredients may be used.

In a certain embodiment, examples of the treatment amount of the compounds A include usually in a range of 0.2 to 5,000 g and preferably in a range of 0.5 to 1,000 g, per 100 kg of crop seeds. Examples of the method for treating the crop seeds with the compounds A include a method for powder-coating crop seeds with a formulation that contains the compounds A, a method for immersing crop seeds in a formulation that contains the compounds A, a method for spraying a formulation that contains the compounds A to crop seeds, and a method for coating crop seeds with a mixture of the compounds A and carriers.

In the method for controlling weeds and the present method for controlling harmful organisms of the present invention, a cultivation area of crop seeds is treated with a compound X or flumioxazin before, simultaneously with, and/or after sowing the crop seeds.

The cultivation area of crop seeds in the present invention is not particularly limited as long as the cultivation area is a place where crops are cultivated, and examples thereof include a farmland, a field, a non-agricultural area, a park, a bank, a seedling tray, a seedling box, and a nursery field.

In the step of treating the cultivation area of crops with the compound X or flumioxazin, the compound X or flumioxazin is usually mixed with carriers such as solid carriers or liquid carriers, an adjuvant for a formulation such as a surfactant is added thereto as necessary, and the mixture is formulated and then used. In a certain embodiment, examples of the dosage form includes an aqueous liquid suspension formulation, a wettable powder formulation, a water dispersible granule, a granular formulation, and an emulsifiable concentrate, and a preferable examples of the dosage form includes an emulsifiable concentrate. During the step, a formulation containing the compound X or flumioxazin as a single ingredient may be used alone or formulations containing other herbicides as active ingredients may be mixed and then used. Further, a formulation containing the compound X or flumioxazin and other herbicides as active ingredients may be used and a formulation containing the compound X or flumioxazin and other herbicides and a formulation containing other herbicides as active ingredients may be mixed and then used.

Examples of the method for treating a cultivation area of crops with the compound X or flumioxazin include a method for spraying the compound X or flumioxazin to the soil of the cultivation area of crops and a method for spraying the compound X or flumioxazin to weeds after the weeds are emerged.

In a certain embodiment, examples of the treatment amount of the compound X or flumioxazin include usually in a range of 1 to 1,000 g, preferably in a range of 2 to 500 g, more preferably in a range of 5 to 200 g, or and still more preferably in a range of 10 to 100 g, per 10,000 $m^2$ of a cultivation area of crop seeds. Further, in the step of treating the cultivation area of crops with the compound X or flumioxazin, the cultivation area may be treated with the compound X or flumioxazin by mixing an adjuvant. The type of adjuvant is not particularly limited, and examples thereof include oil-based adjuvants such as Agri-Dex and MSO; nonionic adjuvants (ester or ether of polyoxyethylene) such as Induce; anionic adjuvants (substituted sulfonate) such as Gramin S, cationic adjuvants (polyoxyethylene amine) such as Genamin T 200 BM; and organic silicon-based adjuvants such as Silwett L77.

The pH or the hardness of the spray solution at the time of treating the cultivation area of crops with the compound X or flumioxazin is not particularly limited, but the pH thereof is usually in a range of 5 to 9 and the hardness thereof is usually in a range of 0 to 500.

The time zone for treating the cultivation area of crops with the compound X or flumioxazin is not particularly limited, but is usually between 5 am and 9 pm and the photon flux density is usually in a range of 10 to 2,500 $mol/m^2/sec$.

In a certain embodiment, in the method for controlling weeds and the present method for controlling harmful organisms of the present invention, crop seeds are sowed in a cultivation area using a typical method. The cultivation area of crops may be treated with the compound X or flumioxazin before, simultaneously with, and/or after sowing the crop seeds. In other words, the number of treatments with the compound X or flumioxazin may be performed once before, simultaneously with, or after sowing the crop seeds, performed twice by excluding the treatment performed before the sowing, the treatment performed simultaneously with the sowing, or the treatment performed after the sowing, or performed three times at all timings.

In a certain embodiment, in a case where the cultivation area is treated with the compound X or flumioxazin before sowing the crop seeds, the cultivation area is treated with the compound X or flumioxazin usually during a period of 50 days before to immediately before the sowing, preferably during a period of 30 days before to immediately before the sowing, more preferably during a period of 20 days before to immediately before the sowing, and still more preferably during a period of 10 days before to immediately before the sowing.

In a case where the cultivation area is treated with the compound X or flumioxazin after sowing crop seeds, the cultivation area is treated with the compound X or flumioxazin usually during a period of immediately after the sowing to before blooming and more preferably during a period of immediately after the sowing to before sprouting and a period of the 1-leaf to 6-leaf stage of crops. In a case where the cultivation area is subjected to a foliage treatment with the compound X or flumioxazin during a period of the 1-leaf to 6-leaf stage of crops, the step (3) may be performed concurrently or subsequently by mixing the compound X or flumioxazin with one or more compounds (hereinafter, referred to as compounds B) selected from the above-described compound group B. In a case where the step is performed sequentially, the order thereof is not particularly limited.

The case where the cultivation area is treated with the compound X or flumioxazin simultaneously with sowing the crop seeds is a case where a sowing machine and a spraying machine are integrated with each other.

In the step (3) of the present method for controlling harmful organisms, the compounds B are usually mixed with carriers such as solid carriers or liquid carriers, an adjuvant for a formulation such as a surfactant is added thereto as necessary, and the mixture is formulated and then used. Preferred examples of the dosage form include an emulsifiable concentrate, a aqueous suspension, and a soluble liquid.

In a certain embodiment, the period of when the step (3) is performed is preferably a period of 10 days to 120 days after the sowing and more preferably a period of 21 days to 90 days after the sowing. In a case of a plurality of compounds B, a plurality of formulations respectively containing each compound B as an active ingredient may be used. During this time, the formulations may be mixed with each other or sequentially treated. Further, a mixed formulation containing a plurality of compounds as active ingredients may be used.

In a certain embodiment, the treatment amount of the compounds B is usually in a range of 5 to 5,000 g, preferably in a range of 20 to 2,000 g, and more preferably in a range of 50 to 1,500 g per 10,000 cm$^2$ of the cultivation area of crop seeds. Further, during the step (3), the compounds B are mixed with an adjuvant and then used for the treatment.

According to the present method for controlling harmful organisms, harmful organisms such as harmful anthropods, harmful nematodes, and/or plant pathogens, and weeds can be controlled. According to the method for controlling weeds of the present invention, weeds can be controlled.

Examples of the harmful anthropods to be controlled by the method of the present invention include the followings, but which are not limited thereto.

Hemipteran pests, for example, planthoppers such as *Laodelphax striatellus, Nilaparvata lugens, Sogatella furcifera*; leafhoppers such as *Nephotettix cincticeps* and *Nephotettix virescens*; aphids such as *Aphis gossypii, Myzus persicae, Brevicoryne brassicae, Macrosiphum euphorbiae, Aulacorthum solani, Rhopalosiphum padi*, and *Toxoptera citricidus*; Pentatomorphas such as *Nezara antennata, Riptortus clavetus, Leptocorisa chinensis, Eysarcoris parvus, Halyomorpha mista*, and *Lygus lineolaris*; whiteflies such as *Trialeurodes vaporariorum, Bemisia tabaci*, and *Bemisia argentifolii*; scale insects such as *Aonidiella aurantii, Comstockaspis perniciosa, Unaspis citri, Ceroplastes rubens*, and *Icerya purchasi*; lace bugs; and jumping plant lices;

Lepidoptera insect pests, for example, Pyralidae such as *Chilo suppressalis, Tryporyza incertulas, Cnaphalocrocis medinalis, Notarcha derogata, Plodia interpunctella, Ostrinia furnacalis, Ostrinia nubilaris, Hellula undalis*, and *Pediasia teterrellus*; Pieris brassicaes such as *Spodoptera litura, Spodoptera exigua, Pseudaletia separata, Mamestra brassicae, Agrotis ipsilon, Plusia nigrisigna, Trichoplusia* spp., *Heliothis* spp., and *Helicoverpa* spp.; and Pieridae such as *Pieris rapae*; budworms such as *Grapholita molesta, Leguminivora glycinivorella, Matsumuraeses azukivora, Adoxophyes orana fasciata, Adoxophyes* sp., *Homona magnanima, Archips fuscocupreanus*, and *Cydia pomonella*; Gracillariidae such as *Caloptilia theivora* and *Phyllonorycter ringoneella*; Carpocapsa pomonellas such as carposina niponensis; leafminer moths such as *Lyonetia* spp.; tussock moths such as Lymantriidae spp., and *Euproctis* spp.; Yponomeutidae such as *Plutella xylostella*; Gelechiidae such as *Pectinophora gossypiella* and *Phthorimaea operculella*; Tiger moths such as *Hyphantria cunea*; and tineids such as tinea translucens and Tineola bisselliella;

Thysanoptera pests, for example, thrips such as *Frankliniella occidentalis, Thrips parmi, Scirtothrips dorsalis, Thrips tabaci, Frankliniella intonsa*, and *Frankliniella fusca*;

Dipterous pests, for example, Agromyzidae such as *Musca domestica, Culex pipiens pallens, Tabanus trigonus, Hylemya antiqua, Hylemya platura, Anopheles sinensis, Agromyza oryzae, Hydrellia griseola, Chlorops oryzae*, and *Liriomyza trifolii*; *Dacus cucurbitae*; *Ceratitis capitata*;

Coleopteran pests, for example, *Epilachna vigintioctopunctata, Aulacophora femoralis, Phyllotreta striolata, Oulema oryzae, Echinocnemus squameus, Lissorhoptrus oryzophilus, Anthonomus grandis, Callosobruchus chinensis, Sphenophorus venatus, Popillia japonica, Anomala cuprea, Diabrotica* spp., *Leptinotarsa decemlineata, Agriotes* spp., *Lasioderma serricorne, Anthrenus verbasci, Tribolium castaneum, Lyctus brunneus, Anoplophora malasiaca*, and *Tomicus piniperda*;

Orthoptera pests, for example, *Locusta migratoria, Gryllotalpa Africana, Oxya yezoensis*, and *Oxya japonica*;

Hymenopter pests, for example, *Athalia rosae, Acromyrmex* spp., and *Solenopsis* spp.;

Order Blattaria pests, for example, *Blattella germanica, Periplaneta fuliginosa, Periplaneta americana, Periplaneta brunnea*, and *Blatta orientalis*;

Acarina pests, for example, Tetranychidae such as *Tetranychus urticae, Panonychus citri, Oligonychus* spp.; gall mites such as *Aculops pelekassi*; white mites such as *Polyphagotarsonemus latus*; Tenuipalpidae; Tuckerellidae; Acaridae such as *Tyrophagus putrescentiae*; Pyroglyphidae such as *Dermatophagoides farinae* and *Dermatophagoides ptrenyssnus*; and cheyletidae such as *Cheyletus eruditus, Cheyletus malaccensis*, and *Cheyletus moorei*.

Examples of the plant pathogens include the followings:
*Cercospora gossypina, Cercospora kikuchii, Cercospora zeae-maydis, Cercospora sojina, Phakopsora gossypii, Rhizoctonia solani, Colletotrichum gossypii, Peronospora gossypina, Aspergillus* spp., *Penicillium* spp., *Fusarium* spp., *Tricoderma* spp., *Thielaviopsis* spp., *Rhizopus* spp., *Mucor* spp., *Corticium* spp., *Phoma* spp., *Diplodia* spp., *Verticillium* spp., *Puccinia* spp., *Mycosphaerella* spp., *Phytophtora* spp. (*Phytophthora sojae, Phytophthora nicotianae* var. *nicotianae, Phytophthora infestans, Phytophthora erythroseptica*, etc.), *Pythium* spp. (*Pythium debaryanum, Pythium sylvaticum, Pythium graminicola, Pythium irregulare, Pythium ultimum*, etc.), *Microsphaera diffusa, Diaporthe phaseolorum* var. *sojae, Septoria glycines, Phakopsora pachyrhizi, Sclerotinia sclerotiorum, Elsinoe glycines*,

*Ustilago maydis, Cochliobolus heterostrophus, Gloeocercospora sorghi,* and *Alternaria* spp.

The weeds to be controlled include dicot weeds, monocot weeds, or both.

Examples of the weeds to be controlled by the method of the present invention include the followings, but which are not limited thereto.

Urticaceae weeds such as *Urtica urens*; Polygonaceae such as *Polygonum convolvulus, Polygonum lapathifolium, Polygonum pensylvanicum, Polygonum persicaria, Polygonum longisetum, Polygonum aviculare, Polygonum arenastrum, Polygonum cuspidatum, Rumex japonicus, Rumex crispus, Rumex obtusifolius,* and *Rumex acetosa;*

Portulacaceae weeds such as *Portulaca oleracea;*

Caryophyllaceae weeds such as *Stellaria media, Cerastium holosteoides, Cerastium glomeratum, Spergula arvensis,* and *Silene gallica;*

Molluginaceae weeds such as *Mollugo verticillata;*

Chenopodiaceae weeds such as *Chenopodium album, Chenopodium ambrosioides, Kochia scoparia, Salsola kali,* and *Atriplex* spp.;

Amaranthaceae weeds such as *Amaranthus retroflexus, Amaranthus viridis, Amaranthus lividus, Amaranthus spinosus, Amaranthus hybridus, Amaranthus palmeri, Amaranthus rudis, Amaranthus patulus, Amaranthus tuberculatus, Amaranthus blitoides, Amaranthus deflexus, Amaranthus quitensis, Alternanthera philoxeroides, Alternanthera sessilis,* and *Alternanthera tenella;*

Papaveraceae weeds such as *Papaver rhoeas* and *Argemone mexicana;*

Brassicaceae weeds such as *Raphanus raphanistrum, Raphanus sativus, Sinapis arvensis, Capsella bursa-pastoris, Brassica juncea, Brassica campestris, Descurainia pinnata, Rorippa islandica, Rorippa sylvestris, Thlaspi arvense, Myagrum rugosum, Lepidium virginicum,* and *Coronopus didymus;*

Cappraceae weeds such as *Cleome affinis;*

Fabaceae weeds such as *Aeschynomene indica, Aeschynomene rudis, Sesbania exaltata, Cassia obtusifolia, Cassia occidentalis, Desmodium tortuosum, Desmodium adscendens, Trifolium repens, Pueraria lobata, Vicia angustifolia, Indigofera hirsuta, Indigofera truxillensis,* and *Vigna sinensis;*

Oxalidaceae weeds such as *Oxalis corniculata, Oxalis strica,* and *Oxalis oxyptera;*

Geraniaceae weeds such as *Geranium carolinense* and *Erodium cicutarium;*

Euphorbiaceae weeds such as *Euphorbia helioscopia, Euphorbia maculata, Euphorbia humistrata, Euphorbia esula, Euphorbia heterophylla, Euphorbia brasiliensis, Acalypha australis, Croton glandulosus, Croton lobatus, Phyllanthus corcovadensis,* and *Ricinus communis;*

Malvaceae weeds such as *Abutilon theophrasti, Sida rhombifolia, Sida cordifolia, Sida spinosa, Sida glaziovii, Sida santaremnensis, Hibiscus trionum, Anoda cristata,* and *Malvastrum coromandelianum;*

Sterculiaceae weeds such as *Waltheria indica;*

Violaceae weeds such as *Viola arvensis* and *Viola tricolor;*

Cucurbitaceae weeds such as *Sicyos angulatus, Echinocystis lobata,* and *Momordica charantia;*

Lythraceae weeds such as *Lythrum salicaria;*

Apiaceae weeds such as *Hydrocotyle sibthorpioides;*

Sapindaceae weeds such as *Cardiospermum halicacabum;*

Primulaceae weeds such as *Anagallis arvensis;*

Asclepiadaceae weeds such as *Asclepias syriaca,* and *Ampelamus albidus;*

Rubiaceae weeds such as *Galium aparine, Galium spurium* var. *echinospermon, Spermacoce latifolia, Richardia brasiliensis,* and *Borreria alata;*

Convolvulaceae weeds such as *Ipomoea nil, Ipomoea hederacea, Ipomoea purpurea, Ipomoea hederacea* var. *integriuscula, Ipomoea lacunosa, Ipomoea triloba, Ipomoea acuminata, Ipomoea hederifolia, Ipomoea coccinea, Ipomoea quamoclit, Ipomoea grandifolia, Ipomoea aristolochiafolia, Ipomoea cairica, Convolvulus arvensis, Calystegia hederacea, Calystegia japonica, Merremia hedeacea, Merremia aegyptia, Merremia cissoides,* and *Jacquemontia tamnifolia;*

Boraginaceae weeds such as *Myosotis arvensis;*

Lamiaceae weeds such as *Lamium purpureum, Lamium amplexicaule, Leonotis nepetaefolia, Hyptis suaveolens, Hyptis lophanta, Leonurus sibiricus,* and *Stachys arvensis;*

Solanaceae weeds such as *Datura stramonium, Solanum nigrum, Solanum americanum, Solanum ptycanthum, Solanum sarrachoides, Solanum rostratum, Solanum aculeatissimum, Solanum sisymbriifolium, Solanum carolinense, Physalis angulata, Physalis subglabrata,* and *Nicandra physaloides;*

Scorphulariaceae weeds such as *Veronica hederaefolia, Veronica persica,* and *Veronica arvensis;*

Plantaginaceae such as *Plantago asiatica;*

Asteraceae weeds such as *Xanthium pensylvanicum, Xanthium occidentale, Helianthus annuus, Matricaria chamomilla, Matricaria perforata, Chrysanthemum segetum, Matricaria matricarioides, Artemisia princeps, Artemisia vulgaris, Artemisia verlotorum, Solidago altissima, Taraxacum officinale, Galinsoga ciliata, Galinsoga parviflora, Senecio vulgaris, Senecio brasiliensis, Senecio grisebachii, Conyza bonariensis, Conyza Canadensis, Ambrosia artemisiaefolia, Ambrosia trifida, Bidens pilosa, Bidens frondosa, Bidens subalternans, Cirsium arvense, Cirsium vulgare, Silybum marianum, Carduus nutans, Lactuca serriola, Sonchus oleraceus, Sonchus asper, Wedelia glauca, Melampodium perfoliatum, Emilia sonchifolia, Tagetes minuta, Blainvillea latifolia, Tridax procumbens, Porophyllum ruderale, Acanthospermum australe, Acanthospermum hispidum, Cardiospermum halicacabum, Ageratum conyzoides, Eupatorium perfoliatum, Eclipta alba, Erechtites hieracifolia, Gamochaeta spicata, Gnaphalium spicatum, Jaegeria hirta, Parthenium hysterophorus, Siegesbeckia orientalis,* and *Soliva sessilis;*

Liliaceae weeds such as *Allium canadense* and *Allium vineale;*

Commelinaceae weeds such as *Commelina communis, Commelina bengharensis,* and *Commelina erecta;*

Poaceae weeds such as *Echinochloa crus-galli, Setaria viridis, Setaria faberi, Setaria glauca, Setaria geniculata, Digitaria ciliaris, Digitaria sanguinalis, Digitaria horizontalis, Digitaria insularis, Eleusine indica, Poa annua, Alopecurus aequalis, Alopecurus myosuroides, Avena fatua, Sorghum halepense, Sorghum vulgare, Agropyron repens, Lolium multiflorum, Lolium perenne, Lolium rigidum, Bromus secalinus, Bromus tectorum, Hordeum jubatum, Aegilops cylindrica, Phalaris arundinacea, Phalaris minor, Apera spica-venti, Panicum dichotomiflorum, Panicum texanum, Panicum maximum, Brachiaria platyphylla, Brachiaria ruziziensis, Brachiaria plantaginea, Brachiaria decumbens, Brachiaria brizantha, Brachiaria humidicola, Cenchrus echinatus, Cenchrus pauciflorus, Eriochloa villosa, Pennisetum setosum, Chloris gayana, Eragrostis pilosa, Rhynchelitrum repens, Dactyloctenium aegyptium,*

*Ischaemum rugosum, Oryza sativa, Paspalum notatum, Paspalum maritimum, Pennisetum clandestinum, Pennisetum setosum*, and *Rottboellia cochinchinensis*;

*Cyperus microiria* weeds such as *Cyperus microiria, Cyperus iria, Cyperus odoratus, Cyperus rotundus, Cyperus esculentus*, and *Kyllinga gracillima*;

Equisetaceae weeds such as *Equisetum arvense* and *Equisetum palustre*.

The objective weeds of the present invention may be varied depending on the objective crops (for example, plant body or seeds), the seasons for sowing, planting or growing, the timing of seedling emergence, and the others. In a certain embodiment, examples of weeds to be controlled by the method of controlling weeds of the present invention include the followings, but which not limited thereto.

Examples of the harmful nematodes include *Meloidogyne incognita, Meloidogyne javanica, Meloidogyne hapla, Meloidogyne arenari, Meloidogyne acronea, Ditylenchus destructor, Ditylenchus dipsaci, Pratylenchus penetrans, Pratylenchus cffeae, Pratylenchus loosi, Pratylenchus vulnus, Globodera rostochiensis, Globodera pallida, Heterodera glycines, Heterodera shachtoii, Aphelenchoides besseyi, Aphelenchoides ritzemabosi, Aphelenchoides fragarieae, Aphelenchus avenae, Radopholus similis, Tylenchulus semipenetrans, Rotylenchulus reniformis, Bursaphelenchus xylophilus, Helicotylenchus, Hoplolaimus, Paratrichodorus, Longidorus, Nacobbus, Subanguina, Belonolaimus, Criconemoides, Ditylenchus, Dolichodorus, Hemicriconemoides, Hemicycliophora, Hirschmanniella, Macroposthonia, Melinius, Punctodera, Quinisulcius, Scutellonema, Xiphinema, Tylenchorhynchus*, and *Mesocriconema*.

In regard to the above-described harmful organisms, mutation within a species is not particularly limited. That is, the concept of mutation includes a decrease in the sensitivity to a specific insecticide, fungicide, or herbicide. The decrease in the sensitivity may be caused by a spontaneous mutation (target site mutation) occurring at a target site or a factor other than the mutation in the point of action (non-target site mutation). As the factors of the decrease in sensitivity due to the non-target site mutation, metabolic enhancement, malabsorption, migration failure, and discharge out of the system may be exemplified. As the factors of metabolic enhancement, metabolic enzymes with increased activity such as cytochrome P450 monooxygenase, allyl acyl amidase, esterase, and glutathione S transferase may be exemplified. As the factors of discharge out of the system, transportation carried out by an ABC transporter to a vacuole may be exemplified. Examples of cases showing the decrease in sensitivity of weeds due to the action point mutation include any of the following mutations in ALS genes or those with multiple amino acid substitutions. The mutations are Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu, and Gly645Asp. Similarly, examples of cases showing the decrease in sensitivity of weeds due to the action point mutation include any of the following mutations in ACCase genes or those with multiple amino acid substitutions. The mutations are Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg, Gly2096Ala, and Gly2096Ser. Similarly, examples of cases showing the decrease in sensitivity of weeds due to the action point mutation include ΔGly210 mutation in PPX2L genes, Arg98Leu mutation in PPX1 genes, Arg98Met mutation in PPX2 genes or Arg98Gly mutation in PPX2 genes. Particularly, *Amaranthus tuberculatus* and *Amaranthus palmeri* having ΔGly210 mutation in PPX2L genes and *Ambrosia artemisiifolia* having Arg98Leu mutation in PPX2 genes are effectively controlled. Similarly, examples of cases showing the decrease in sensitivity of weeds due to the action point mutation include amino acid substitutions such as Thr102Ile, Pro106Ser, Pro106Ala, and Pro106Leu in EPSP genes. Particularly, *Eleusine indica, Lolium multiflorum* Lam., *Lolium rigidum, Digitaria insularis, Amaranthus tuberculatus*, and *Echinochloa colonum* having resistance to glyphosate with one or both of these are effectively controlled. Similarly, examples of cases showing the decrease in sensitivity of weeds due to the action point mutation include mutations caused by the number of copies in EPSP genes being increased. Particularly, *Maranthus palmeri, Amaranthus tuberculatus*, and *Bassia scoparia* having resistance to glyphosate with the mutations are effectively controlled. *Conyza Canadensis, Conyza sumatrensis*, and *Conyza bonariensis* having resistance to glyphosate associated with the ABC transporter are also effectively controlled.

In the method for controlling weeds and the present method for controlling harmful organisms of the present invention, one or more other herbicides, plant growth regulators, and safeners can be used in combination for the treatment with the compound X or flumioxazin. The combination here may be blending, mixing, or performing sequential treatments. In a case of the sequential treatments, the order thereof is not particularly limited.

Examples of the herbicides, plant growth regulators, and safeners include the followings:

Herbicides such as glyphosate and a salt thereof (isopropylammonium salt, ammonium salt, potassium salt, guanidine salt, dimethylamine salt, monoethanolamine salt, choline salt, BAPMA (N,N-bis-(aminopropyl)methylamine) salt), 2,4-D and its salt or ester (ammonium salt, butotyl ester, 2-butoxypropyl ester, butyl ester, diethylammonium salt, dimethylammonium salt, diolamine salt, dodecylammonium salt, ethyl ester, 2-ethylhexyl ester, heptylammonium salt, isobutyl ester, isoctyl ester, isopropyl ester, isopropylammonium salt, lithium salt, meptyl ester, methyl ester, octyl ester, pentyl ester, propyl ester, sodium salt, tefuryl ester, tetradecylammonium salt, triethylammonium salt, tris(2-hydroxypropyl)ammonium salt, trolamine salt, choline salt), 2,4-DB and its salt or ester (dimethylammonium salt, isoctyl ester, choline salt), dicamba and its salt or ester (diglycolamine salt, dimethylammonium salt, diolamine salt, isopropylammonium salt, methyl ester, olamine salt, potassium salt, sodium salt, trolamine salt, BAPMA (N,N-bis-(aminopropyl)methylamine) salt, choline salt), pyroxasulfone, MCPA and a salt or an ester thereof (dimethylammonium salt, 2-ethylhexyl ester, isoctyl ester (isooctyl ester), sodium salt, or choline salt), MCPB, mecoprop and a salt or an ester thereof (dimethylammonium salt, diolamine salt, ethadyl ester(1,2-ethanediyl ester), 2-ethylhexyl ester, isoctyl ester(isooctyl ester), methyl ester, potassium salt, sodium salt, trolamine salt, or choline salt), mecoprop-P and a salt or an ester thereof (dimethylammonium salt, 2-ethylhexyl ester, isobutyl salt, potassium salt, or choline salt), dichlorprop and a salt or an ester thereof (butotyl ester(2-butoxyethyl ester), dimethylammonium salt, 2-ethylhexyl ester, isoctyl ester(isooctyl ester), methyl ester, potassium salt, sodium salt, or choline salt), dichlorprop-P, dichlorprop-P-dimethylammonium, quinclorac, quinmerac, bromoxynil, bromoxynil-octanoate, dichlobenil, methiozolin, ioxynil, ioxynil-octanoate, di-allate, butylate, tri-allate, phenmedipham, chlorpropham, desmedipham, asulam, phenisopham, benthiocarb, molinate, esprocarb, pyributicarb, prosulfocarb, orbencarb, EPTC, dimepiperate, swep, propachlor, metazachlor, alachlor, acetochlor, metolachlor, S-metolachlor, butachlor, pretilachlor, thenylchlor, aminocyclopyrachlor, aminocyclopyrachlor-methyl, aminocyclopyrachlor-potassium, trifluralin, pendimethalin, ethalfluralin, benfluralin, prodiamine, simazine, atrazine, propazine, cyanazine, ametryn, simetryn, dimethametryn, prometryn, indaziflam, triaziflam, metribuzin, hexazinone, terbumeton, terbuthylazine, terbutryn, trietazine, isoxaben, diflufenican, diuron, linuron, metobromuron, metoxuron, monolinuron, siduron, fluometuron, difenoxuron, methyldaimuron, isoproturon, isouron, tebuthiuron, benzthiazuron, methabenzthiazuron, propanil, mefenacet, clomeprop, naproanilide, bromobutide, daimuron, cumyluron, diflufenzopyr, etobenzanid, bentazon, tridiphane, indanofan, amitrole, fenchlorazole, clomazone, maleic hydrazide, pyridate, chloridazon, norflurazon, bromacil, terbacil, lenacil, oxaziclomefone, cinmethylin, benfuresate, cafenstrole, flufenacet, pyrithiobac, pyrithiobac-sodium, pyriminobac, pyriminobac-methyl, bispyribac, bispyribac-sodium, pyribenzoxim, pyrimisulfan, pyriftalid, triafamone, fentrazamide, dimethenamid, dimethenamid-P, ACN, dithiopyr, triclopyr and a salt or an ester thereof (butotyl ester(2-butoxyethyl ester) or triethylammonium salt), fluroxypyr, fluroxypyr-meptyl, thiazopyr, aminopyralid and a salt or an ester thereof (potassium salt or triisopanolammonium salt), clopyralid and a salt thereof (olamine salt, potassium salt, or triethylammonium salt), picloram and a salt thereof (potassium salt or triisopanolammonium salt), dalapon, chlorthiamid, amidosulfuron, azimsulfuron, bensulfuron, bensulfuron-methyl, chlorimuron, chlorimuron-ethyl, cyclosulfamuron, ethoxysulfuron, flazasulfuron, flucetosulfuron, flupyrsulfuron, flupyrsulfuron-methyl-sodium, foramsulfuron, halosulfuron, halosulfuron-methyl, imazosulfuron, mesosulfuron, mesosulfuron-methyl, metazosulfuron, nicosulfuron, orthosulfamuron, oxasulfuron, primisulfuron, primisulfuron-methyl, propyrisulfuron, pyrazosulfuron, pyrazosulfuron-ethyl, rimsulfuron, sulfometuron, sulfometuron-methyl, sulfosulfuron, trifloxysulfuron-sodium, trifloxysulfuron, chlorsulfuron, cinosulfuron, ethametsulfuron, ethametsulfuron-methyl, iodosulfuron, iodosulfuron-methyl-sodium, iofensulfuron, iofensulfuron-sodium, metsulfuron, metsulfuron-methyl, prosulfuron, thifensulfuron, thifensulfuron-methyl, triasulfuron, tribenuron, tribenuron-methyl, triflusulfuron, triflusulfuron-methyl, tritosulfuron, picolinafen, beflubutamid, norflurazon, fluridone, flurochloridone, flurtamone, benzobicyclon, bicyclopyrone, mesotrione, sulcotrione, tefuryltrione, tembotrione, isoxachlortole, isoxaflutole, benzofenap, pyrasulfotole, pyrazolynate, pyrazoxyfen, topramezone, tolpyralate, lancotrione-sodium, flupoxam, amicarbazone, bencarbazone, flucarbazone, flucarbazone-sodium, ipfencarbazone, propoxycarbazone, propoxycarbazone-sodium, thiencarbazone, thiencarbazone-methyl, cloransulam, cloransulam-methyl, diclosulam, florasulam, flumetsulam, metosulam, penoxsulam, pyroxsulam, imazamethabenz, imazamethabenz-methyl, imazamox, imazamox-ammonium, imazapic, imazapic-ammonium, imazapyr, imazapyr-isopropyrammonium, imazaquin, imazaquin-ammonium, imazethapyr, imazethapyr-ammonium, clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifopP-butyl, haloxyfop, haloxyfop-methyl, haloxyfop-P, haloxyfop-P-methyl, metamifop, propaquizafop, quizalofop, quizalofop-ethyl, quizalofop-P, quizalofop-P-ethyl, alloxydim, clethodim, sethoxydim, tepraloxydim, tralkoxydim, pinoxaden, fenoxasulfone, glufosinate, glufosinate-ammonium, glufosinate-P, glufosinate-P-sodium, bialaphos, anilofos, bensulide, butamifos, paraquat, paraquat-dichloride, diquat, diquat-dibromide, halauxifen, halauxifen-methyl, florpyrauxifen, florpyrauxifen-benzyl, flumioxazin, flumiclorac-pentyl, fomesafen-sodium, lactofen, saflufenacil, tiafenacil, trifludimoxazin, acifluorfen-sodium, aclonifen, bifenox, chlomethoxyfen, chlornitrofen, ethoxyfen-ethyl, fluorodifen, fluoroglycofen-ethyl, fluoronitrofen, halosafen, nitrofen, nitrofluorfen, oxyfluorfen, cinidon-ethyl, profluazol, pyraclonil, oxadiargyl, oxadiazone, pentoxazone, fluazolate, pyraflufen-ethyl, benzfendizone, butafenacil, fluthiacet-methyl, thidiazimin, azafenidin, carfentrazone-ethyl, sulfentrazone, and flufenpyr-ethyl;

Plant growth regulators such as hymexazol, paclobutrazol, uniconazole, uniconazole-P, inabenfide, prohexadione-calcium, 1-methylcyclopropene, and trinexapac; and Safeners such as benoxacor, cloquintocet, cloquintocet-mexyl, cyometrinil, cyprosulfamide, dichlormid, dicyclonon, dietholate, fenchlorazole, fenchlorazole-ethyl, fenclorim, flurazole, fluxofenim, furilazole, isoxadifen, isoxadifen-ethyl, mefenpyr, mefenpyr-diethyl, mephenate, naphthalic anhydride, and oxabetrinil.

In the present invention, preferred examples of the herbicides which can be combined with the compound X or flumioxazin include glyphosate potassium salt, glyphosate guanidine salt, glyphosate dimethylamine salt, glyphosate monoethanolamine salt, glyphosinate ammonium salt, glyphosate isopropylammonium salt, 2,4-D choline salt, dicamba diglycolamine salt, dicamba BAPMA salt, pyroxasulfone, flumioxazin, flumiclorac-pentyl, clethodim, lactofen, S-metolachlor, metribuzin, fulfenacet, nicosulfuron, rimsulfuron, acetochlor, mesotrione, isoxaflutole, chlorimuron-ethyl, thifensulfuron-methyl, cloransulam-methyl, and imazethapyr ammonium salt. Here when flumioxazin is used as an active agent, the above-mentioned herbicides which can be combined with flumioxazin exclude flumioxazin.

In the present invention, preferred examples of the safeners which can be combined with the compound X or flumioxazin include cyprosulfamide, benoxacor, dichlormid, and furilazole.

Examples of combinations of the compound X or flumioxazin with herbicides and/or combinations of the compound X or flumioxazin with safeners are described below, but the examples are not limited thereto. In a certain embodiment, the proportion of a compound to be combined with the compound X or flumioxazin is usually in a range of 0.01 to 1,000 times, preferably in a range of 0.1 to 100 times, and more preferably in a range of 1 to 10 times the amount of the compound X or flumioxazin, on a part by weight basis.

Combination of the compound X and 2,4-D;
Combination of the compound X and 2,4-D ammonium salt;
Combination of the compound X and 2,4-D butotyl ester;
Combination of the compound X and 2,4-D 2-butoxypropyl ester;
Combination of the compound X and 2,4-D butyl ester;
Combination of the compound X and 2,4-D diethyl ammonium salt;
Combination of the compound X and 2,4-D dimethyl ammonium salt;
Combination of the compound X and 2,4-D diolamine salt;

Combination of the compound X and 2,4-D dodecyl ammonium salt;
Combination of the compound X and 2,4-D ethyl ester;
Combination of the compound X and 2,4-D 2-ethylhexyl ester;
Combination of the compound X and 2,4-D heptylammonium salt;
Combination of the compound X and 2,4-D isobutyl ester;
Combination of the compound X and 2,4-D isoctyl ester;
Combination of the compound X and 2,4-D isopropyl ester;
Combination of the compound X and 2,4-D isopropylammonium salt;
Combination of the compound X and 2,4-D lithium salt;
Combination of the compound X and 2,4-D meptyl ester;
Combination of the compound X and 2,4-D methyl ester;
Combination of the compound X and 2,4-D octyl ester;
Combination of the compound X and 2,4-D pentyl ester;
Combination of the compound X and 2,4-D propyl ester;
Combination of the compound X and 2,4-D sodium salt;
Combination of the compound X and 2,4-D tefuryl ester;
Combination of the compound X and 2,4-D tetradecyl ammonium salt;
Combination of the compound X and 2,4-D triethylammonium salt;
Combination of the compound X and 2,4-D tris(2-hydroxypropyl)ammonium salt;
Combination of the compound X and 2,4-D trolamine salt;
Combination of the compound X and 2,4-D choline salt;
Combination of the compound X and 2,4-DB;
Combination of the compound X and 2,4-DB dimethylammonium salt;
Combination of the compound X and 2,4-DB isoctyl ester;
Combination of the compound X and 2,4-DB choline salt;
Combination of the compound X and dicamba;
Combination of the compound X and dicamba diglycolamine salt;
Combination of the compound X and dicamba dimethyl ammonium salt;
Combination of the compound X and dicamba diolamine salt;
Combination of the compound X and dicamba isopropyl ammonium salt;
Combination of the compound X and dicamba methyl ester;
Combination of the compound X and dicamba olamine salt;
Combination of the compound X and dicamba potassium salt;
Combination of the compound X and dicamba sodium salt;
Combination of the compound X and dicamba trolamine salt;
Combination of the compound X and dicamba BAPMA salt;
Combination of the compound X and dicamba choline salt;
Combination of the compound X and pyroxasulfone;
Combination of the compound X and quinchlorac;
Combination of the compound X and quinmerac;
Combination of the compound X and bromoxynil;
Combination of the compound X and bromoxynil-octanoate;
Combination of the compound X and dichlobenil;
Combination of the compound X and methiozolin;
Combination of the compound X and ioxynil;
Combination of the compound X and ioxynil-octanoate;
Combination of the compound X and di-allate;
Combination of the compound X and butylate;
Combination of the compound X and tri-allate;
Combination of the compound X and phenmedipham;
Combination of the compound X and chlorpropham;
Combination of the compound X and desmedipham;
Combination of the compound X and asulam;
Combination of the compound X and phenisopham;
Combination of the compound X and benthiocarb;
Combination of the compound X and molinate;
Combination of the compound X and esprocarb;
Combination of the compound X and pyributicarb;
Combination of the compound X and prosulfocarb;
Combination of the compound X and orbencarb;
Combination of the compound X and EPTC;
Combination of the compound X and dimepiperate;
Combination of the compound X and swep;
Combination of the compound X and propachlor;
Combination of the compound X and metazachlor;
Combination of the compound X and alachlor;
Combination of the compound X and acetochlor;
Combination of the compound X and metolachlor;
Combination of the compound X and S-metolachlor;
Combination of the compound X and butachlor;
Combination of the compound X and pretilachlor;
Combination of the compound X and thenylchlor;
Combination of the compound X and aminocyclopyrachlor;
Combination of the compound X and aminocyclopyrachlor-methyl;
Combination of the compound X and aminocyclopyrachlor-potassium;
Combination of the compound X and trifluralin;
Combination of the compound X and pendimethalin;
Combination of the compound X and ethalfluralin;
Combination of the compound X and benfluralin;
Combination of the compound X and prodiamine;
Combination of the compound X and simazine;
Combination of the compound X and atrazine;
Combination of the compound X and propazine;
Combination of the compound X and cyanazine;
Combination of the compound X and ametryn;
Combination of the compound X and simetryn;
Combination of the compound X and dimethametryn;
Combination of the compound X and indaziflam;
Combination of the compound X and triaziflam;
Combination of the compound X and metribuzin;
Combination of the compound X and hexazinone;
Combination of the compound X and terbumeton;
Combination of the compound X and terbuthylazine;
Combination of the compound X and terbutryn;
Combination of the compound X and trietazine;
Combination of the compound X and isoxaben;
Combination of the compound X and diflufenican;
Combination of the compound X and diuron;
Combination of the compound X and linuron;
Combination of the compound X and metobromuron;
Combination of the compound X and metoxuron;
Combination of the compound X and monolinuron;
Combination of the compound X and siduron;
Combination of the compound X and fluometuron;
Combination of the compound X and difenoxuron;
Combination of the compound X and methyl-daimuron;
Combination of the compound X and isoproturon;
Combination of the compound X and isouron;

Combination of the compound X and tebuthiuron;
Combination of the compound X and benzthiazuron;
Combination of the compound X and methabenzthiazuron;
Combination of the compound X and propanil;
Combination of the compound X and mefenacet;
Combination of the compound X and clomeprop;
Combination of the compound X and naproanilide;
Combination of the compound X and bromobutide;
Combination of the compound X and daimuron;
Combination of the compound X and cumyluron;
Combination of the compound X and diflufenzopyr;
Combination of the compound X and etobenzanid;
Combination of the compound X and bentazon;
Combination of the compound X and tridiphane;
Combination of the compound X and indanofan;
Combination of the compound X and amitrole;
Combination of the compound X and fenchlorazole-ethyl;
Combination of the compound X and mefenpyr-diethyl;
Combination of the compound X and benoxacor;
Combination of the compound X and dichlormid;
Combination of the compound X and cloquintocet-mexyl;
Combination of the compound X and cyprosulfamide;
Combination of the compound X and isoxadifen-ethyl;
Combination of the compound X and clomazone;
Combination of the compound X and maleic hydrazide;
Combination of the compound X and pyridate;
Combination of the compound X and chloridazon;
Combination of the compound X and bromacil;
Combination of the compound X and terbacil;
Combination of the compound X and lenacil;
Combination of the compound X and oxaziclomefone;
Combination of the compound X and cinmethylin;
Combination of the compound X and benfuresate;
Combination of the compound X and cafenstrole;
Combination of the compound X and flufenacet;
Combination of the compound X and pyrithiobac;
Combination of the compound X and pyrithiobac-sodium;
Combination of the compound X and pyriminobac;
Combination of the compound X and pyriminobac-methyl;
Combination of the compound X and bispyribac;
Combination of the compound X and bispyribac-sodium;
Combination of the compound X and pyribenzoxim;
Combination of the compound X and pyrimisulfan;
Combination of the compound X and pyriftalid;
Combination of the compound X and triafamone;
Combination of the compound X and fentrazamide;
Combination of the compound X and dimethenamid;
Combination of the compound X and dimethenamid-P;
Combination of the compound X and ACN;
Combination of the compound X and dithiopyr;
Combination of the compound X and triclopyr;
Combination of the compound X and triclopyr-butotyl;
Combination of the compound X and triclopyr ammonium salt;
Combination of the compound X and fluroxypyr;
Combination of the compound X and fluroxypyr-meptyl;
Combination of the compound X and thiazopyr;
Combination of the compound X and aminopyralid;
Combination of the compound X and aminopyralid potassium salt;
Combination of the compound X and aminopyralid tri-isopanol ammonium salt;
Combination of the compound X and clopyralid olamine salt;
Combination of the compound X and clopyralid potassium salt;
Combination of the compound X and clopyralid triethyl ammonium salt;
Combination of the compound X and picloram potassium salt;
Combination of the compound X and picloram triisopanol ammonium salt;
Combination of the compound X and dalapon;
Combination of the compound X and chlorthiamid;
Combination of the compound X and amidosulfuron;
Combination of the compound X and azimsulfuron;
Combination of the compound X and bensulfuron-methyl;
Combination of the compound X and chlorimuron-ethyl;
Combination of the compound X and cyclosulfamuron;
Combination of the compound X and ethoxysulfuron;
Combination of the compound X and flazasulfuron;
Combination of the compound X and flucetosulfuron;
Combination of the compound X and flupyrsulfuron-methyl-sodium;
Combination of the compound X and foramsulfuron
Combination of the compound X and halosulfuron-methyl;
Combination of the compound X and imazosulfuron;
Combination of the compound X and mesosulfuron-methyl;
Combination of the compound X and metazosulfuron;
Combination of the compound X and nicosulfuron;
Combination of the compound X and orthosulfamuron;
Combination of the compound X and oxasulfuron;
Combination of the compound X and primisulfuron-methyl;
Combination of the compound X and propyrisulfuron;
Combination of the compound X and pyrazosulfuron-ethyl;
Combination of the compound X and rimsulfuron;
Combination of the compound X and sulfometuron-methyl;
Combination of the compound X and sulfosulfuron;
Combination of the compound X and trifloxysulfuron-sodium salt;
Combination of the compound X and chlorsulfuron;
Combination of the compound X and cinosulfuron;
Combination of the compound X and ethametsulfuron;
Combination of the compound X and iodosulfuron-methyl-sodium;
Combination of the compound X and iofensulfuron-sodium;
Combination of the compound X and metsulfuron-methyl;
Combination of the compound X and prosulfuron;
Combination of the compound X and thifensulfuron-methyl;
Combination of the compound X and triasulfuron;
Combination of the compound X and tribenuron-methyl;
Combination of the compound X and triflusulfuron-methyl;
Combination of the compound X and tritosulfuron;
Combination of the compound X and picolinafen;
Combination of the compound X and beflubutamid;
Combination of the compound X and norflurazon;
Combination of the compound X and fluridone;
Combination of the compound X and flurochloridone;
Combination of the compound X and flurtamone;
Combination of the compound X and benzobicyclon;
Combination of the compound X and bicyclopyrone;

Combination of the compound X and mesotrione;
Combination of the compound X and sulcotrione;
Combination of the compound X and tefuryltrione;
Combination of the compound X and tembotrione;
Combination of the compound X and isoxachlortole;
Combination of the compound X and isoxaflutole;
Combination of the compound X and benzofenap;
Combination of the compound X and pyrasulfotole;
Combination of the compound X and pyrazolynate;
Combination of the compound X and pyrazoxyfen;
Combination of the compound X and topramezone;
Combination of the compound X and tolpyralate;
Combination of the compound X and lancotrione-sodium;
Combination of the compound X and flupoxam;
Combination of the compound X and amicarbazone;
Combination of the compound X and bencarbazone;
Combination of the compound X and flucarbazone-sodium salt;
Combination of the compound X and ipfencarbazone;
Combination of the compound X and propoxycarbazone-sodium salt;
Combination of the compound X and thiencarbazone-methyl;
Combination of the compound X and cloransulam-methyl;
Combination of the compound X and diclosulam;
Combination of the compound X and florasulam;
Combination of the compound X and flumetsulam;
Combination of the compound X and metosulam;
Combination of the compound X and penoxsulam;
Combination of the compound X and pyroxsulam;
Combination of the compound X and imazamethabenz-methyl;
Combination of the compound X and imazamox-ammonium salt;
Combination of the compound X and imazapic-ammonium;
Combination of the compound X and imazapyr isopropyl ammonium salt;
Combination of the compound X and imazaquin-ammonium salt;
Combination of the compound X and imazethapyr-ammonium salt;
Combination of the compound X and clodinafop-propargyl;
Combination of the compound X and cyhalofop-butyl;
Combination of the compound X and diclofop-methyl;
Combination of the compound X and fenoxaprop-ethyl;
Combination of the compound X and fenoxaprop-P-ethyl;
Combination of the compound X and fluazifop-butyl;
Combination of the compound X and fluazifop-P-butyl;
Combination of the compound X and haloxyfop-methyl;
Combination of the compound X and haloxyfop-P-methyl;
Combination of the compound X and propaquizafop;
Combination of the compound X and quizalofop-ethyl;
Combination of the compound X and quizalofop-P-ethyl;
Combination of the compound X and alloxydim;
Combination of the compound X and clethodim;
Combination of the compound X and sethoxydim;
Combination of the compound X and tepraloxydim;
Combination of the compound X and tralkoxydim;
Combination of the compound X and pinoxaden;
Combination of the compound X and fenoxasulfone;
Combination of the compound X and glufosinate;
Combination of the compound X and glufosinate-ammonium salt;
Combination of the compound X and glufosinate-P;
Combination of the compound X and glufosinate-P-sodium salt;
Combination of the compound X and bialaphos;
Combination of the compound X and anilofos;
Combination of the compound X and bensulide;
Combination of the compound X and butamifos;
Combination of the compound X and paraquat;
Combination of the compound X and paraquat-dichloride;
Combination of the compound X and diquat;
Combination of the compound X and diquat-dibromide;
Combination of the compound X and halauxifen;
Combination of the compound X and halauxifen-methyl;
Combination of the compound X and florpyrauxifen;
Combination of the compound X and florpyrauxifen-benzyl;
Combination of the compound X and flumioxazin;
Combination of the compound X and flumiclorac-pentyl;
Combination of the compound X and fomesafen-sodium salt;
Combination of the compound X and lactofen;
Combination of the compound X and saflufenacil;
Combination of the compound X and tiafenacil;
Combination of the compound X and trifludimoxazin;
Combination of the compound X and acifluorfen-sodium salt;
Combination of the compound X and aclonifen;
Combination of the compound X and bifenox;
Combination of the compound X and chlomethoxyfen;
Combination of the compound X and chlornitrofen;
Combination of the compound X and ethoxyfen-ethyl;
Combination of the compound X and fluorodifen;
Combination of the compound X and fluoroglycofen-ethyl;
Combination of the compound X and fluoronitrofen;
Combination of the compound X and halosafen;
Combination of the compound X and nitrofen;
Combination of the compound X and nitrofluorfen;
Combination of the compound X and oxyfluorfen;
Combination of the compound X and cinidon-ethyl;
Combination of the compound X and profluazol;
Combination of the compound X and pyraclonil;
Combination of the compound X and oxadiargyl;
Combination of the compound X and oxadiazone;
Combination of the compound X and pentoxazone;
Combination of the compound X and fluazolate;
Combination of the compound X and pyraflufen-ethyl;
Combination of the compound X and benzfendizone;
Combination of the compound X and butafenacil;
Combination of the compound X and fluthiacet-methyl;
Combination of the compound X and thidiazimin;
Combination of the compound X and azafenidin;
Combination of the compound X and carfentrazone-ethyl;
Combination of the compound X and sulfentrazone;
Combination of the compound X and flufenpyr-ethyl;
Combination of the compound X and glyphosate;
Combination of the compound X and glyphosate isopropylammonium salt;
Combination of the compound X and glyphosate ammonium salt;
Combination of the compound X and glyphosate potassium salt;
Combination of the compound X and glyphosatse guanidine salt;
Combination of the compound X and glyphosate dimethylamine salt;

Combination of the compound X and glyphosate monoethanolamine salt;
Combination of the compound X and MCPA;
Combination of the compound X and MCPA dimethylammonium salt;
Combination of the compound X and MCPA 2-ethylhexyl ester;
Combination of the compound X and MCPA isoctyl;
Combination of the compound X and MCPA sodium salt;
Combination of the compound X and MCPB;
Combination of the compound X and mecoprop;
Combination of the compound X and mecoprop dimethyl ammonium salt;
Combination of the compound X and mecoprop diolamine salt;
Combination of the compound X and mecoprop ethadyl;
Combination of the compound X and mecoprop 2-ethylhexyl ester;
Combination of the compound X and mecoprop isoctyl;
Combination of the compound X and mecoprop methyl ester;
Combination of the compound X and mecoprop potassium salt;
Combination of the compound X and mecoprop sodium salt;
Combination of the compound X and mecoprop trolamine salt;
Combination of the compound X and mecoprop P;
Combination of the compound X and mecoprop P dimethylammonium salt;
Combination of the compound X and mecoprop P 2-ethylhexyl ester;
Combination of the compound X and mecoprop P isobutyl ester;
Combination of the compound X and mecoprop P potassium salt;
Combination of the compound X and dichlorprop;
Combination of the compound X and dichlorprop butotyl;
Combination of the compound X and dichlorprop dimethyl ammonium salt;
Combination of the compound X and dichlorprop 2-ethylhexyl ester;
Combination of the compound X and dichlorprop isoctyl;
Combination of the compound X and dichlorprop methyl ester;
Combination of the compound X and dichlorprop potassium salt;
Combination of the compound X and dichlorprop sodium salt;
Combination of the compound X and dichlorprop P;
Combination of the compound X and dichlorprop P dimethyl ammonium salt;
Combination of the flumioxazin and 2,4-D;
Combination of the flumioxazin and 2,4-D ammonium salt;
Combination of the flumioxazin and 2,4-D butotyl ester;
Combination of the flumioxazin and 2,4-D 2-butoxypropyl ester;
Combination of the flumioxazin and 2,4-D butyl ester;
Combination of the flumioxazin and 2,4-D diethyl ammonium salt;
Combination of the flumioxazin and 2,4-D dimethyl ammonium salt;
Combination of the flumioxazin and 2,4-D diolamine salt;
Combination of the flumioxazin and 2,4-D dodecyl ammonium salt;
Combination of the flumioxazin and 2,4-D ethyl ester;
Combination of the flumioxazin and 2,4-D 2-ethylhexyl ester;
Combination of the flumioxazin and 2,4-D heptylammonium salt;
Combination of the flumioxazin and 2,4-D isobutyl ester;
Combination of the flumioxazin and 2,4-D isoctyl ester;
Combination of the flumioxazin and 2,4-D isopropyl ester;
Combination of the flumioxazin and 2,4-D isopropylammonium salt;
Combination of the flumioxazin and 2,4-D lithium salt;
Combination of the flumioxazin and 2,4-D meptyl ester;
Combination of the flumioxazin and 2,4-D methyl ester;
Combination of the flumioxazin and 2,4-D octyl ester;
Combination of the flumioxazin and 2,4-D pentyl ester;
Combination of the flumioxazin and 2,4-D propyl ester;
Combination of the flumioxazin and 2,4-D sodium salt;
Combination of the flumioxazin and 2,4-D tefuryl ester;
Combination of the flumioxazin and 2,4-D tetradecyl ammonium salt;
Combination of the flumioxazin and 2,4-D triethylammonium salt;
Combination of the flumioxazin and 2,4-D tris(2-hydroxypropyl)ammonium salt;
Combination of the flumioxazin and 2,4-D trolamine salt;
Combination of the flumioxazin and 2,4-D choline salt;
Combination of the flumioxazin and 2,4-DB;
Combination of the flumioxazin and 2,4-DB dimethylammonium salt;
Combination of the flumioxazin and 2,4-DB isoctyl ester;
Combination of the flumioxazin and 2,4-DB choline salt;
Combination of the flumioxazin and dicamba;
Combination of the flumioxazin and dicamba diglycolamine salt;
Combination of the flumioxazin and dicamba dimethyl ammonium salt;
Combination of the flumioxazin and dicamba diolamine salt;
Combination of the flumioxazin and dicamba isopropyl ammonium salt;
Combination of the flumioxazin and dicamba methyl ester;
Combination of the flumioxazin and dicamba olamine salt;
Combination of the flumioxazin and dicamba potassium salt;
Combination of the flumioxazin and dicamba sodium salt;
Combination of the flumioxazin and dicamba trolamine salt;
Combination of the flumioxazin and dicamba BAPMA salt;
Combination of the flumioxazin and dicamba choline salt;
Combination of the flumioxazin and pyroxasulfone;
Combination of the flumioxazin and quinchlorac;
Combination of the flumioxazin and quinmerac;
Combination of the flumioxazin and bromoxynil;
Combination of the flumioxazin and bromoxynil-octanoate;
Combination of the flumioxazin and dichlobenil;
Combination of the flumioxazin and methiozolin;
Combination of the flumioxazin and ioxynil;
Combination of the flumioxazin and ioxynil-octanoate;
Combination of the flumioxazin and di-allate;
Combination of the flumioxazin and butylate;
Combination of the flumioxazin and tri-allate;
Combination of the flumioxazin and phenmedipham;
Combination of the flumioxazin and chlorpropham;

Combination of the flumioxazin and desmedipham;
Combination of the flumioxazin and asulam;
Combination of the flumioxazin and phenisopham;
Combination of the flumiocarb and benthiocarb;
Combination of the flumioxazin and molinate;
Combination of the flumioxazin and esprocarb;
Combination of the flumioxazin and pyributicarb;
Combination of the flumioxazin and prosulfocarb;
Combination of the flumioxazin and orbencarb;
Combination of the flumioxazin and EPTC;
Combination of the flumioxazin and dimepiperate;
Combination of the flumioxazin and swep;
Combination of the flumioxazin and propachlor;
Combination of the flumioxazin and metazachlor;
Combination of the flumioxazin and alachlor;
Combination of the flumioxazin and acetochlor;
Combination of the flumioxazin and metolachlor;
Combination of the flumioxazin and S-metolachlor;
Combination of the flumioxazin and butachlor;
Combination of the flumioxazin and pretilachlor;
Combination of the flumioxazin and thenylchlor;
Combination of the flumioxazin and aminocyclopyrachlor;
Combination of the flumioxazin and aminocyclopyrachlor-methyl;
Combination of the flumioxazin and aminocyclopyrachlor-potassium;
Combination of the flumioxazin and trifluralin;
Combination of the flumioxazin and pendimethalin;
Combination of the flumioxazin and ethalfluralin;
Combination of the flumioxazin and benfluralin;
Combination of the flumioxazin and prodiamine;
Combination of the flumioxazin and simazine;
Combination of the flumioxazin and atrazine;
Combination of the flumioxazin and propazine;
Combination of the flumioxazin and cyanazine;
Combination of the flumioxazin and ametryn;
Combination of the flumioxazin and simetryn;
Combination of the flumioxazin and dimethametryn;
Combination of the flumioxazin and indaziflam;
Combination of the flumioxazin and triaziflam;
Combination of the flumioxazin and metribuzin;
Combination of the flumioxazin and hexazinone;
Combination of the flumioxazin and terbumeton;
Combination of the flumioxazin and terbuthylazine;
Combination of the flumioxazin and terbutryn;
Combination of the flumioxazin and trietazine;
Combination of the flumioxazin and isoxaben;
Combination of the flumioxazin and diflufenican;
Combination of the flumioxazin and diuron;
Combination of the flumioxazin and linuron;
Combination of the flumioxazin and metobromuron;
Combination of the flumioxazin and metoxuron;
Combination of the flumioxazin and monolinuron;
Combination of the flumioxazin and siduron;
Combination of the flumioxazin and fluometuron;
Combination of the flumioxazin and difenoxuron;
Combination of the flumioxazin and methyl-daimuron;
Combination of the flumioxazin and isoproturon;
Combination of the flumioxazin and isouron;
Combination of the flumioxazin and tebuthiuron;
Combination of the flumioxazin and benzthiazuron;
Combination of the flumioxazin and methabenzthiazuron;
Combination of the flumioxazin and propanil;
Combination of the flumioxazin and mefenacet;
Combination of the flumioxazin and clomeprop;
Combination of the flumioxazin and naproanilide;
Combination of the flumioxazin and bromobutide;
Combination of the flumioxazin and daimuron;
Combination of the flumioxazin and cumyluron;
Combination of the flumioxazin and diflufenzopyr;
Combination of the flumioxazin and etobenzanid;
Combination of the flumioxazin and bentazon;
Combination of the flumioxazin and tridiphane;
Combination of the flumioxazin and indanofan;
Combination of the flumioxazin and amitrole;
Combination of the flumioxazin and fenchlorazole-ethyl;
Combination of the flumioxazin and mefenpyr-diethyl;
Combination of the flumioxazin and benoxacor;
Combination of the flumioxazin and dichlormid;
Combination of the flumioxazin and cloquintocet-mexyl;
Combination of the flumioxazin and cyprosulfamide;
Combination of the flumioxazin and isoxadifen-ethyl;
Combination of the flumioxazin and clomazone;
Combination of the flumioxazin and maleic hydrazide;
Combination of the flumioxazin and pyridate;
Combination of the flumioxazin and chloridazon;
Combination of the flumioxazin and bromacil;
Combination of the flumioxazin and terbacil;
Combination of the flumioxazin and lenacil;
Combination of the flumioxazin and oxaziclomefone;
Combination of the flumioxazin and cinmethylin;
Combination of the flumioxazin and benfuresate;
Combination of the flumioxazin and cafenstrole;
Combination of the flumioxazin and flufenacet;
Combination of the flumioxazin and pyrithiobac;
Combination of the flumioxazin and pyrithiobac-sodium;
Combination of the flumioxazin and pyriminobac;
Combination of the flumioxazin and pyriminobac-methyl;
Combination of the flumioxazin and bispyribac;
Combination of the flumioxazin and bispyribac-sodium;
Combination of the flumioxazin and pyribenzoxim;
Combination of the flumioxazin and pyrimisulfan;
Combination of the flumioxazin and pyriftalid;
Combination of the flumioxazin and triafamone;
Combination of the flumioxazin and fentrazamide;
Combination of the flumioxazin and dimethenamid;
Combination of the flumioxazin and dimethenamid-P;
Combination of the flumioxazin and ACN;
Combination of the flumioxazin and dithiopyr;
Combination of the flumioxazin and triclopyr;
Combination of the flumioxazin and triclopyr-butotyl;
Combination of the flumioxazin and triclopyr ammonium salt;
Combination of the flumioxazin and fluroxypyr;
Combination of the flumioxazin and fluroxypyr-meptyl;
Combination of the flumioxazin and thiazopyr;
Combination of the flumioxazin and aminopyralid;
Combination of the flumioxazin and aminopyralid potassium salt;
Combination of the flumioxazin and aminopyralid triisopanol ammonium salt;
Combination of the flumioxazin and clopyralid olamine salt;
Combination of the flumioxazin and clopyralid potassium salt;
Combination of the flumioxazin and clopyralid triethyl ammonium salt;
Combination of the flumioxazin and picloram potassium salt;
Combination of the flumioxazin and picloram triisopanol ammonium salt;
Combination of the flumioxazin and dalapon;
Combination of the flumioxazin and chlorthiamid;

Combination of the flumioxazin and amidosulfuron;
Combination of the flumioxazin and azimsulfuron;
Combination of the flumioxazin and bensulfuron-methyl;
Combination of the flumioxazin and chlorimuron-ethyl;
Combination of the flumioxazin and cyclosulfamuron;
Combination of the flumioxazin and ethoxysulfuron;
Combination of the flumioxazin and flazasulfuron;
Combination of the flumioxazin and flucetosulfuron;
Combination of the flumioxazin and flupyrsulfuron-methyl-sodium;
Combination of the flumioxazin and foramsulfuron
Combination of the flumioxazin and halosulfuron-methyl;
Combination of the flumioxazin and imazosulfuron;
Combination of the flumioxazin and mesosulfuron-methyl;
Combination of the flumioxazin and metazosulfuron;
Combination of the flumioxazin and nicosulfuron;
Combination of the flumioxazin and orthosulfamuron;
Combination of the flumioxazin and oxasulfuron;
Combination of the flumioxazin and primisulfuron-methyl;
Combination of the flumioxazin and propyrisulfuron;
Combination of the flumioxazin and pyrazosulfuron-ethyl;
Combination of the flumioxazin and rimsulfuron;
Combination of the flumioxazin and sulfometuron-methyl;
Combination of the flumioxazin and sulfosulfuron;
Combination of the flumioxazin and trifloxysulfuron-sodium salt;
Combination of the flumioxazin and chlorsulfuron;
Combination of the flumioxazin and cinosulfuron;
Combination of the flumioxazin and ethametsulfuron;
Combination of the flumioxazin and iodosulfuron-methyl-sodium;
Combination of the flumioxazin and iofensulfuron-sodium;
Combination of the flumioxazin and metsulfuron-methyl;
Combination of the flumioxazin and prosulfuron;
Combination of the flumioxazin and thifensulfuron-methyl;
Combination of the flumioxazin and triasulfuron;
Combination of the flumioxazin and tribenuron-methyl;
Combination of the flumioxazin and triflusulfuron-methyl;
Combination of the flumioxazin and tritosulfuron;
Combination of the flumioxazin and picolinafen;
Combination of the flumioxazin and beflubutamid;
Combination of the flumioxazin and norflurazon;
Combination of the flumioxazin and fluridone;
Combination of the flumioxazin and flurochloridone;
Combination of the flumioxazin and flurtamone;
Combination of the flumioxazin and benzobicyclon;
Combination of the flumioxazin and bicyclopyrone;
Combination of the flumioxazin and mesotrione;
Combination of the flumioxazin and sulcotrione;
Combination of the flumioxazin and tefuryltrione;
Combination of the flumioxazin and tembotrione;
Combination of the flumioxazin and isoxachlortole;
Combination of the flumioxazin and isoxaflutole;
Combination of the flumioxazin and benzofenap;
Combination of the flumioxazin and pyrasulfotole;
Combination of the flumioxazin and pyrazolynate;
Combination of the flumioxazin and pyrazoxyfen;
Combination of the flumioxazin and topramezone;
Combination of the flumioxazin and tolpyralate;
Combination of the flumioxazin and lancotrione-sodium;
Combination of the flumioxazin and flupoxam;
Combination of the flumioxazin and amicarbazone;
Combination of the flumioxazin and bencarbazone;
Combination of the flumioxazin and flucarbazone-sodium salt;
Combination of the flumioxazin and ipfencarbazone;
Combination of the flumioxazin and propoxycarbazone-sodium salt;
Combination of the flumioxazin and thiencarbazone-methyl;
Combination of the flumioxazin and cloransulam-methyl;
Combination of the flumioxazin and diclosulam;
Combination of the flumioxazin and florasulam;
Combination of the flumioxazin and flumetsulam;
Combination of the flumioxazin and metosulam;
Combination of the flumioxazin and penoxsulam;
Combination of the flumioxazin and pyroxsulam;
Combination of the flumioxazin and imazamethabenz-methyl;
Combination of the flumioxazin and imazamox-ammonium salt;
Combination of the flumioxazin and imazapic-ammonium;
Combination of the flumioxazin and imazapyr isopropyl ammonium salt;
Combination of the flumioxazin and imazaquin-ammonium salt;
Combination of the flumioxazin and imazethapyr-ammonium salt;
Combination of the flumioxazin and clodinafop-propargyl;
Combination of the flumioxazin and cyhalofop-butyl;
Combination of the flumioxazin and diclofop-methyl;
Combination of the flumioxazin and fenoxaprop-ethyl;
Combination of the flumioxazin and fenoxaprop-P-ethyl;
Combination of the flumioxazin and fluazifop-butyl;
Combination of the flumioxazin and fluazifop-P-butyl;
Combination of the flumioxazin and haloxyfop-methyl;
Combination of the flumioxazin and haloxyfop-P-methyl;
Combination of the flumioxazin and propaquizafop;
Combination of the flumioxazin and quizalofop-ethyl;
Combination of the flumioxazin and quizalofop-P-ethyl;
Combination of the flumioxazin and alloxydim;
Combination of the flumioxazin and clethodim;
Combination of the flumioxazin and sethoxydim;
Combination of the flumioxazin and tepraloxydim;
Combination of the flumioxazin and tralkoxydim;
Combination of the flumioxazin and pinoxaden;
Combination of the flumioxazin and fenoxasulfone;
Combination of the flumioxazin and glufosinate;
Combination of the flumioxazin and glufosinate-ammonium salt;
Combination of the flumioxazin and glufosinate-P;
Combination of the flumioxazin and glufosinate-P-sodium salt;
Combination of the flumioxazin and bialaphos;
Combination of the flumioxazin and anilofos;
Combination of the flumioxazin and bensulide;
Combination of the flumioxazin and butamifos;
Combination of the flumioxazin and paraquat;
Combination of the flumioxazin and paraquat-dichloride;
Combination of the flumioxazin and diquat;
Combination of the flumioxazin and diquat-dibromide;
Combination of the flumioxazin and halauxifen;
Combination of the flumioxazin and halauxifen-methyl;
Combination of the flumioxazin and florpyrauxifen;

Combination of the flumioxazin and florpyrauxifen-benzyl;
Combination of the flumioxazin and flumiclorac-pentyl;
Combination of the flumioxazin and fomesafen-sodium salt;
Combination of the flumioxazin and lactofen;
Combination of the flumioxazin and saflufenacil;
Combination of the flumioxazin and tiafenacil;
Combination of the flumioxazin and trifludimoxazin;
Combination of the flumioxazin and acifluorfen-sodium salt;
Combination of the flumioxazin and aclonifen;
Combination of the flumioxazin and bifenox;
Combination of the flumioxazin and chlomethoxyfen;
Combination of the flumioxazin and chlornitrofen;
Combination of the flumioxazin and ethoxyfen-ethyl;
Combination of the flumioxazin and fluorodifen;
Combination of the flumioxazin and fluoroglycofen-ethyl;
Combination of the flumioxazin and fluoronitrofen;
Combination of the flumioxazin and halosafen;
Combination of the flumioxazin and nitrofen;
Combination of the flumioxazin and nitrofluorfen;
Combination of the flumioxazin and oxyfluorfen;
Combination of the flumioxazin and cinidon-ethyl;
Combination of the flumioxazin and profluazol;
Combination of the flumioxazin and pyraclonil;
Combination of the flumioxazin and oxadiargyl;
Combination of the flumioxazin and oxadiazone;
Combination of the flumioxazin and pentoxazone;
Combination of the flumioxazin and fluazolate;
Combination of the flumioxazin and pyraflufen-ethyl;
Combination of the flumioxazin and benzfendizone;
Combination of the flumioxazin and butafenacil;
Combination of the flumioxazin and fluthiacet-methyl;
Combination of the flumioxazin and thidiazimin;
Combination of the flumioxazin and azafenidin;
Combination of the flumioxazin and carfentrazone-ethyl;
Combination of the flumioxazin and sulfentrazone;
Combination of the flumioxazin and flufenpyr-ethyl;
Combination of the flumioxazin and glyphosate;
Combination of the flumioxazin and glyphosate isopropylammonium salt;
Combination of the flumioxazin and glyphosate ammonium salt;
Combination of the flumioxazin and glyphosate potassium salt;
Combination of the flumioxazin and glyphosatse guanidine salt;
Combination of the flumioxazin and glyphosate dimethylamine salt;
Combination of the flumioxazin and glyphosate monoethanolamine salt;
Combination of the flumioxazin and MCPA;
Combination of the flumioxazin and MCPA dimethylammonium salt;
Combination of the flumioxazin and MCPA 2-ethylhexyl ester;
Combination of the flumioxazin and MCPA isoctyl;
Combination of the flumioxazin and MCPA sodium salt;
Combination of the flumioxazin and MCPB;
Combination of the flumioxazin and mecoprop;
Combination of the flumioxazin and mecoprop dimethyl ammonium salt;
Combination of the flumioxazin and mecoprop diolamine salt;
Combination of the flumioxazin and mecoprop ethadyl;
Combination of the flumioxazin and mecoprop 2-ethylhexyl ester;
Combination of the flumioxazin and mecoprop isoctyl;
Combination of the flumioxazin and mecoprop methyl ester;
Combination of the flumioxazin and mecoprop potassium salt;
Combination of the flumioxazin and mecoprop sodium salt;
Combination of the flumioxazin and mecoprop trolamine salt;
Combination of the flumioxazin and mecoprop P;
Combination of the flumioxazin and mecoprop P dimethylammonium salt;
Combination of the flumioxazin and mecoprop P 2-ethylhexyl ester;
Combination of the flumioxazin and mecoprop P isobutyl ester;
Combination of the flumioxazin and mecoprop P potassium salt;
Combination of the flumioxazin and dichlorprop;
Combination of the flumioxazin and dichlorprop butotyl;
Combination of the flumioxazin and dichlorprop dimethyl ammonium salt;
Combination of the flumioxazin and dichlorprop 2-ethylhexyl ester;
Combination of the flumioxazin and dichlorprop isoctyl;
Combination of the flumioxazin and dichlorprop methyl ester;
Combination of the flumioxazin and dichlorprop potassium salt;
Combination of the flumioxazin and dichlorprop sodium salt;
Combination of the flumioxazin and dichlorprop P;
Combination of the flumioxazin and dichlorprop P dimethyl ammonium salt;

In the present method for controlling harmful organisms, examples of combinations in a case where the number of compounds A used to treat the crop seeds is two or more are listed in Tables 1 to 3, but the examples are not limited thereto.

TABLE 1

| Combination No. | Combination of compounds | |
|---|---|---|
| 1-1 | Clothianidin | Ipconazole |
| 1-2 | Clothianidin | Metconazole |
| 1-3 | Clothianidin | Difenoconazole |
| 1-4 | Clothianidin | Tebuconazole |
| 1-5 | Clothianidin | Prothioconazole |
| 1-6 | Clothianidin | Fluquinconazole |
| 1-7 | Clothianidin | Triticonazole |
| 1-8 | Clothianidin | Imazalil |
| 1-9 | Clothianidin | Pencycuron |
| 1-10 | Clothianidin | Prochloraz |
| 1-11 | Clothianidin | Pyraclostrobin |
| 1-12 | Clothianidin | Azoxystrobin |
| 1-13 | Clothianidin | Trifloxystrobin |
| 1-14 | Clothianidin | Metalaxyl |
| 1-15 | Clothianidin | Metalaxyl-M |
| 1-16 | Clothianidin | Fludioxonil |
| 1-17 | Clothianidin | Thiram |
| 1-18 | Clothianidin | Mancozeb |
| 1-19 | Clothianidin | Flutolanil |
| 1-20 | Clothianidin | Sedaxane |
| 1-21 | Clothianidin | Penflufen |
| 1-22 | Clothianidin | Fluxapyroxad |
| 1-23 | Clothianidin | *Bacillus firmus* |
| 1-24 | Clothianidin | *Pasteuria penetrans* |
| 1-25 | Clothianidin | Abamectin |

TABLE 1-continued

| Combination No. | Combination of compounds | |
|---|---|---|
| 1-26 | Clothianidin | Thiodicarb |
| 1-27 | Clothianidin | Tolclofos-methyl |
| 1-28 | Clothianidin | Ethaboxam |
| 1-29 | Clothianidin | Compound 1 |
| 1-30 | Clothianidin | Mandestrobin |
| 1-31 | Clothianidin | Compound 2 |
| 1-32 | Clothianidin | Orysastrobin |
| 1-33 | Clothianidin | Isotianil |
| 1-34 | Clothianidin | Probenazole |
| 1-35 | Clothianidin | Diclocymet |
| 1-36 | Clothianidin | Furametpyr |
| 1-37 | Imidacloprid | Ipconazole |
| 1-38 | Imidacloprid | Metconazole |
| 1-39 | Imidacloprid | Difenoconazole |
| 1-40 | Imidacloprid | Tebuconazole |
| 1-41 | Imidacloprid | Prothioconazole |
| 1-42 | Imidacloprid | Fluquinconazole |
| 1-43 | Imidacloprid | Triticonazole |
| 1-44 | Imidacloprid | Imazalil |
| 1-45 | Imidacloprid | Pencycuron |
| 1-46 | Imidacloprid | Prochloraz |
| 1-47 | Imidacloprid | Pyraclostrobin |
| 1-48 | Imidacloprid | Azoxystrobin |
| 1-49 | Imidacloprid | Trifloxystrobin |
| 1-50 | Imidacloprid | Metalaxyl |
| 1-51 | Imidacloprid | Metalaxyl-M |
| 1-52 | Imidacloprid | Fludioxonil |
| 1-53 | Imidacloprid | Thiram |
| 1-54 | Imidacloprid | Mancozeb |
| 1-55 | Imidacloprid | Flutolanil |
| 1-56 | Imidacloprid | Sedaxane |
| 1-57 | Imidacloprid | Penflufen |
| 1-58 | Imidacloprid | Fluxapyroxad |
| 1-59 | Imidacloprid | *Bacillus firmus* |
| 1-60 | Imidacloprid | *Pasteuria penetrans* |
| 1-61 | Imidacloprid | Abamectin |
| 1-62 | Imidacloprid | Thiodicarb |
| 1-63 | Imidacloprid | Tolclofos-methyl |
| 1-64 | Imidacloprid | Ethaboxam |
| 1-65 | Imidacloprid | Compound 1 |
| 1-66 | Imidacloprid | Mandestrobin |
| 1-67 | Imidacloprid | Compound 2 |
| 1-68 | Imidacloprid | Orysastrobin |
| 1-69 | Imidacloprid | Isotianil |
| 1-70 | Imidacloprid | Probenazole |
| 1-71 | Imidacloprid | Diclocymet |
| 1-72 | Imidacloprid | Furametpyr |
| 1-73 | Thiamethoxam | Ipconazole |
| 1-74 | Thiamethoxam | Metconazole |
| 1-75 | Thiamethoxam | Difenoconazole |
| 1-76 | Thiamethoxam | Tebuconazole |
| 1-77 | Thiamethoxam | Prothioconazole |
| 1-78 | Thiamethoxam | Fluquinconazole |
| 1-79 | Thiamethoxam | Triticonazole |
| 1-80 | Thiamethoxam | Imazalil |
| 1-81 | Thiamethoxam | Pencycuron |
| 1-82 | Thiamethoxam | Prochloraz |
| 1-83 | Thiamethoxam | Pyraclostrobin |
| 1-84 | Thiamethoxam | Azoxystrobin |
| 1-85 | Thiamethoxam | Trifloxystrobin |
| 1-86 | Thiamethoxam | Metalaxyl |
| 1-87 | Thiamethoxam | Metalaxyl-M |
| 1-88 | Thiamethoxam | Fludioxonil |
| 1-89 | Thiamethoxam | Thiram |
| 1-90 | Thiamethoxam | Mancozeb |
| 1-91 | Thiamethoxam | Flutolanil |
| 1-92 | Thiamethoxam | Sedaxane |
| 1-93 | Thiamethoxam | Penflufen |
| 1-94 | Thiamethoxam | Fluxapyroxad |
| 1-95 | Thiamethoxam | *Bacillus firmus* |
| 1-96 | Thiamethoxam | *Pasteuria penetrans* |
| 1-97 | Thiamethoxam | Abamectin |
| 1-98 | Thiamethoxam | Thiodicarb |
| 1-99 | Thiamethoxam | Tolclofos-methyl |
| 1-100 | Thiamethoxam | Ethaboxam |
| 1-101 | Thiamethoxam | Compound 1 |
| 1-102 | Thiamethoxam | Mandestrobin |
| 1-103 | Thiamethoxam | Compound 2 |
| 1-104 | Thiamethoxam | Orysastrobin |
| 1-105 | Thiamethoxam | Isotianil |
| 1-106 | Thiamethoxam | Probenazole |
| 1-107 | Thiamethoxam | Diclocymet |
| 1-108 | Thiamethoxam | Furametpyr |
| 1-109 | Beta-cyfluthrin | Ipconazole |
| 1-110 | Beta-cyfluthrin | Metconazole |
| 1-111 | Beta-cyfluthrin | Difenoconazole |
| 1-112 | Beta-cyfluthrin | Tebuconazole |
| 1-113 | Beta-cyfluthrin | Prothioconazole |
| 1-114 | Beta-cyfluthrin | Fluquinconazole |
| 1-115 | Beta-cyfluthrin | Triticonazole |
| 1-116 | Beta-cyfluthrin | Imazalil |
| 1-117 | Beta-cyfluthrin | Pencycuron |
| 1-118 | Beta-cyfluthrin | Prochloraz |
| 1-119 | Beta-cyfluthrin | Pyraclostrobin |
| 1-120 | Beta-cyfluthrin | Azoxystrobin |
| 1-121 | Beta-cyfluthrin | Trifloxystrobin |
| 1-122 | Beta-cyfluthrin | Metalaxyl |
| 1-123 | Beta-cyfluthrin | Metalaxyl-M |
| 1-124 | Beta-cyfluthrin | Fludioxonil |
| 1-125 | Beta-cyfluthrin | Thiram |
| 1-126 | Beta-cyfluthrin | Mancozeb |
| 1-127 | Beta-cyfluthrin | Flutolanil |
| 1-128 | Beta-cyfluthrin | Sedaxane |
| 1-129 | Beta-cyfluthrin | Penflufen |
| 1-130 | Beta-cyfluthrin | Fluxapyroxad |
| 1-131 | Beta-cyfluthrin | *Bacillus firmus* |
| 1-132 | Beta-cyfluthrin | *Pasteuria penetrans* |
| 1-133 | Beta-cyfluthrin | Abamectin |
| 1-134 | Beta-cyfluthrin | Thiodicarb |
| 1-135 | Beta-cyfluthrin | Tolclofos-methyl |
| 1-136 | Beta-cyfluthrin | Ethaboxam |
| 1-137 | Beta-cyfluthrin | Compound 1 |
| 1-138 | Beta-cyfluthrin | Mandestrobin |
| 1-139 | Beta-cyfluthrin | Compound 2 |
| 1-140 | Abamectin | Ipconazole |
| 1-141 | Abamectin | Metconazole |
| 1-142 | Abamectin | Difenoconazole |
| 1-143 | Abamectin | Tebuconazole |
| 1-144 | Abamectin | Prothioconazole |
| 1-145 | Abamectin | Fluquinconazole |
| 1-146 | Abamectin | Triticonazole |
| 1-147 | Abamectin | Imazalil |
| 1-148 | Abamectin | Pencycuron |
| 1-149 | Abamectin | Prochloraz |
| 1-150 | Abamectin | Pyraclostrobin |
| 1-151 | Abamectin | Azoxystrobin |
| 1-152 | Abamectin | Trifloxystrobin |
| 1-153 | Abamectin | Metalaxyl |
| 1-154 | Abamectin | Metalaxyl-M |
| 1-155 | Abamectin | Fludioxonil |
| 1-156 | Abamectin | Thiram |
| 1-157 | Abamectin | Mancozeb |
| 1-158 | Abamectin | Flutolanil |
| 1-159 | Abamectin | Sedaxane |
| 1-160 | Abamectin | Penflufen |
| 1-161 | Abamectin | Fluxapyroxad |
| 1-162 | Abamectin | *Bacillus firmus* |
| 1-163 | Abamectin | *Pasteuria penetrans* |
| 1-164 | Abamectin | Thiodicarb |
| 1-165 | Abamectin | Tolclofos-methyl |
| 1-166 | Abamectin | Ethaboxam |
| 1-167 | Abamectin | Compound 1 |
| 1-168 | Abamectin | Mandestrobin |
| 1-169 | Abamectin | Compound 2 |
| 1-170 | Thiodicarb | Ipconazole |
| 1-171 | Thiodicarb | Metconazole |
| 1-172 | Thiodicarb | Difenoconazole |
| 1-173 | Thiodicarb | Tebuconazole |
| 1-174 | Thiodicarb | Prothioconazole |
| 1-175 | Thiodicarb | Fluquinconazole |
| 1-176 | Thiodicarb | Triticonazole |
| 1-177 | Thiodicarb | Imazalil |
| 1-178 | Thiodicarb | Pencycuron |
| 1-179 | Thiodicarb | Prochloraz |
| 1-180 | Thiodicarb | Pyraclostrobin |
| 1-181 | Thiodicarb | Azoxystrobin |

TABLE 1-continued

| Combination No. | Combination of compounds | |
|---|---|---|
| 1-182 | Thiodicarb | Trifloxystrobin |
| 1-183 | Thiodicarb | Metalaxyl |
| 1-184 | Thiodicarb | Metalaxyl-M |
| 1-185 | Thiodicarb | Fludioxonil |
| 1-186 | Thiodicarb | Thiram |
| 1-187 | Thiodicarb | Mancozeb |
| 1-188 | Thiodicarb | Flutolanil |
| 1-189 | Thiodicarb | Sedaxane |
| 1-190 | Thiodicarb | Penflufen |
| 1-191 | Thiodicarb | Fluxapyroxad |
| 1-192 | Thiodicarb | Bacillus firmus |
| 1-193 | Thiodicarb | Pasteuria penetrans |
| 1-194 | Thiodicarb | Tolclofos-methyl |
| 1-195 | Thiodicarb | Ethaboxam |
| 1-196 | Thiodicarb | Compound 1 |
| 1-197 | Thiodicarb | Mandestrobin |
| 1-198 | Thiodicarb | Compound 2 |
| 1-199 | Thiodicarb | Furametpyr |
| 1-200 | Metalaxyl | Ipconazole |
| 1-201 | Metalaxyl | Metconazole |
| 1-202 | Metalaxyl | Difenoconazole |
| 1-203 | Metalaxyl | Tebuconazole |
| 1-204 | Metalaxyl | Prothioconazole |
| 1-205 | Metalaxyl | Fluquinconazole |
| 1-206 | Metalaxyl | Triticonazole |
| 1-207 | Metalaxyl | Imazalil |
| 1-208 | Metalaxyl | Pencycuron |
| 1-209 | Metalaxyl | Prochloraz |
| 1-210 | Metalaxyl | Pyraclostrobin |
| 1-211 | Metalaxyl | Azoxystrobin |
| 1-212 | Metalaxyl | Trifloxystrobin |
| 1-213 | Metalaxyl | Fludioxonil |
| 1-214 | Metalaxyl | Thiram |
| 1-215 | Metalaxyl | Flutolanil |
| 1-216 | Metalaxyl | Sedaxane |
| 1-217 | Metalaxyl | Penflufen |
| 1-218 | Metalaxyl | Fluxapyroxad |
| 1-219 | Metalaxyl | Bacillus firmus |
| 1-220 | Metalaxyl | Pasteuria penetrans |
| 1-221 | Metalaxyl | Tolclofos-methyl |
| 1-222 | Metalaxyl | Ethaboxam |
| 1-223 | Metalaxyl | Compound 1 |
| 1-224 | Metalaxyl | Mandestrobin |
| 1-225 | Metalaxyl | Compound 2 |
| 1-226 | Metalaxyl | Furametpyr |
| 1-227 | Metalaxyl-M | Ipconazole |
| 1-228 | Metalaxyl-M | Metconazole |
| 1-229 | Metalaxyl-M | Difenoconazole |
| 1-230 | Metalaxyl-M | Tebuconazole |
| 1-231 | Metalaxyl-M | Prothioconazole |
| 1-232 | Metalaxyl-M | Fluquinconazole |
| 1-233 | Metalaxyl-M | Triticonazole |
| 1-234 | Metalaxyl-M | Imazalil |
| 1-235 | Metalaxyl-M | Pencycuron |
| 1-236 | Metalaxyl-M | Prochloraz |
| 1-237 | Metalaxyl-M | Pyraclostrobin |
| 1-238 | Metalaxyl-M | Azoxystrobin |
| 1-239 | Metalaxyl-M | Trifloxystrobin |
| 1-240 | Metalaxyl-M | Fludioxonil |
| 1-241 | Metalaxyl-M | Thiram |
| 1-242 | Metalaxyl-M | Flutolanil |
| 1-243 | Metalaxyl-M | Sedaxane |
| 1-244 | Metalaxyl-M | Penflufen |
| 1-245 | Metalaxyl-M | Fluxapyroxad |
| 1-246 | Metalaxyl-M | Bacillus firmus |
| 1-247 | Metalaxyl-M | Pasteuria penetrans |
| 1-248 | Metalaxyl-M | Tolclofos-methyl |
| 1-249 | Metalaxyl-M | Ethaboxam |
| 1-250 | Metalaxyl-M | Compound 1 |
| 1-251 | Metalaxyl-M | Mandestrobin |
| 1-252 | Metalaxyl-M | Compound 2 |
| 1-253 | Metalaxyl-M | Furametpyr |
| 1-254 | Fludioxonil | Ipconazole |
| 1-255 | Fludioxonil | Metconazole |
| 1-256 | Fludioxonil | Difenoconazole |
| 1-257 | Fludioxonil | Tebuconazole |
| 1-258 | Fludioxonil | Prothioconazole |
| 1-259 | Fludioxonil | Fluquinconazole |
| 1-260 | Fludioxonil | Triticonazole |
| 1-261 | Fludioxonil | Imazalil |
| 1-262 | Fludioxonil | Pencycuron |
| 1-263 | Fludioxonil | Prochloraz |
| 1-264 | Fludioxonil | Pyraclostrobin |
| 1-265 | Fludioxonil | Azoxystrobin |
| 1-266 | Fludioxonil | Trifloxystrobin |
| 1-267 | Fludioxonil | Thiram |
| 1-268 | Fludioxonil | Flutolanil |
| 1-269 | Fludioxonil | Sedaxane |
| 1-270 | Fludioxonil | Penflufen |
| 1-271 | Fludioxonil | Fluxapyroxad |
| 1-272 | Fludioxonil | Bacillus firmus |
| 1-273 | Fludioxonil | Pasteuria penetrans |
| 1-274 | Fludioxonil | Tolclofos-methyl |
| 1-275 | Fludioxonil | Ethaboxam |
| 1-276 | Fludioxonil | Compound 1 |
| 1-277 | Fludioxonil | Mandestrobin |
| 1-278 | Fludioxonil | Compound 2 |
| 1-279 | Fludioxonil | Furametpyr |
| 1-280 | Ipconazole | Pyraclostrobin |
| 1-281 | Ipconazole | Azoxystrobin |
| 1-282 | Ipconazole | Trifloxystrobin |
| 1-283 | Ipconazole | Thiram |
| 1-284 | Ipconazole | Flutolanil |
| 1-285 | Ipconazole | Sedaxane |
| 1-286 | Ipconazole | Penflufen |
| 1-287 | Ipconazole | Fluxapyroxad |
| 1-288 | Ipconazole | Bacillus firmus |
| 1-289 | Ipconazole | Pasteuria penetrans |
| 1-290 | Ipconazole | Tolclofos-methyl |
| 1-291 | Ipconazole | Ethaboxam |
| 1-292 | Ipconazole | Compound 1 |
| 1-293 | Ipconazole | Mandestrobin |
| 1-294 | Ipconazole | Compound 2 |
| 1-295 | Metconazole | Pyraclostrobin |
| 1-296 | Metconazole | Azoxystrobin |
| 1-297 | Metconazole | Trifloxystrobin |
| 1-298 | Metconazole | Thiram |
| 1-299 | Metconazole | Flutolanil |
| 1-300 | Metconazole | Sedaxane |
| 1-301 | Metconazole | Penflufen |
| 1-302 | Metconazole | Fluxapyroxad |
| 1-303 | Metconazole | Bacillus firmus |
| 1-304 | Metconazole | Pasteuria penetrans |
| 1-305 | Metconazole | Tolclofos-methyl |
| 1-306 | Metconazole | Ethaboxam |
| 1-307 | Metconazole | Compound 1 |
| 1-308 | Metconazole | Mandestrobin |
| 1-309 | Metconazole | Compound 2 |
| 1-310 | Difenoconazole | Pyraclostrobin |
| 1-311 | Difenoconazole | Azoxystrobin |
| 1-312 | Difenoconazole | Trifloxystrobin |
| 1-313 | Difenoconazole | Thiram |
| 1-314 | Difenoconazole | Flutolanil |
| 1-315 | Difenoconazole | Sedaxane |
| 1-316 | Difenoconazole | Penflufen |
| 1-317 | Difenoconazole | Fluxapyroxad |
| 1-318 | Difenoconazole | Bacillus firmus |
| 1-319 | Difenoconazole | Pasteuria penetrans |
| 1-320 | Difenoconazole | Tolclofos-methyl |
| 1-321 | Difenoconazole | Ethaboxam |
| 1-322 | Difenoconazole | Compound 1 |
| 1-323 | Difenoconazole | Mandestrobin |
| 1-324 | Difenoconazole | Compound 2 |
| 1-325 | Prothioconazole | Pyraclostrobin |
| 1-326 | Prothioconazole | Azoxystrobin |
| 1-327 | Prothioconazole | Trifloxystrobin |
| 1-328 | Prothioconazole | Thiram |
| 1-329 | Prothioconazole | Flutolanil |
| 1-330 | Prothioconazole | Sedaxane |
| 1-331 | Prothioconazole | Penflufen |
| 1-332 | Prothioconazole | Fluxapyroxad |
| 1-333 | Prothioconazole | Bacillus firmus |
| 1-334 | Prothioconazole | Pasteuria penetrans |
| 1-335 | Prothioconazole | Tolclofos-methyl |
| 1-336 | Prothioconazole | Ethaboxam |
| 1-337 | Prothioconazole | Compound 1 |

TABLE 1-continued

| Combination No. | Combination of compounds | |
|---|---|---|
| 1-338 | Prothioconazole | Mandestrobin |
| 1-339 | Prothioconazole | Compound 2 |
| 1-340 | Fipronil | Tefluthrin |
| 1-341 | Imidacloprid | Tefluthrin |
| 1-342 | Carboxin | Thiram |
| 1-343 | Pyraclostrobin | Fluxapyroxad |
| 1-344 | Flutolanil | Mancozeb |
| 1-345 | Fluquinconazole | Prochloraz |

TABLE 2

| Combination No. | Combination of compounds | |
|---|---|---|
| 2-1 | 1-14 | Pyraclostrobin |
| 2-2 | 1-14 | Azoxystrobin |
| 2-3 | 1-14 | Trifloxystrobin |
| 2-4 | 1-14 | Mandestrobin |
| 2-5 | 1-14 | Metconazole |
| 2-6 | 1-14 | Prothioconazole |
| 2-7 | 1-14 | Triticonazole |
| 2-8 | 1-14 | Tebuconazole |
| 2-9 | 1-14 | Difenoconazole |
| 2-10 | 1-14 | Ipconazole |
| 2-11 | 1-14 | Thiophanate-methyl |
| 2-12 | 1-14 | Fludioxonil |
| 2-13 | 1-14 | Tolclofos-methyl |
| 2-14 | 1-14 | Thiram |
| 2-15 | 1-14 | Captan |
| 2-16 | 1-14 | Carboxin |
| 2-17 | 1-14 | Boscalid |
| 2-18 | 1-14 | Thiabendazole |
| 2-19 | 1-14 | Ethaboxam |
| 2-20 | 1-15 | Pyraclostrobin |
| 2-21 | 1-15 | Azoxystrobin |
| 2-22 | 1-15 | Trifloxystrobin |
| 2-23 | 1-15 | Mandestrobin |
| 2-24 | 1-15 | Metconazole |
| 2-25 | 1-15 | Prothioconazole |
| 2-26 | 1-15 | Triticonazole |
| 2-27 | 1-15 | Tebuconazole |
| 2-28 | 1-15 | Difenoconazole |
| 2-29 | 1-15 | Ipconazole |
| 2-30 | 1-15 | Thiophanate-methyl |
| 2-31 | 1-15 | Fludioxonil |
| 2-32 | 1-15 | Tolclofos-methyl |
| 2-33 | 1-15 | Thiram |
| 2-34 | 1-15 | Captan |
| 2-35 | 1-15 | Carboxin |
| 2-36 | 1-15 | Boscalid |

TABLE 2-continued

| Combination No. | Combination of compounds | |
|---|---|---|
| 2-37 | 1-15 | Thiabendazole |
| 2-38 | 1-15 | Ethaboxam |
| 2-39 | 1-18 | Pyraclostrobin |
| 2-40 | 1-18 | Azoxystrobin |
| 2-41 | 1-18 | Trifloxystrobin |
| 2-42 | 1-18 | Mandestrobin |
| 2-43 | 1-18 | Metconazole |
| 2-44 | 1-18 | Prothioconazole |
| 2-45 | 1-18 | Triticonazole |
| 2-46 | 1-18 | Tebuconazole |
| 2-47 | 1-18 | Difenoconazole |
| 2-48 | 1-18 | Ipconazole |
| 2-49 | 1-18 | Thiophanate-methyl |
| 2-50 | 1-18 | Fludioxonil |
| 2-51 | 1-18 | Tolclofos-methyl |
| 2-52 | 1-18 | Thiram |
| 2-53 | 1-18 | Captan |
| 2-54 | 1-18 | Carboxin |
| 2-55 | 1-18 | Boscalid |
| 2-56 | 1-18 | Thiabendazole |
| 2-57 | 1-28 | Boscalid |
| 2-58 | 1-28 | Metconazole |
| 2-59 | 1-28 | Ipconazole |
| 2-60 | 1-28 | Triticonazole |
| 2-61 | 1-28 | Tebuconazole |
| 2-62 | 1-28 | Thiabendazole |
| 2-63 | 1-28 | Carboxin |
| 2-64 | 1-28 | Penflufen |
| 2-65 | 1-28 | Sedaxane |
| 2-66 | 1-28 | Fluxapyroxad |
| 2-67 | 1-28 | Fluopyram |
| 2-68 | 1-28 | Thiram |
| 2-69 | 1-221 | Metconazole |
| 2-70 | 1-27 | Ipconazole |
| 2-71 | 1-14 | Compound 2 |
| 2-72 | 1-15 | Compound 2 |
| 2-73 | 1-28 | Compound 2 |
| 2-74 | 1-86 | Fludioxonil |
| 2-75 | 1-87 | Fludioxonil |
| 2-76 | 1-50 | Pyraclostrobin |
| 2-77 | 1-51 | Pyraclostrobin |
| 2-78 | 1-50 | Trifloxystrobin |
| 2-79 | 1-51 | Trifloxystrobin |
| 2-80 | 1-216 | Penflufen |
| 2-81 | 1-4 | *Bacillus firmus* |
| 2-82 | 1-50 | Tebuconazole |
| 2-83 | 1-51 | Tebuconazole |
| 2-84 | 1-40 | Triazoxide |
| 2-85 | 1-50 | Myclobutanil |
| 2-86 | 1-51 | Myclobutanil |

TABLE 3

| Combination No. | Combination of compounds | |
|---|---|---|
| 3-1 | 2-57 | Pyraclostrobin | Mandestrobin |
| 3-2 | 2-57 | Pyraclostrobin | Tolclofos-methyl |
| 3-3 | 2-57 | Pyraclostrobin | Metconazole |
| 3-4 | 2-57 | Pyraclostrobin | Metalaxyl |
| 3-5 | 2-17 | Pyraclostrobin | Metconazole |
| 3-6 | 2-36 | Pyraclostrobin | Metconazole |
| 3-7 | 2-17 | Pyraclostrobin | Mandestrobin |
| 3-8 | 2-36 | Pyraclostrobin | Mandestrobin |
| 3-9 | 2-17 | Pyraclostrobin | Tolclofos-methyl |
| 3-10 | 2-36 | Pyraclostrobin | Tolclofos-methyl |
| 3-11 | 2-10 | Thiram | |
| 3-12 | 2-14 | Trifloxystrobin | |
| 3-13 | 2-33 | Trifloxystrobin | |
| 3-14 | 2-24 | Trifloxystrobin | |
| 3-15 | 2-22 | Mandestrobin | |
| 3-16 | 2-23 | Azoxystrobin | |
| 3-17 | 2-23 | Thiabendazole | |
| 3-18 | 2-32 | Trifloxystrobin | |
| 3-19 | 2-32 | Azoxystrobin | |
| 3-20 | 2-32 | Thiabendazole | |

TABLE 3-continued

| Combination No. | | Combination of compounds | |
|---|---|---|---|
| 3-21 | 2-19 | Trifloxystrobin | Mandestrobin |
| 3-22 | 2-19 | Azoxystrobin | Mandestrobin |
| 3-23 | 2-29 | Thiram | Mandestrobin |
| 3-24 | 2-29 | Tolclofos-methyl | |
| 3-25 | 2-5 | Ethaboxam | Mandestrobin |
| 3-26 | 2-58 | Mandestrobin | |
| 3-27 | 2-58 | Difenoconazole | |
| 3-28 | 2-5 | Difenoconazole | |
| 3-29 | 2-24 | Difenoconazole | |
| 3-30 | 2-59 | Difenoconazole | |
| 3-31 | 2-60 | Difenoconazole | |
| 3-32 | 2-61 | Difenoconazole | |
| 3-33 | 2-62 | Difenoconazole | |
| 3-34 | 2-63 | Difenoconazole | |
| 3-35 | 2-64 | Difenoconazole | |
| 3-36 | 2-65 | Difenoconazole | |
| 3-37 | 2-66 | Difenoconazole | |
| 3-38 | 2-67 | Difenoconazole | |
| 3-39 | 2-68 | Difenoconazole | |
| 3-40 | 2-19 | Metconazole | Difenoconazole |
| 3-41 | 2-19 | Ipconazole | Difenoconazole |
| 3-42 | 2-19 | Triticonazole | Difenoconazole |
| 3-43 | 2-19 | Tebuconazole | Difenoconazole |
| 3-44 | 2-19 | Thiabendazole | Difenoconazole |
| 3-45 | 2-19 | Carboxin | Difenoconazole |
| 3-46 | 2-19 | Penflufen | Difenoconazole |
| 3-47 | 2-19 | Sedaxane | Difenoconazole |
| 3-48 | 2-19 | Fluxapyroxad | Difenoconazole |
| 3-49 | 2-19 | Fluopyram | Difenoconazole |
| 3-50 | 2-19 | Thiram | Difenoconazole |
| 3-51 | 2-17 | Pyraclostrobin | Ipconazole |
| 3-52 | 2-36 | Pyraclostrobin | Ipconazole |
| 3-53 | 2-57 | Pyraclostrobin | Ipconazole |
| 3-54 | 2-10 | Trifloxystrobin | |
| 3-55 | 2-29 | Trifloxystrobin | |
| 3-56 | 2-59 | Trifloxystrobin | |
| 3-57 | 2-19 | Ipconazole | Trifloxystrobin |
| 3-58 | 2-29 | Azoxystrobin | |
| 3-59 | 2-59 | Azoxystrobin | |
| 3-60 | 2-19 | Ipconazole | Azoxystrobin |
| 3-61 | 2-5 | Mandestrobin | Carboxin |
| 3-62 | 2-5 | Mandestrobin | Penflufen |
| 3-63 | 2-5 | Mandestrobin | Sedaxane |
| 3-64 | 2-5 | Mandestrobin | Fluxapyroxad |
| 3-65 | 2-5 | Mandestrobin | Fluopyram |
| 3-66 | 2-5 | Mandestrobin | Oxycarboxin |
| 3-67 | 2-5 | Mandestrobin | Thifluzamide |
| 3-68 | 2-5 | Mandestrobin | Flutolanil |
| 3-69 | 2-5 | Mandestrobin | Pencycuron |
| 3-70 | 2-5 | Mandestrobin | Fludioxonil |
| 3-71 | 2-32 | Mandestrobin | Metconazole |
| 3-72 | 2-32 | Mandestrobin | Tebuconazole |
| 3-73 | 2-32 | Mandestrobin | Difenoconazole |
| 3-74 | 2-32 | Mandestrobin | Triticonazole |
| 3-75 | 2-32 | Mandestrobin | Imazalil |
| 3-76 | 2-32 | Mandestrobin | Triadimenol |
| 3-77 | 2-32 | Mandestrobin | Fluquinconazole |
| 3-78 | 2-32 | Mandestrobin | Prochloraz |
| 3-79 | 2-32 | Mandestrobin | Prothioconazole |
| 3-80 | 2-32 | Mandestrobin | Diniconazole |
| 3-81 | 2-32 | Mandestrobin | Diniconazole M |
| 3-82 | 2-32 | Mandestrobin | Ipconazole |
| 3-83 | 2-32 | Mandestrobin | Cyproconazole |
| 3-84 | 2-32 | Mandestrobin | Tetraconazole |
| 3-85 | 2-32 | Mandestrobin | Carboxin |
| 3-86 | 2-32 | Mandestrobin | Penflufen |
| 3-87 | 2-32 | Mandestrobin | Sedaxane |
| 3-88 | 2-32 | Mandestrobin | Fluxapyroxad |
| 3-89 | 2-32 | Mandestrobin | Fluopyram |
| 3-90 | 2-32 | Mandestrobin | Oxycarboxin |
| 3-91 | 2-32 | Mandestrobin | Fludioxonil |
| 3-92 | 2-32 | Mandestrobin | Thiram |
| 3-93 | 2-32 | Mandestrobin | Captan |
| 3-94 | 2-32 | Mandestrobin | Thiophanate-methyl |
| 3-95 | 2-32 | Mandestrobin | Thiabendazole |
| 3-96 | 2-32 | Mandestrobin | Metconazole |
| 3-97 | 2-13 | Mandestrobin | Tebuconazole |
| 3-98 | 2-13 | Mandestrobin | Difenoconazole |

TABLE 3-continued

| Combination No. | | Combination of compounds | | |
|---|---|---|---|---|
| 3-99 | 2-13 | Mandestrobin | Triticonazole | |
| 3-100 | 2-13 | Mandestrobin | Imazalil | |
| 3-101 | 2-13 | Mandestrobin | Triadimenol | |
| 3-102 | 2-13 | Mandestrobin | Fluquinconazole | |
| 3-103 | 2-13 | Mandestrobin | Prochloraz | |
| 3-104 | 2-13 | Mandestrobin | Prothioconazole | |
| 3-105 | 2-13 | Mandestrobin | Diniconazole | |
| 3-106 | 2-13 | Mandestrobin | Diniconazole M | |
| 3-107 | 2-13 | Mandestrobin | Ipconazole | |
| 3-108 | 2-13 | Mandestrobin | Cyproconazole | |
| 3-109 | 2-13 | Mandestrobin | Tetraconazole | |
| 3-110 | 2-13 | Mandestrobin | Carboxin | |
| 3-111 | 2-13 | Mandestrobin | Penflufen | |
| 3-112 | 2-13 | Mandestrobin | Sedaxane | |
| 3-113 | 2-13 | Mandestrobin | Fluxapyroxad | |
| 3-114 | 2-13 | Mandestrobin | Fluopyram | |
| 3-115 | 2-13 | Mandestrobin | Oxycarboxin | |
| 3-116 | 2-13 | Mandestrobin | Fludioxonil | |
| 3-117 | 2-13 | Mandestrobin | Thiram | |
| 3-118 | 2-13 | Mandestrobin | Captan | |
| 3-119 | 2-13 | Mandestrobin | Thiophanate-methyl | |
| 3-120 | 2-13 | Mandestrobin | Thiabendazole | |
| 3-121 | 2-69 | Mandestrobin | Oxadixyl | |
| 3-122 | 2-69 | Mandestrobin | Hymexazol | |
| 3-123 | 2-69 | Mandestrobin | Fenamidone | |
| 3-124 | 2-69 | Mandestrobin | Cymoxanil | |
| 3-125 | 2-69 | Mandestrobin | Fluopicolide | |
| 3-126 | 2-70 | Carboxin | | |
| 3-127 | 2-10 | Tolclofos-methyl | Carboxin | |
| 3-128 | 2-10 | Tolclofos-methyl | Penflufen | |
| 3-129 | 2-10 | Tolclofos-methyl | Sedaxane | |
| 3-130 | 2-10 | Tolclofos-methyl | Fluxapyroxad | |
| 3-131 | 2-10 | Tolclofos-methyl | Fluopyram | |
| 3-132 | 2-5 | Tolclofos-methyl | | |
| 3-133 | 2-5 | Tolclofos-methyl | Azoxystrobin | |
| 3-134 | 2-5 | Tolclofos-methyl | Fluoxastrobin | |
| 3-135 | 2-5 | Tolclofos-methyl | Trifloxystrobin | |
| 3-136 | 2-5 | Tolclofos-methyl | Pyraclostrobin | |
| 3-137 | 2-5 | Tolclofos-methyl | Orysastrobin | |
| 3-138 | 2-5 | Tolclofos-methyl | Carboxin | |
| 3-139 | 2-5 | Tolclofos-methyl | Oxycarboxin | |
| 3-140 | 2-5 | Tolclofos-methyl | Fludioxonil | |
| 3-141 | 2-5 | Tolclofos-methyl | Thiram | |
| 3-142 | 2-5 | Tolclofos-methyl | Captan | |
| 3-143 | 2-5 | Tolclofos-methyl | Thiophanate-methyl | |
| 3-144 | 2-5 | Tolclofos-methyl | Thiabendazole | |
| 3-145 | 2-5 | Ethaboxam | | |
| 3-146 | 2-5 | Ethaboxam | Tolclofos-methyl | |
| 3-147 | 2-19 | Tolclofos-methyl | Compound 1 | |
| 3-148 | 2-38 | Metconazole | Compound 1 | |
| 3-149 | 2-38 | Compound 1 | Compound 2 | |
| 3-150 | 2-38 | Compound 1 | Mandestrobin | |
| 3-151 | 2-19 | Ipconazole | Compound 1 | |
| 3-152 | 2-19 | Compound 1 | Compound 2 | |
| 3-153 | 2-19 | Boscalid | Pyraclostrobin | Metconazole |
| 3-154 | 2-19 | Boscalid | Pyraclostrobin | Ipconazole |
| 3-155 | 2-38 | Boscalid | Pyraclostrobin | Metconazole |
| 3-156 | 2-19 | Boscalid | Pyraclostrobin | Mandestrobin |
| 3-157 | 2-38 | Boscalid | Pyraclostrobin | Mandestrobin |
| 3-158 | 2-19 | Boscalid | Pyraclostrobin | Tolclofos-methyl |
| 3-159 | 2-38 | Boscalid | Pyraclostrobin | Tolclofos-methyl |
| 3-160 | 2-32 | Mandestrobin | Metconazole | Oxadixyl |
| 3-161 | 2-32 | Mandestrobin | Metconazole | Hymexazol |
| 3-162 | 2-32 | Mandestrobin | Metconazole | Fenamidone |
| 3-163 | 2-32 | Mandestrobin | Metconazole | Cymoxanil |
| 3-164 | 2-32 | Mandestrobin | Metconazole | Fluopicolide |
| 3-165 | 2-13 | Mandestrobin | Metconazole | Oxadixyl |
| 3-166 | 2-13 | Mandestrobin | Metconazole | Hymexazol |
| 3-167 | 2-13 | Mandestrobin | Metconazole | Fenamidone |
| 3-168 | 2-13 | Mandestrobin | Metconazole | Cymoxanil |
| 3-169 | 2-13 | Mandestrobin | Metconazole | Fluopicolide |
| 3-170 | 2-5 | Ethaboxam | Tolclofos-methyl | Azoxystrobin |
| 3-171 | 2-5 | Ethaboxam | Tolclofos-methyl | Fluoxastrobin |
| 3-172 | 2-5 | Ethaboxam | Tolclofos-methyl | Trifloxystrobin |
| 3-173 | 2-5 | Ethaboxam | Tolclofos-methyl | Pyraclostrobin |
| 3-174 | 2-5 | Ethaboxam | Tolclofos-methyl | Orysastrobin |
| 3-175 | 2-5 | Ethaboxam | Tolclofos-methyl | Carboxin |
| 3-176 | 2-5 | Ethaboxam | Tolclofos-methyl | Penflufen |

TABLE 3-continued

| Combination No. | Combination of compounds | | | |
|---|---|---|---|---|
| 3-177 | 2-5 | Ethaboxam | Tolclofos-methyl | Sedaxane |
| 3-178 | 2-5 | Ethaboxam | Tolclofos-methyl | Fluxapyroxad |
| 3-179 | 2-72 | Metconazole | | |
| 3-180 | 2-71 | Metconazole | | |
| 3-181 | 2-73 | Difenoconazole | | |
| 3-182 | 2-73 | Triticonazole | | |
| 3-183 | 2-73 | Tebuconazole | | |
| 3-184 | 2-73 | Thiabendazole | | |
| 3-185 | 2-73 | Carboxin | | |
| 3-186 | 2-73 | Thiram | | |
| 3-187 | 2-73 | Captan | | |
| 3-188 | 2-71 | Mandestrobin | | |
| 3-189 | 2-72 | Mandestrobin | | |
| 3-190 | 2-73 | Mandestrobin | | |
| 3-191 | 2-71 | Tolclofos-methyl | | |
| 3-192 | 2-72 | Tolclofos-methyl | | |
| 3-193 | 2-71 | Captan | | |
| 3-194 | 2-72 | Captan | | |
| 3-195 | 2-71 | Ethaboxam | Metconazole | |
| 3-196 | 2-71 | Ethaboxam | Mandestrobin | |
| 3-197 | 2-71 | Ethaboxam | Tolclofos-methyl | |
| 3-198 | 2-73 | Tolclofos-methyl | | |
| 3-199 | 2-71 | Ethaboxam | Ipconazole | |
| 3-200 | 2-71 | Ethaboxam | Difenoconazole | |
| 3-201 | 2-71 | Ethaboxam | Triticonazole | |
| 3-202 | 2-71 | Ethaboxam | Tebuconazole | |
| 3-203 | 2-71 | Ethaboxam | Thiabendazole | |
| 3-204 | 2-71 | Ethaboxam | Carboxin | |
| 3-205 | 2-71 | Ethaboxam | Thiram | |
| 3-206 | 2-71 | Ethaboxam | Captan | |
| 3-207 | 2-73 | Ipconazole | | |
| 3-208 | 2-71 | Fludioxonil | Azoxystrobin | Prothioconazole |
| 3-209 | 2-71 | Fludioxonil | Pyraclostrobin | Prothioconazole |
| 3-210 | 2-71 | Fludioxonil | Trifloxystrobin | Prothioconazole |
| 3-211 | 2-71 | Fludioxonil | Fluoxastrobin | Prothioconazole |
| 3-212 | 2-71 | Fludioxonil | Azoxystrobin | Triticonazole |
| 3-213 | 2-71 | Fludioxonil | Pyraclostrobin | Triticonazole |
| 3-214 | 2-71 | Fludioxonil | Trifloxystrobin | Triticonazole |
| 3-215 | 2-71 | Fludioxonil | Fluoxastrobin | Triticonazole |
| 3-216 | 2-71 | Fludioxonil | Azoxystrobin | Tebuconazole |
| 3-217 | 2-71 | Fludioxonil | Pyraclostrobin | Tebuconazole |
| 3-218 | 2-71 | Fludioxonil | Trifloxystrobin | Tebuconazole |
| 3-219 | 2-71 | Fludioxonil | Fluoxastrobin | Tebuconazole |
| 3-220 | 2-71 | Fludioxonil | Azoxystrobin | Difenoconazole |
| 3-221 | 2-71 | Fludioxonil | Pyraclostrobin | Difenoconazole |
| 3-222 | 2-71 | Fludioxonil | Trifloxystrobin | Difenoconazole |
| 3-223 | 2-71 | Fludioxonil | Fluoxastrobin | Difenoconazole |
| 3-224 | 2-72 | Fludioxonil | Azoxystrobin | Prothioconazole |
| 3-225 | 2-72 | Fludioxonil | Pyraclostrobin | Prothioconazole |
| 3-226 | 2-72 | Fludioxonil | Trifloxystrobin | Prothioconazole |
| 3-227 | 2-72 | Fludioxonil | Fluoxastrobin | Prothioconazole |
| 3-228 | 2-72 | Fludioxonil | Azoxystrobin | Triticonazole |
| 3-229 | 2-72 | Fludioxonil | Pyraclostrobin | Triticonazole |
| 3-230 | 2-72 | Fludioxonil | Trifloxystrobin | Triticonazole |
| 3-231 | 2-72 | Fludioxonil | Fluoxastrobin | Triticonazole |
| 3-232 | 2-72 | Fludioxonil | Azoxystrobin | Tebuconazole |
| 3-233 | 2-72 | Fludioxonil | Pyraclostrobin | Tebuconazole |
| 3-234 | 2-72 | Fludioxonil | Trifloxystrobin | Tebuconazole |
| 3-235 | 2-72 | Fludioxonil | Fluoxastrobin | Tebuconazole |
| 3-236 | 2-72 | Fludioxonil | Azoxystrobin | Difenoconazole |
| 3-237 | 2-72 | Fludioxonil | Pyraclostrobin | Difenoconazole |
| 3-238 | 2-72 | Fludioxonil | Trifloxystrobin | Difenoconazole |
| 3-239 | 2-72 | Fludioxonil | Fluoxastrobin | Difenoconazole |
| 3-240 | 2-71 | Mandestrobin | Compound 1 | |
| 3-241 | 2-71 | Pyraclostrobin | Compound 1 | |
| 3-242 | 2-71 | Azoxystrobin | Compound 1 | |
| 3-243 | 2-71 | Trifloxystrobin | Compound 1 | |
| 3-244 | 2-71 | Metconazole | Compound 1 | |
| 3-245 | 2-71 | Prothioconazole | Compound 1 | |
| 3-246 | 2-71 | Triticonazole | Compound 1 | |
| 3-247 | 2-71 | Tebuconazole | Compound 1 | |
| 3-248 | 2-71 | Difenoconazole | Compound 1 | |
| 3-249 | 2-71 | Ipconazole | Compound 1 | |
| 3-250 | 2-71 | Thiophanate-methyl | Compound 1 | |
| 3-251 | 2-71 | Fludioxonil | Compound 1 | |
| 3-252 | 2-71 | Tolclofos-methyl | Compound 1 | |
| 3-253 | 2-71 | Thiuram | Compound 1 | |
| 3-254 | 2-71 | Captan | Compound 1 | |

TABLE 3-continued

| Combination No. | Combination of compounds | | | |
|---|---|---|---|---|
| 3-255 | 2-71 | Carboxin | Compound 1 | |
| 3-256 | 2-71 | Penflufen | Compound 1 | |
| 3-257 | 2-71 | Sedaxane | Compound 1 | |
| 3-258 | 2-71 | Fluxapyroxad | Compound 1 | |
| 3-259 | 2-71 | Fluopyram | Compound 1 | |
| 3-260 | 2-71 | Boscalid | Compound 1 | |
| 3-261 | 2-71 | Thiabendazole | Compound 1 | |
| 3-262 | 2-72 | Mandestrobin | Compound 1 | |
| 3-263 | 2-72 | Pyraclostrobin | Compound 1 | |
| 3-264 | 2-72 | Azoxystrobin | Compound 1 | |
| 3-265 | 2-72 | Trifloxystrobin | Compound 1 | |
| 3-266 | 2-72 | Metconazole | Compound 1 | |
| 3-267 | 2-72 | Prothioconazole | Compound 1 | |
| 3-268 | 2-72 | Triticonazole | Compound 1 | |
| 3-269 | 2-72 | Tebuconazole | Compound 1 | |
| 3-270 | 2-72 | Difenoconazole | Compound 1 | |
| 3-271 | 2-72 | Ipconazole | Compound 1 | |
| 3-272 | 2-72 | Thiophanate-methyl | Compound 1 | |
| 3-273 | 2-72 | Fludioxonil | Compound 1 | |
| 3-274 | 2-72 | Tolclofos-methyl | Compound 1 | |
| 3-275 | 2-72 | Thiuram | Compound 1 | |
| 3-276 | 2-72 | Captan | Compound 1 | |
| 3-277 | 2-72 | Carboxin | Compound 1 | |
| 3-278 | 2-72 | Penflufen | Compound 1 | |
| 3-279 | 2-72 | Sedaxane | Compound 1 | |
| 3-280 | 2-72 | Fluxapyroxad | Compound 1 | |
| 3-281 | 2-72 | Fluopyram | Compound 1 | |
| 3-282 | 2-72 | Boscalid | Compound 1 | |
| 3-283 | 2-72 | Thiabendazole | Compound 1 | |
| 3-284 | 2-74 | Azoxystrobin | Abamectin | Sedaxane |
| 3-285 | 2-75 | Azoxystrobin | Abamectin | Sedaxane |
| 3-286 | 2-76 | Fluxapyroxad | | |
| 3-287 | 2-77 | Fluxapyroxad | | |
| 3-288 | 2-81 | Fluxapyroxad | | |
| 3-289 | 2-78 | Penflufen | | |
| 3-290 | 2-79 | Penflufen | | |
| 3-291 | Fipronil | Pyraclostrobin | Thiophanate-methyl | Fluxapyroxad |
| 3-292 | Fluoxastrobin | Prothioconazole | Tebuconazole | Triazoxide |
| 3-293 | 3-286 | Sedaxane | | |
| 3-294 | 3-287 | Sedaxane | | |
| 3-295 | 2-85 | Trifloxystrobin | Fluxapyroxad | Thiodicarb |
| 3-296 | 2-86 | Trifloxystrobin | Fluxapyroxad | Thiodicarb |
| 3-297 | 2-85 | Pyraclostrobin | Fluxapyroxad | Thiodicarb |
| 3-298 | 2-86 | Pyraclostrobin | Fluxapyroxad | Thiodicarb |

In the present method for controlling harmful organisms, examples of the compound B used to perform a foliage treatment on crops are described below, but the examples are not limited thereto.

Prothioconazole;
Epoxyconazole;
Cyproconazole;
Propiconazole;
Tetraconazole;
Tebuconazole;
Metconazole;
Benzobindiflupyr;
Fluxapyroxad;
Compound 1;
Pyraclostrobin;
Azoxystrobin;
Trifloxystrobin;
Picoxystrobin;
Azoxystrobin+benzobindiflupyr;
Azoxystrobin+propiconazole;
Azoxystrobin+tebuconazole;
Azoxystrobin+flutriafol;
Azoxystrobin+tetraconazole;
Azoxystrobin+cyproconazole;
Prothioconazole+trifloxystrobin;
Pyraclostrobin+fluxapyroxad;
Trifloxystrobin+tebuconazole;
Trifloxystrobin+prothioconazole;
Pyraclostrobin+metconazole;
Pyraclostrobin+epoxyconazole;
Picoxystrobin+cyproconazole;
Compound 1;
Compound 1+tebuconazole;
Compound 1+prothioconazole;
fluindapyr;
fluindapyr+tebuconazole; and
fluindapyr+prothioconazole.

In the present invention, all combinations, for example, (a) the cultivation area of crops is only treated with the compound X or flumioxazin, or treated with a combination of the compound X or flumioxazin and a herbicide or a safener exemplified above; (b) the crop seeds are treated with only one compound selected from the above-described compound group A or treated with a combination listed in Tables 1 to 3; (c) the crops are subjected to a foliage treatment with the compound B exemplified above; and (d) various crops have been described.

In the cultivation of crops of the present invention, it is possible to perform typical plant nutrition management on crop cultivation. The fertilization system may be a system based on Precision Agriculture or a uniform system which has been practically used. Further, nitrogen-fixing bacteria or mycorrhizal fungi may be inoculated to crops together with the treatment applied to the crops with the compound group A.

EXAMPLES

Hereinafter, the present invention will be described in detail with reference to examples, but the present invention is not limited thereto.

First, the evaluation criteria of the effects of controlling harmful anthropods, the effects of controlling plant pathogens, the herbicidal effects, and the phytotoxicity on crops, shown in the following examples, will be described.

<Effects of Controlling Harmful Anthropods>

In the evaluation of the effects of controlling harmful anthropods, the life and death of insects at the time of investsigation is determined and the controlling rate is acquired using the following equation.

Controlling rate (%)=100×(1−T/C)

Further, the characters in the equation represent the followings.

C: number of insects in an untreated area at the time of observation

T: number of insects in a treated area at the time of observation

<Effects of Controlling Plant Pathogens>

In the evaluation of the effects of controlling plant pathogens, when the symptoms caused by the plant pathogens at the time of investigation are compared to those in an untreated area and there is no difference or almost no difference between the symptoms, this case is evaluated as "0". Further, when there are no symptoms or almost no symptoms caused by the plant pathogens, this case is evaluated as "100". The effects are evaluated on a scale of 0 to 100.

<Herbicidal Effects>

In the evaluation of the herbicidal effects, when the sprouting or growing state of the test weeds at the time of investigation is compared to that of weeds in an untreated area and there is no difference or almost no difference between the states, this case is evaluated as "0". Further, when the test weeds are completely withered or sprouting or growing of weeds is completely suppressed, this case is evaluated as "100". The effects are evaluated on a scale of 0 to 100.

<Phytotoxicity on Crops>

In the evaluation of phytotoxicity on crops, a case where phytotoxicity is not confirmed is evaluated as "harmless", a case where mild phytotoxicity is confirmed is evaluated as "small", a case where moderate phytotoxicity is confirmed is evaluated as "medium", and a case where strong phytotoxicity is confirmed is evaluated as "large".

When crop seeds are treated with any combination selected from the combinations listed in the above-mentioned Tables 1 to 3 and the cultivation area of the crops is treated with the compound X according to the following method, it is confirmed that the herbicidal effects, the effects of controlling harmful anthropods, and/or the effects of controlling plant pathogens are excellent and the phytotoxicity on the crops is to pose little problem.

Hereinafter, when particular crops (including plant body or seeds) (for example, soybean seeds) are described in the Examples, the crops may be replaced by any transgenic plant body or seeds that are tolerant to the PPO inhibitors. For example, the crops used in the Examples may be replaced by the transgenic plant body or seeds having any one of a polypeptide sequence selected from the group consisting of SEQ ID Nos. 1-32.

Example 1

Soybean seeds (product, Genuity RoundupReady2Yield soybeans) are treated with NipsIt (600 g/L of clothianidin, manufactured by Valent) such that the treatment amount of NipSIt is set to 206 mL/kg seeds (1.28 fluidounce/100 poundseeds). A formulation containing the compound X (an emulsion (hereinafter, referred to as a formulation X) obtained by sufficiently mixing 5 parts by weight of the compound X, 2 parts by weight of Geronol FF/4-E (manufactured by Rhodia Inc.), 8 parts by weight of Geronol FF/6-E (manufactured by Rhodia Inc.), and 85 parts by weight of Solvesso 200 (manufactured by Exxon Mobile Corporation)) is diluted with water and a field before sowing the soybeans is treated such that the treatment amount of the compound X is set to 5, 20, or 80 g/ha. The soybeans are sowed in the field after 7 days from the treatment with the compound X and then the fields are treated such that the treatment amount of RoundupWeatherMax (660 g/L of glyphosate potassium salt, manufactured by Monsanto Company) is set to 2.338 L/ha (32 fluidounce/acre) at the 3-leaf stage of soybean leaves.

Example 2

Soybean seeds are treated with NipsIt in the same manner as in Example 1. A field before sowing the soybeans is treated with the formulation X and RoundupWeatherMax (660 g/L of glyphosate potassium salt, manufactured by Monsanto Company) such that the treatment amount of the compound X is set to 5, 20, or 80 g/ha and the treatment amount of RoundupWeatherMax is set to 2.338 L/ha (32 fluidounce/acre), and the soybeans are sowed in the field after 7 days from the treatment. The fields are treated such that the treatment amount of RoundupWeatherMax (660 g/L of glyphosate potassium salt, manufactured by Monsanto Company) is set to 2.338 L/ha (32 fluidounce/acre) at the 3-leaf stage of soybean leaves.

Example 3

Soybean seeds are treated with NipsIt in the same manner as in Example 1 and then sowed in a field. On the day following the day of sowing, the field is treated with the formulation X such that the treatment amount of the compound X is set to 5, 20, or 80 g/ha. The fields are treated such that the treatment amount of RoundupWeatherMax (660 g/L of glyphosate potassium salt, manufactured by Monsanto Company) is set to 2.338 L/ha (32 fluidounce/acre) at the 3-leaf stage of soybean leaves.

Example 4

Soybean seeds are treated with NipsIt in the same manner as in Example 1 and then sowed in a field. On the day following the day of sowing, the field is treated with the formulation X and RoundupWeatherMax (660 g/L of glyphosate potassium salt, manufactured by Monsanto Company) such that the treatment amount of the compound X is set to 5, 20, or 80 g/ha and the treatment amount of RoundupWeatherMax is set to 2.338 L/ha (32 fluidounce/acre). The seeds are treated such that the treatment amount of RoundupWeatherMax (660 g/L of glyphosate potassium salt, manufactured by Monsanto Company) is set to 2.338 L/ha (32 fluidounce/acre) at the 3-leaf stage of soybean leaves.

Examples 5 to 8

The fields are treated with the formulation X and ValorSX, instead of treating the fields with the formuation X in each of Examples 1 to 4, such that the treatment amount of the compound X is set to 5, 20, or 80 g/ha and the treatment amount of ValorSX (51% of flumioxazin, manufactured by Valent) is set to 210 g/ha.

Examples 9 to 12

The fields are treated with ValorXLT (30% of flumioxazin+10.3% of chlorimuron-ethyl, manufactured by Valent), instead of ValorSX, in each of Examples 5 to 8, such that the treatment amount of ValorXLT is set to 315 g/ha.

Examples 13 to 24

The seeds are treated with INOVATE (160 g/L of clothianidin+13 g/L of metalaxyl+8 g/L of ipconazole, manufactured by Valent), instead of NipsIt in each of Examples 1 to 12, such that the treatment amount of INOVATE is set to 309 mL/100 kg seeds (4.74 fluidounce/100 poundseeds).

Examples 25 to 36

The seeds are treated with CruiserMAXX Vibrance (240 g/L of thiamethoxam+36 g/L of metalaxyl M+12 g/L of fludioxonil+12 g/L of sedaxane, manufactured by Syngenta Corporation), instead of NipsIt in each of Examples 1 to 12, such that the treatment amount of CruiserMAXX Vibrance is set to 235 mL/100 kg seeds (3.22 fluidounce/100 poundseeds).

Examples 37 to 48

The seeds are treated with Acceleron system (31 mL/100 kg seeds of DX-612 (326 g/L of fluxapyroxad, manufactured by Monsanto Company), 242 mL/100 kg seeds (1.5 fluidounce/100 poundseeds) of DX-309 (313 g/L of metalaxyl, manufactured by Monsanto Company), 242 mL/100 kg seeds (1.5 fluidounce/100 poundseeds) of DX-109 (200 g/L of pyraclostrobin, manufactured by Monsanto Company), and 515 mL/100 kg seeds (3.2 fluidounce/100 poundseeds) of IX-104 (600 g/L of imidacloprid, manufactured by Monsanto Company)) instead of treating the soybean seeds with NipsIt in each of Examples 1 to 12.

Examples 49 to 96

The seeds are subjected to a foliage treatment with Compound 1 in a blooming period of soybeans such that the treatment amount of Compound 1 is set to 30 g/ha in each of Examples 1 to 48.

Examples 97 to 144

The seeds are subjected to a foliage treatment with Compound 1 and tebuconazole in a blooming period of soybeans such that the treatment amount of Compound 1 is set to 30 g/ha and the treatment amount of tebuconazole is set to 150/ha in each of Examples 1 to 48.

Examples 145 to 288

The fields are treated with the formulation X and RoundupWeatherMax (660 g/L of glyphosate potassium salt, manufactured by Monsanto Company), instead of treating the fields with RoundupWeatherMax at the 3-leaf stage of soybean leaves in each of Examples 1 to 144, such that the treatment amount of the compound X is set to 5, 20, or 80 g/ha and the treatment amount of RoundupWeatherMax is set to 2.338 L/ha (32 fluidounce/acre).

Examples 289 to 576

The seeds are treated at the 6-leaf stage of soybean leaves instead of the 3-leaf stage of soybean leaves in each of Examples 1 to 288.

Examples 577 to 1152

Corn seeds or cotton seeds are used instead of the soybean seeds in each of Examples 1 to 576.

In Examples 1 to 1152 described above, it is confirmed that the herbicidal effects, the effects of controlling harmful anthropods, and/or the effects of controlling plant pathogens are excellent and the phytotoxicity on the crops is to pose little problem.

INDUSTRIAL APPLICABILITY

According to the method for controlling harmful organisms of the present invention, it is possible to efficiently control harmful organisms in a cultivation area of crops.

---

The invention claimed is:

1. A herbicide composition, comprising active ingredients consisting of ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate and 2,4-D 2-ethylhexyl ester,
wherein
a weight ratio of ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate to 2,4-D 2-ethylhexyl ester is within the range of 1:10 to 1:100.

2. A method for controlling weeds comprising treating a crop cultivation area with the composition according to claim 1 before, simultaneously with, and/or after sowing crop seeds.

3. The method according to claim 2, wherein the crop is a transgenic plant body or seeds that are tolerant to the protoporphyrinogen oxidase (PPO) inhibitors.

4. The method according to claim 3, wherein the crop is a transgenic plant body or seeds having any one of a polypeptide sequence selected from the group consisting of SEQ ID Nos. 1-32 or a polypeptide sequence having at least 85% sequence identity to any one of SEQ ID Nos. 1-32.

5. A method for controlling harmful organisms in a crop cultivation area, comprising the steps of:
(1) treating crop seeds with one or more compounds selected from compound group A;
(2) treating a cultivation area with the composition according to claim 1 before, simultaneously with, and/or after sowing the crop seeds obtained by the above step; and
(3) performing a foliage treatment on crops with one or more compounds selected from compound group B during a growing period of the crops,
Compound group A: the group consisting of a neonicotinoid compound, a diamide compound, a carbamate compound, an organic phosphorus compound, a biological nematicidal compound, other insecticidal compounds and nematicidal compounds, an azole compound, a strobilurin compound, a metalaxyl compound, an SDHI compound, and other fungicidal compounds and plant growth regulators,
Compound group B: the group consisting of a strobilurin compound, an azole compound, an SDHI compound, other fungicidal compounds, a pyrethroid compound, a benzoylphenylurea compound, an organic phosphorus insecticidal compound, a neonicotinoid compound, and a diamide compound.

6. The method according to claim 5, wherein the crop is a transgenic plant body or seeds that are tolerant to the protoporphyrinogen oxidase (PPO) inhibitors.

7. The method according to claim 6, wherein the crop is a transgenic plant body or seeds having any one of a polypeptide sequence selected from the group consisting of SEQ ID Nos. 1-32 or a polypeptide sequence having at least 85% sequence identity to any one of SEQ ID Nos. 1-32.

8. The control method of claim 5,
wherein one or more compounds selected from the compound group A is one or more compounds selected from the group consisting of the following compounds,
Neonicotinoid compounds: clothianidin, thiamethoxam, imidacloprid, dinotefuran, nitenpyram, triflumezopyrim, dicloromezotiaz, sulfoxaflor, flupyradifurone, acetamiprid, and thiacloprid;
Diamide compounds: flubendiamide, chlorantraniliprole, cyantraniliprole, cyclaniliprole, broflanilide, cyhalodiamide, and tetraniliprole;
Carbamate compounds: aldicarb, oxamyl, thiodicarb, carbofuran, carbosulfan, and dimethoate;
Organic phosphorus compounds: fenamiphos, imicyafos, fensulfothion, terbufos, fosthiazate, phosphocarb, dichlofenthion, isamidofos, isazophos, ethoprophos, cadusafos, chlorpyrifos, heterofos, mecarphon, phorate, thionazin, triazophos, diamidafos, fosthietan, and phosphamidon;
Biological nematicidal compounds: Harpin Protein, *Pasteuria nishizawae*, *Pasteuria penetrans*, *Pasteuria usage*, *Myrothecium verrucaria*, *Burkholderia cepacia*, *Bacillus chitonosporus*, *Paecilomyces lilacinus*, *Bacillus amyloliquefaciens*, *Bacillus firmus*, *Bacillus subtilis*, *Bacillus pumulus*, *Trichoderma harzianum*, *Hirsutella rhossiliensis*, *Hirsutella minnesotensis*, *Verticillium chlamydosporum*, and *Arthrobotrys dactyloides*;
Other insecticidal compounds and nematicidal compounds: fipronil, ethiprole, beta-cyfluthrin, tefluthrin, chlorpyrifos, abamectin, spirotetramat, tioxazafen, fluazaindolizine, fluensulfone, and fluxametamide;
Azole compounds: azaconazole, bitertanol, bromuconazole, cyproconazole, difenoconazole, diniconazole, epoxyconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimenol, triticonazole, fenarimol, nuarimol, pyrifenox, imazalil, oxpoconazole fumarate, pefurazoate, prochloraz, triflumizole, ipfentrifluconazole, and mefentrifluconazole;

Strobilurin compounds: kresoxim-methyl, azoxystrobin, trifloxystrobin, fluoxastrobin, picoxystrobin, pyraclostrobin, dimoxystrobin, pyribencarb, metominostrobin, orysastrobin, and mandestrobin;

Metalaxyl compounds: metalaxyl and metalaxyl-M;

SDHI compounds: sedaxane, penflufen, carboxin, boscalid, furametpyr, flutolanil, fluxapyroxad, isopyrazam, fluopyram, tifluzamide, isofetamid, pyraziflumid, pydiflumetofen, fluindapyr, N-(1,1,3-trimethylindan-4-yl)-1-methyl-3-difluoromethylpyrazole-4-carboxamide (including a racemic body or an enantiomer and a mixture of an R enantiomer and an S enantiomer at an optional mixing ratio, and a compound, rich in R enantiomer, in which the ratio of the R enantiomer to the S enantiomer is 80:20 or greater), and thifluzamide;

Other fungicidal compounds: tolclofos-methyl, thiram, captan, carbendazim, thiophanate-methyl, mancozeb, thiabendazole, isotianil, ethaboxam, picarbutrazox, oxathiapiprolin, and triazoxide;

Plant growth regulators: ethephon, chlormequat-chloride, mepiquat-chloride, and 4-oxo-4-(2-phenylethyl)aminobutyric acid.

9. The control method of claim 5, wherein one or more compounds selected from the compound group B is one or more compounds selected from the group consisting of the following compounds, Strobilurin compounds: pyraclostrobin, azoxystrobin, mandestrobin, trifloxystrobin, and picoxystrobin;

Azole compounds: prothioconazole, epoxyconazole, tebuconazole, cyproconazole, propiconazole, metconazole, bromuconazole, tetraconazole, triticonazole, ipfentrifluconazole, and mefentrifluconazole;

SDHI compounds: benzobindiflupyr, bixafen, fluxapyroxad, fluindapyr, and N-(1,1,3-trimethylindan-4-yl)-1-methyl-3-difluoromethylpyrazole-4-carboxamide (including a racemic body or an enantiomer and a mixture of an R enantiomer and an S enantiomer at an optional mixing ratio, and a compound, rich in R enantiomer, in which the ratio of the R enantiomer to the S enantiomer is 80:20 or greater), and thifluzamide;

Other fungicidal compounds: tolclofos-methyl and ethaboxam;

Pyrethroid compounds: bifenthrin, lambda-cyhalothrin, gamma-cyhalothrin, cypermethrin, fenpropathrin, etofenprox, silafluofen, and esfenvalerate;

Benzoylphenylurea compound: teflubenzuron and triflumuron;

Organic phosphorus insecticidal compounds: acephate and methomyl;

Neonicotinoid compounds: imidacloprid, clothianidin, thiamethoxam, sulfoxaflor, flupyradifurone, triflumezopyrim, and dicloromezotiaz;

Diamide compounds: flubendiamide, chlorantraniliprole, cyantraniliprole, broflanilide, tetraniliprole, and cyhalodiamide.

10. The control method of claim 2, wherein the cultivation area is treated with the composition before sowing the crop seeds.

11. The control method of claim 2, wherein the cultivation area is treated with the composition simultaneously with sowing the crop seeds.

12. The control method of claim 2, wherein the cultivation area is treated with the composition after sowing the crop seeds.

13. The control method of claim 5, wherein the harmful organisms are weeds and/or anthropods and/or plant pathogens.

14. The control method of claim 5, wherein the harmful organisms are weeds.

15. The control method of claim 5, wherein the crops are selected from the group consisting of soybeans, corn, cotton, rapeseed, rice, wheat, barley, sugarcane, sugar beet, sorghum, and sunflower.

* * * * *